US012280396B2

(12) United States Patent
Cochran et al.

(10) Patent No.: US 12,280,396 B2
(45) Date of Patent: Apr. 22, 2025

(54) NARROWBAND CAN MANUFACTURING

(71) Applicant: Photex Inc., Cleveland, OH (US)

(72) Inventors: Don W. Cochran, Gates Mills, OH (US); Benjamin D. Johnson, Northfield, OH (US); Jonathan M. Katz, Solon, OH (US)

(73) Assignee: PHOTEX INC., Cleveland, OH (US)

(*) Notice: Subject to any disclaimer, the term of this patent is extended or adjusted under 35 U.S.C. 154(b) by 520 days.

(21) Appl. No.: 17/344,209

(22) Filed: Jun. 10, 2021

(65) Prior Publication Data

US 2021/0299703 A1 Sep. 30, 2021

Related U.S. Application Data

(63) Continuation-in-part of application No. 16/853,536, filed on Apr. 20, 2020, now Pat. No. 11,633,758.

(60) Provisional application No. 63/094,601, filed on Oct. 21, 2020, provisional application No. 63/037,437, filed on Jun. 10, 2020, provisional application No. 62/836,447, filed on Apr. 19, 2019.

(51) Int. Cl.

| | |
|---|---|
| ***B05D 7/14*** | (2006.01) |
| ***B05D 3/00*** | (2006.01) |
| ***B05D 3/02*** | (2006.01) |
| ***B05D 7/22*** | (2006.01) |

(52) U.S. Cl.

CPC ............... *B05D 7/14* (2013.01); *B05D 3/007* (2013.01); *B05D 3/0263* (2013.01); *B05D 7/227* (2013.01)

(58) Field of Classification Search

CPC ... H05B 6/00; H05B 6/06; H05B 6/10; H05B 6/101; H05B 6/103; H05B 6/107; H05B 6/108; H05B 6/12; H05B 6/1209; H05B 6/40; H05B 6/6108; H05B 6/6447; H05B 6/6482; H05B 6/6485; H05B 6/686; H05B 6/70; H05B 6/705; H05B 6/78; B05D 3/007; B05D 3/0254; B05D 3/0263; B05D 3/0281; B05D 3/029; B05D 3/147; B05D 3/207; B05D 7/14; B05D 7/22; B05D 7/222; B05D 7/227

See application file for complete search history.

(56) References Cited

U.S. PATENT DOCUMENTS

| | | | |
|---|---|---|---|
| 3,526,027 | A | 9/1970 | Manuel et al. |
| 3,726,711 | A | 4/1973 | Hogstrom |
| 3,743,777 | A | 7/1973 | Hanus |
| 3,804,663 | A | 4/1974 | Clark |
| 3,894,237 | A | 7/1975 | Choate et al. |
| 3,899,611 | A | 8/1975 | Hall |
| 4,008,401 | A | 2/1977 | Holoubek et al. |

(Continued)

FOREIGN PATENT DOCUMENTS

| | | | |
|---|---|---|---|
| CN | 1852771 | A | 10/2006 |
| CN | 101516528 | B | 10/2012 |

(Continued)

OTHER PUBLICATIONS

PCT Notification of Transmittal of ISR and WO, International Search Report, Written Opinion of the International Searching Authority dated Sep. 2, 2021 in corresponding PCT Application No. PCT/US2021/036748.

(Continued)

*Primary Examiner* — Hung D Nguyen
(74) *Attorney, Agent, or Firm* — Lippes Mathias LLP

(57) ABSTRACT

An improved can drying and curing technology is provided.

20 Claims, 14 Drawing Sheets

(56) References Cited

U.S. PATENT DOCUMENTS

| | | | |
|---|---|---|---|
| 4,009,050 | A | 2/1977 | Beyer |
| 4,009,364 | A | 2/1977 | Ladstädter |
| 4,297,583 | A | 10/1981 | Nerod |
| 4,327,665 | A | 5/1982 | Arrasmith |
| 4,333,246 | A | 6/1982 | Sullivan et al. |
| 4,535,549 | A | 8/1985 | Lala et al. |
| 4,565,713 | A | 1/1986 | Schultz |
| 4,665,626 | A | 5/1987 | Berkmann et al. |
| 4,694,586 | A | 9/1987 | Reznik |
| 4,722,982 | A | 2/1988 | Tanaka |
| 4,759,946 | A | 7/1988 | Ribnitz |
| 4,820,365 | A | 4/1989 | Brumm et al. |
| 5,254,164 | A | 10/1993 | Masahumi |
| 5,721,286 | A | 2/1998 | Lauf et al. |
| 5,821,504 | A | 10/1998 | Sprenger |
| 5,847,370 | A | 12/1998 | Sluka et al. |
| 6,432,191 | B2 | 8/2002 | Schutt |
| 6,872,895 | B2 | 3/2005 | Cochran et al. |
| 6,918,762 | B2 | 7/2005 | Gill et al. |
| 7,220,378 | B2 | 5/2007 | Cochran et al. |
| 7,227,166 | B2 | 6/2007 | Cochran et al. |
| 7,425,296 | B2 | 9/2008 | Cochran et al. |
| 7,432,453 | B2 | 10/2008 | Cochran et al. |
| 7,432,480 | B2 | 10/2008 | Wilson et al. |
| 7,488,965 | B2 | 2/2009 | Cochran et al. |
| 8,662,876 | B2 | 3/2014 | Plantamura |
| 9,282,851 | B2 | 3/2016 | Cochran et al. |
| 9,329,091 | B2 | 5/2016 | Cochran et al. |
| 9,451,658 | B2 | 9/2016 | Baxter et al. |
| 9,883,551 | B2 | 1/2018 | Widitora et al. |
| 10,237,924 | B2 | 3/2019 | Widitora et al. |
| 10,278,410 | B2 | 5/2019 | Widitora et al. |
| 10,687,391 | B2 | 6/2020 | Cochran et al. |
| 10,857,722 | B2 | 12/2020 | Cochran et al. |
| 10,871,326 | B2 | 12/2020 | Scholey |
| 11,052,435 | B2 | 7/2021 | Cochran et al. |
| 11,072,094 | B2 | 7/2021 | Cochran et al. |
| 11,184,955 | B2 | 11/2021 | Katz et al. |
| 11,633,758 | B2 | 4/2023 | Cochran et al. |
| 2003/0178136 | A1 | 9/2003 | Bohm |
| 2006/0280825 | A1 | 12/2006 | Cochran et al. |
| 2007/0022624 | A1 | 2/2007 | Chu Yuk Man |
| 2007/0065608 | A1 | 3/2007 | Niederst |
| 2008/0305358 | A1 | 12/2008 | Rudolph et al. |
| 2009/0047531 | A1 | 2/2009 | Bartley et al. |
| 2009/0102083 | A1 | 4/2009 | Cochran et al. |
| 2009/0181180 | A1 | 7/2009 | Poullos |
| 2011/0002677 | A1 | 1/2011 | Cochran et al. |
| 2012/0063752 | A1 | 3/2012 | Cochran |
| 2013/0048653 | A1 | 2/2013 | Boltshauser |
| 2013/0176358 | A1 | 7/2013 | Yamada et al. |
| 2015/0175289 | A1 | 6/2015 | Zumbach |
| 2016/0074894 | A1 | 3/2016 | Gillest et al. |
| 2017/0191754 | A1 | 7/2017 | Jing et al. |
| 2017/0326586 | A1 | 11/2017 | Wagner et al. |
| 2017/0369603 | A1 | 12/2017 | Gibanel et al. |
| 2018/0265729 | A1 | 9/2018 | Gibanel et al. |
| 2020/0017305 | A1 | 1/2020 | De Carvalho Costa |
| 2020/0122495 | A1 | 4/2020 | Ojima et al. |

FOREIGN PATENT DOCUMENTS

| | | | |
|---|---|---|---|
| CN | 103727230 | A | 4/2014 |
| CN | 108971898 | A | 12/2018 |
| DE | 2 316 086 | A | 10/1974 |
| DE | 25 14 397 | A1 | 12/1975 |
| DE | 10 2009 056 320 | A1 | 8/2010 |
| EP | 0 469 774 | A1 | 2/1992 |
| EP | 2 778 103 | A1 | 9/2014 |
| EP | 3 192 587 | A1 | 7/2017 |
| FR | 2 110 193 | A1 | 6/1972 |
| FR | 2 139 027 | A1 | 1/1973 |
| FR | 3 101 807 | A1 | 4/2021 |
| GB | 1 433 963 | A | 4/1976 |
| GB | 1 445 070 | A | 8/1976 |
| JP | 48-008853 | B | 3/1973 |
| JP | 50-008836 | A | 1/1975 |
| JP | H 09216281 | A | 8/1997 |
| JP | 2003-327248 | A | 11/2003 |
| JP | 3791963 | B2 | 6/2006 |
| JP | 2010-180352 | A | 8/2010 |
| WO | WO 2006/010141 | A2 | 1/2006 |
| WO | WO 2014/031095 | A1 | 2/2014 |

OTHER PUBLICATIONS

Bob Brady, "NICE3 and Coors UV-Curable Coatings for Aluminum Can Production," 11 pages.

Shuisheng Xie, "Concise Aluminium Alloy Processing Manual," Metallurgical Industry Press, p. 1338.

Feng Gao et al., "Fundamentals of Building Materials Science," Tongji University Press, pp. 128-129.

EESR (Ep 21 82 2675)—Sep. 13, 2024, 10 pgs.

Nakamichi Toshihiko, "Film Formation—Curing Mechanisms of Thermosetting Coatings", Journal of the Japan Society of Colour Material, V. 62, N. 1, 1989, pp. 28-35 DOI:10.4011/shikizai1937.62.28.

NARROWBAND CAN MANUFACTURING

This application claims the benefit of and priority to U.S. Provisional Application No. 63/037,437, filed Jun. 10, 2020, entitled "Narrowband Can Manufacturing", and U.S. Provisional Application No. 63/094,601, filed Oct. 21, 2020, entitled "Narrowband Can Manufacturing", both of which are incorporated herein by reference in their entirety. Also, this application is a continuation-in-part application of U.S. application Ser. No. 16/853,536, filed Apr. 20, 2020, entitled "System and Method for Inside of Can Curing" (and claiming the benefit of and priority to U.S. Provisional Application No. 62/836,447, filed Apr. 19, 2019), which applications are incorporated herein by reference in their entirety.

BACKGROUND

In the process of manufacturing cans such as two-piece aluminum or steel beverage cans, it is necessary to apply a coating so that the raw aluminum or steel, out of which the can is made, never directly touches the product with which the can will ultimately be filled. Some liquids to be put into the can would be ruined by touching aluminum material. Other liquids might have an adverse chemical reaction with the aluminum such that the integrity of the container would be damaged. For example, beer will be destroyed with even the slightest contact with raw aluminum. Soft drinks, on the other hand, are often acidic enough that they will chemically etch into the aluminum surface which is already very thin, thus impairing its strength and integrity. Other products might be adversely affected in terms of a change in taste. Some processes are in use which coat the aluminum material while it still exists as flat cut-to-length or coil stock before it is formed into the final can shape. Most cans, however, are coated after they have gone through the forming process by which they are formed from the starting flat coil stock. There are two predominant processes for the manufacture of the modern food or beverage can. They go through either the draw-redraw process (D&R) or even more typically through the draw and iron process (D&I). The D&I process is sometimes referred to as the draw-wall iron process or DWI. In both processes, a drawn cup is produced from flat (usually) coil stock. That cup is then further processed by drawing an even deeper but final sized cup. The second step in the D&I process involves successively "ironing" the walls of the cup until they are at the correct and desired thickness and dimension. A substantial amount of engineering and experimentation has gone into the process and into the final developed shape at both the bottom and ultimately, in a later process, the neck of the can. The exact shape geometry is critically important so the finished can is able to sustain the pressure that will be exerted by the gases from the liquid food or beverage with which the can will be filled. This structural shaping is intended to hold the pressure along the sidewalls but ultimately has to prevent the dome shaped bottom from actually failing with what is referred to as bottom reversal failure.

To explain in more detail, using a typical draw and iron process (D&I or DWI) as an example, reference is made to FIG. 6. In FIG. 6, an example process 600 for forming cans using D&I is illustrated. As shown, cans are formed using an uncoiler (602), lubricator (604), cupper (606), bodymaker (608) and trimmer (610). Those of skill in the art will appreciate the form and function of these elements in the typical D&I process.

After the cans are in a straight-walled, un-necked can shape, they are washed using a washer (612) and dried using, for example, a gas dryer oven (614) at approximately 400° F. before being put through a coating process, including an interior coating process.

The coating process is initiated by optionally applying a base coat of ink to the exterior of the cans using a basecoater (616) and then drying any applied basecoat using an optional basecoater oven (618) operated at approximately 400° F. Next, the cans are run through a decorator (620) to apply the ink pattern to the outside surfaces of the cans and a bottom coater (622) to apply a layer of protective coating to the bottoms of the cans. The cans are next sent to a deco oven (624) (also operated at approximately 400° F.) to dry the applied exterior coatings.

Next, an internal coating process is initiated to coat the inside surfaces of the cans. The internal coating process generally involves a single file line of cans going through an internal coater (626), either an indexing starwheel or a continuous running starwheel, in which spray guns are actuated which coat the inside of the can. The spray guns are highly developed to direct a very fine mist of wet coating into the can such that all surfaces are covered. The can rotates under the spray gun during the operation to provide even coverage around the 360 degree inside perimeter of the can. Generally, the goal is for the can to rotate two to five revolutions while the interior is being sprayed. When wet, the coating looks like thin white paint adhering to the surfaces of the entire inside of the can. The cans are spun at high speed during the process to use centripetal force to even out the coating. It is important that the spray coating goes on at the right thickness so that it provides adequate coverage of the aluminum or steel can stock. It can be neither too thin nor too thick to perform properly. If it is too thick, it can cause runs and thick areas which may not cure properly and will waste coating. Immediately after the spray coating process, the cans must be thermally cured, in an inside bake oven known as an IBO (628).

The single file line of cans coming out of the spray coater is routed to mass conveying. The mass conveyor material handling groups the cans as close together as they can be nested several dozen wide across a wide conveyor which can range from 30-80" wide. The conveyor belting on which the cans are transported through the IBO (628) is designed to handle the repetitive rigors of high temperature so that the belting material can safely pass through the oven to convey the cans through the curing oven. The trip through the curing oven will typically take from two to four minutes. The oven will typically have multiple heat sections that the cans pass through progressively. A typical IBO oven configuration would introduce the cans to the first section of oven which would subject the cans to 200-270° Fahrenheit for about 60 seconds as a pre-heat. Section or zone two would raise the temperature to 270-400° for another roughly 60 seconds. The final section or zone 3 would typically hold the temperature at 380-450° Fahrenheit for approximately a final 60 second cure. The cans spend a total of about 180 seconds in the oven, which timing may vary some, but this represents the traditional circumstance.

As the mass conveyed cans exit the IBO, the epoxy coating on the inside should look virtually clear if properly cured. Clarity is an indicator but does not guarantee that the coating is fully cured. It must be tested in a lab to be certain. The concept with an IBO is to gradually bring the temperature of the mass conveyed cans up to the full curing temperature and then ascertain that it has been held at 380-450° Fahrenheit for at least a minimum number of seconds. This is the time necessary for the epoxy coating to start the binding or linking process which is required for proper, full curing. That linking process, once initiated by this "time at temperature", will continue until fully cured if it has actually been held above the 375° temperature for the designated time. As was mentioned, "clear" compound does not mean that it is properly cured. It will turn clear, even if the correct linking temperature has never been initiated if a slightly lower temperature at time was provided. It is also possible to over cure, which turns the coating yellow or creates blisters if the temperature was too high or if it was held at temperature too long. For example, if the coated cans are held at an elevated temperature for 15 minutes, it will cause visible yellowing or even blistering, which is obviously not an acceptable curing result. This typically can happen if the oven conveyor stalls for whatever reason with a load of cans still in the oven. Beverage cans typically incorporate 80-150 mg of total inside coating weight which must be cured properly.

After the cans exit the IBO (628), they are sent to a waxer (630) for further processing. After the waxer functions are completed, a necker (632) and flanger (634) are utilized to complete the can forming process, as those of skill in the art will appreciate. A light tester (636) may also be used. Last, the formed cans are sent to a palletizer (638).

This process is used worldwide and is widely accepted as the standard for safe food and beverage packaging in two-piece cans. The same or very similar process is often used on other types of cans as well.

Notably, however, current IBO ovens use an incredible amount of energy. Most of the ovens are natural gas fired but some are electric. Either type uses very large amounts of energy and takes up a large amount of floor space. The ovens require extensive maintenance because the belts on which the mass conveyance of the cans takes place must pass through the oven and see hot/cold cycles on a continuous 24/7 basis. The bearings, drive train, guides, and belting material itself are all subject to continual thermal and mechanical wear. Also, given the fossil fuel basis from which the oven usually gets its energy, there is sustainability as well as an air pollution question around the IBO ovens. Further, typically five large electric motors, totally about 95 HP, are required to run the belting as well as to continue to ventilate, exhaust, and scrub the oven-related air.

It is well known in the can manufacturing industry that the aluminum from which the can is made actually loses strength because of the time spent in the IBO. It is widely recognized because of the two to three minutes that the can spends at an elevated temperature, there is a de-tempering/annealing effect that takes place, thus weakening the 3004 aluminum alloy. While normal annealing takes considerably longer than these times, it is thought that the annealing takes place in a can body because the aluminum is so extremely thin that full heat penetration can occur and begin to affect the grain structure virtually immediately.

As a result of this de-tempering/annealing effect, cans have to be manufactured so they are actually stronger than the end specification. They lose about 8-10% of the bottom reversal strength that they are required to have for proper performance as a result of the IBO oven trip. They must maintain 92 to 95 PSI of pressure containment strength before "bottom reversal" for carbonated soft drinks, and 105 to 110 PSI for beer. This high-speed softening, de-strengthening or annealing has the effect of reducing the tensile and yield strengths of the aluminum alloy so that the aluminum has to be thicker in order to have the required strength compared to a non-annealed can.

Also, in the process of manufacturing two-piece cans, such as aluminum or steel beverage or food cans, it is necessary to apply oven-produced heat to the cans for several purposes, not merely for purpose of curing the inside of cans. Broadly speaking, these are drying the can after the washing process and curing the ink after the decorating process, as well as the noted curing the inside of can coating simultaneously with deep-curing the final depth of the decorator ink. U.S. patent application Ser. No. 16/853,536, filed Apr. 20, 2020 and entitled, "System and Method for Inside of Can curing," which is incorporated herein by reference in its entirety, details the inside of can curing including by using narrowband devices for irradiation. In traditional or conventional can manufacturing plants, however, all three of these oven types use very large quantities of natural gas on a continuing basis. The gas dryer oven (e.g. 614 in FIG. 6) which dries the cans after the washer, is configured as a very wide mass conveyor with the cans open end down so they can drain. The width of the conveyor can vary depending on the throughput of the plant, but is often from 20 to 40 standard 12-ounce cans wide. The drying oven often has a set point of between 400 and 420 degrees Fahrenheit and typically maintains a temperature from 25 to 50 degrees cooler than the actual set point. The time to travel through the oven is typically from 1.5 to 2.0 minutes at a conveyor belt speed which is typically between 15 and 25 feet per minute.

The washing process consists of multiple stages which usually is six stages. After a can comes out of the body maker, it is covered in the drawing fluid/cooling compound which is used to improve the processing. This must be washed off and cleaned before it can be further processed into a finished can. After the can exits the body maker, it usually slides down a set of trackwork on to some kind of conveyance means whereby it is merged together with many other cans to form a wide and contiguous flow of cans which merge on to the mass conveyor. The cans are at this point upside down so that the water will readily run out of them by gravity. As a mass group, the cans slowly proceed through the washer and get sprayed in two successive steps with (usually) hydrofluoric acid. Much of the acid drips out and they are then sprayed in three or four successive rinsing steps with deionized water, which hopefully rinses any remaining acid out of the inside of the cans. The cans continue along in mass into the drying oven. Most of the water has dripped out but some will still remain. The actual purpose for the drying oven is to heat the water so that it will evaporate out of the can completely leaving a dry can. Since the bulk fired hot air oven has no facility for heating just the water, it heats the can to the circa 400 degrees as well where it remains for much of the 1.5-2.0 minutes as it proceeds through the drying oven. This time at temperature accomplishes a surprising amount of annealing or weakening of the aluminum because it takes so long to dry the can. Since the aluminum is so thin and an excellent thermal conductor, the heat quickly soaks all the way through and begins the grain growth and weakening process.

The pin chain oven or deco oven as it is sometimes called (e.g. 624 in FIG. 6), is arranged to receive the can at the exit of the decorator. Its whole purpose is to transport the can through a drying oven without allowing the exterior surfaces of the freshly decorated can to touch anything. Any slightest touch will smear the ink that is still wet. Thus explains the unique appearance and structure of a pin chain conveyor. At its heart, it is a link belt or motorcycle chain style "belt" which is configured to zig and zag around a series of sprockets to take it through a serpentine or zig-zag path through the oven. The purpose for the serpentine path is to dramatically increase the dwell time that the can spends in the oven so that it has sufficient time to dry the ink. Each can rides on a pin which is somewhat longer than the inside depth of the can. Each pin is effectively an extension of the hinge pin that engages with the sprocket from each link. The spacing varies but they are generally arranged so that the cans are approximately spaced with one can diameter between each of the cans. The belt travels at a high rate of speed so that it can keep up with the output of the decorator which may be as high 2800 cans per minute. The serpentine weave of the belts of the pin chain conveyor create a plane through the oven. That plane is tilted back so that gravity helps hold the cans in place during their travel through the oven. The oven is gas-fired and creates a high acoustic noise level because of the blowers that blow super-heated air at the cans such that it functions like a convection oven. The heat set point is often in the range of 450 degrees but due to the openness of certain sections of the oven and the high air volume throughput, the actual maintained temperature is 60 to 90 degrees cooler than the set point. By default, the pin chain oven heats the plant substantially as well. Again, the specification will vary from plant to plant, but a can may typically spend between 15 and 25 seconds in the pin chain oven.

All three of these large ovens are inefficient in that they heat much more than just the cans that they intend to heat. They burn large amounts of natural gas or hydrocarbon-based fuels which basically heats the air which then secondarily heats the cans and coatings/water. This two-step heating process is a big contributor to the slow and inefficient heating of the cans. They are also large electrical energy consumers with many high horsepower motors running not only the conveyors themselves, but many blowers for purposes of directing and concentrating the heat as well as for scrubbing the exhaust air and facilitating appropriate exhaust. The composite of the three ovens also creates a very high heat plant situation which creates an uncomfortable working environment and can dramatically increase the HVAC costs, depending on where the plant is located. For plants which are located in an area of the world where it is desirable or required to air-condition it, this extra heat load is a huge energy consumer and large contribution to the carbon footprint.

The gas drying oven, pursuant to the inside washing, because it subjects the can to such high temperatures for 1.5 to 2.0 minutes, also contributes to the annealing or de-strengthening process in a similar way, but to a slightly less extent than the IBO oven. Similarly, this means that the can must be made out of more aluminum to have the same strength that a non-weakened can would normally have. So the drying oven not only uses very large amounts of hydrocarbon fuel and electrical energy along with high maintenance costs, it also weakens the can and reduces its ultimate strength and performance.

The pin chain oven creates similar problems but causes slightly less weakening as a result of the shorter exposure time. Although the can spends from 15 to 20 seconds generally in the pin chain oven, it usually has the highest set point temperature of 430 to 460 degrees Fahrenheit. Since the annealing effect is a combination of time and temperature, the pin chain oven contributes further to the weakening and annealing effect. The pin chain itself has many moving parts which need to be lubricated. In an exuberance to try to maintain adequate lubrication, the pin chain is usually over lubricated which then causes ongoing housekeeping and contamination problems. The pins themselves often have a tendency to get bent and cause their own loading, unloading, and crash issues. Again, the high maintenance costs, the high hydrocarbon fuel costs, and the inhibited can performance all are problems that the can manufacturing plant would like to reduce or eliminate.

SUMMARY

In one aspect of the presently described embodiments, a system for use in can manufacturing wherein cans are washed, decorated and/or a coating has been sprayed onto an inside surface of cans comprises a first station including a first array of semiconductor-based narrowband irradiation devices positioned to irradiate and dry the cans through a mesh or open-spaced belt of a mass conveyor or to individually irradiate and dry individual cans through selective elements of a serial conveyor, wherein the first station is configured to dry the cans in less than 60 seconds, a second station including a second array of semiconductor-based narrowband irradiation devices positioned to irradiate and cure ink applied to outsides of cans being transported on a conveyor, wherein the second station is configured to cure the ink in less than 20 seconds and a third station including a third array of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

In another aspect of the presently described embodiments, the first station is configured to dry the cans in less than 50 seconds, 40 seconds, 30 seconds or 20 seconds.

In another aspect of the presently described embodiments, the second station is configured to cure the ink in less than one of 15 seconds, 10 seconds or 5 seconds.

In another aspect of the presently described embodiments, at least one of the third station is configured to heat the cans to the critical linking or cross-linking temperature in the coating in less than one of 10 seconds, 5 seconds or 2 seconds, and the coating is optimized for narrowband curing.

In another aspect of the presently described embodiments, at least one of the first station drying the can in less than 60 seconds and the second station curing the ink in less than 20 seconds, prevents de-tempering or annealing from occurring in the can.

In another aspect of the presently described embodiments, a method for use in can manufacturing wherein cans are washed, decorated and/or a coating has been sprayed onto an inside surface of cans comprises with a first array of semiconductor-based narrowband irradiation devices at a first station, irradiating and drying the cans through a mesh or open-spaced belt of a mass conveyor or individually irradiating and drying individual cans through selective elements of on a serial, single-file conveyor, with a second array of semiconductor-based narrowband irradiation devices at a second station positioned after an ink decorator, then irradiating and curing ink applied to outsides of cans which are being transported on a conveyor and with a third array of semiconductor-based narrowband irradiation devices at a third station, individually and electrically heating inside surfaces of each can moved into a curing zone using optical elements positioned outside the open end of the can such that the coating on the inside surface of each successive can in a series of production cans is brought to a critical temperature to produce a linking curing process in the coating, with each of these three stations performing their drying or curing function in less than 20 seconds to prevent de-tempering or annealing or weakening from occurring in the can.

In another aspect of the presently described embodiments, the curing of the ink occurs in less than one of 15 seconds, 10 seconds or 5 seconds.

In another aspect of the presently described embodiments, the inside coating reaches the critical linking or cross-linking temperature is reached in less than one of 10 seconds, 5 seconds or 2 seconds.

In another aspect of the presently described embodiments, a system for use in can manufacturing wherein cans are washed, decorated and/or a coating has been sprayed onto an inside surface of cans comprises a first station including a first array of semiconductor-based narrowband irradiation devices positioned to irradiate and dry the cans through a mesh or open-spaced belt of a mass conveyor, the first array being positioned to face the inside of the cans and within a housing, the housing having a protective window positioned and sealed to prevent moisture from entering the array housing, the protective window being optically transparent at an applied wavelength, the first array also being provided with at least one of reflective baffles to guide irradiation towards the cans or optical elements to selectively spread or narrow beams of the irradiation, the system being configured such that the irradiation does not exit the system.

In another aspect of the presently described embodiments, the protective window is at least one of mounted at an angle to promote water runoff toward a trough or gutter positioned near an edge of the protective window or provided with an anti-reflective coating that is functional at applied narrow wavelength bands.

In another aspect of the presently described embodiments, the system further comprises at least one of fans or blowers to provide higher speed air flow at the mouths of the cans to remove water vapor more efficiently.

In another aspect of the presently described embodiments, the system further comprises a second station having a second array of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

In another aspect of the presently described embodiments, a system for use in can manufacturing wherein cans are washed, decorated and/or a coating has been sprayed onto an inside surface of cans comprises a first station including a first array of semiconductor-based narrowband irradiation devices positioned to irradiate and cure ink applied to outer surfaces of cans being transported on a pin chain, the first array being positioned along the pin chain to irradiate an outer surface of an oncoming can at a first angle, a second station including a second array of semiconductor-based narrowband irradiation devices positioned to irradiate and cure ink applied to the outer surfaces of the cans being transported on the pin chain, the second array being positioned along the pin chain to irradiate the outer surface of the oncoming can at a second angle, different from the first angle and corner cube reflector material strategically positioned relative to each station substantially orthogonal to a tangent of the outer surfaces of the cans and between arrays such that irradiation reflected from the outer surface of the cans subsequently reflects off the corner cube reflector material back to substantially a location on the outer surface of the cans proximate to where the irradiation originally reflected.

In another aspect of the presently described embodiments, the system further comprises a third station having a third array of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

In another aspect of the presently described embodiments, the system further comprises a plurality of additional stations including arrays of semiconductor-based irradiation devices to irradiate and cure ink applied to the outer surfaces of cans, each array being positioned at a strategic angle so the combination of the plurality of stations will irradiate the ink around the entire outer surface of each can.

In another aspect of the presently described embodiments, the system further comprises a ventilation system to carry vapor, including at least volatile organic compounds, from the first and second station to a thermal or catalytic destruction unit, wherein the ventilation system maintains the vapor at a minimum threshold temperature.

In another aspect of the presently described embodiments, the system further comprises a drying station including at least one array of semiconductor-based narrowband irradiation devices positioned to irradiate and dry the cans through a mesh or open-spaced belt of a mass conveyor or to individually irradiate and dry individual cans through selective elements of a serial conveyor, wherein the drying station is configured to dry the cans in less than 20 seconds.

In another aspect of the presently described embodiments, a system for use in a can manufacturing inside coating and curing process wherein coating has been sprayed onto an inside surface of a can comprises a can handling system configured to serially move production cans into at least one curing zone, arrays of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can and a ventilation system to carry vapor, including at least volatile organic compounds, to a thermal or catalytic destruction unit, wherein the ventilation system maintains the vapor at a minimum threshold temperature.

In another aspect of the presently described embodiments, a system for use in a can manufacturing inside coating and curing process wherein coating has been sprayed onto an inside surface of a can comprises a can handling system configured to serially move production cans into at least one curing zone, broadband infrared sources positioned to individually and electrically heat inside surfaces of each can moved into a curing zone using optical elements positioned to direct irradiation toward upper sidewalls of the inside surface of the can such that the coating on the inside surface of each successive can in a series of production cans is brought to a critical temperature to produce a linking curing process in the coating, in less than 20 seconds to prevent weakening, de-tempering, or annealing from occurring in the can body, a ventilation system to carry vapor, including at least volatile organic compounds, to a thermal or catalytic destruction unit, wherein the ventilation system maintains the vapor and outgassed compounds in the vapor at a minimum threshold temperature.

In another aspect of the presently described embodiments, a system for use in can manufacturing wherein cans are washed, decorated and/or a coating has been sprayed onto an inside surface of cans comprises a first station including a plurality of arrays of semiconductor-based narrowband irradiation devices positioned to irradiate and cure ink applied to outsides of cans being transported on a pin chain conveyor, wherein the arrays of the first station are configured to cure the ink in less than 20 seconds and a second station including a second configuration of arrays of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

In another one aspect of the presently described embodiments, a system for use in can manufacturing wherein cans are washed, decorated and/or a coating has been sprayed onto an inside surface of cans comprises at least one of a first array of semiconductor-based narrowband irradiation devices positioned to irradiate and dry the cans through a mesh or open-spaced belt of a mass conveyor or to individually irradiate and dry individual cans through selective elements of the serial conveyor, a second array of semiconductor-based narrowband irradiation devices positioned to irradiate and cure ink applied to outsides of cans being transported on a pin chain and a third array of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

In another aspect of the presently described embodiments, a method for use in can manufacturing wherein cans are washed, decorated and/or a coating has been sprayed onto an inside surface of cans comprises at least one of with a first array of semiconductor-based narrowband irradiation devices, irradiating and drying the cans through a mesh or open-spaced belt of a mass conveyor or to individually irradiate and dry individual cans through selective elements of on the serial conveyor, with a second array of semiconductor-based narrowband irradiation devices, irradiating and curing ink applied to outsides of cans being transported on a pin chain and with a third array of semiconductor-based narrowband irradiation devices, individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

In another aspect of with the presently described embodiments, a method for use in a can manufacturing inside coating and curing process wherein coating has been sprayed onto an inside surface of a can comprises generally transporting the cans toward at least one curing station and individually and electrically heating the cans using narrowband radiant infrared energy and optical elements positioned outside of the cans in the at least one curing station such that the coating on the inside surface of each successive can in a series of production cans is brought to a critical temperature to start a curing linking process in the coating, in less than 20 seconds to prevent de-tempering or annealing from occurring in the can.

In another aspect of the presently described embodiments, each can is formed from manufacturing tooling reconfigured to reduce a diameter of a cut edge of a blank from which a starting cup for the can is drawn whereby a thickness of coil stock aluminum is substantially the same as before tooling reconfiguration but such that the coil stock is narrower, thus reducing the weight of aluminum required to manufacture each can by greater than 3%.

In another aspect of the presently described embodiments, each can is formed using a can design and tooling that is modified to manufacture the can out of thinner coil stock material to reduce the aluminum from which the can is manufactured, whereby the heating to accomplish the linking curing process in less than 20 seconds eliminates a reduction in strength of the can such that the can will have similar sidewall axial strength, bottom reversal strength, and overall strength as compared to a thicker can cured for a longer time, which longer time weakened the metal.

In another aspect of the presently described embodiments, the electric curing of the coating is implemented by a narrowband, semi-conductor based radiant heating system.

In another aspect of the presently described embodiments, a semiconductor-based system producing the narrowband radiant energy may be turned on or off within microseconds and can heat the coating and/or the can to curing temperature in less than 10 seconds.

In another aspect of the presently described embodiments, a conveyer transports the cans during the curing process and utilizes continuous rotary motion whereby the at least one irradiation curing station is in continuous rotary motion synchronous with the cans being cured thereby and at least one of electrical power, cooling liquid, and control signals are connected to the at least one curing station through a rotary union.

In another aspect of the presently described embodiment, at least one of DC power supply, cooling heat exchanger, cooling chiller, cooling recirculation pump, and control system which serve the at least one curing station are moving in a rotary motion and synchronously with the cans, providing for a continuous rotary motion curing system wherein the continuous motion of the system helps in the cooling function.

In another aspect of the presently described embodiments, a conveyer transports the cans during the curing process and utilizes an indexing rotary motion whereby multiple irradiation curing stations are located around the periphery of, but not on, a turret such that a group of cans is serially loaded into a selected number of empty stations around the turret while the turret is rotationally indexing so that the cans are each under their respective narrowband curing stations, the curing stations are actuated to cure the cans and then the turret is again rotationally indexed, which takes the cured cans out while a new set of cans is indexed into their positions under the curing stations for curing and the process continues to repeat.

In another aspect of the presently described embodiments, cans are individually cured in less than 5 seconds.

In another aspect of the presently described embodiments, narrowband semiconductor devices emit the narrowband radiant infrared energy at a wavelength matched to an absorption characteristic of the coating on the inside surface of each successive can.

In another aspect of the presently described embodiments, a wavelength of the narrowband radiant infrared energy used to heat is in a range of one of 800 nm to 1200 nm, 1400 nm to 1600 nm, and 1850 nm to 2000 nm.

In another aspect of the presently described embodiments, the narrowband infrared radiant energy used to heat is produced using at least one of semiconductor-based irradiation devices, light emitting diodes (LEDs) and laser diodes.

In another aspect of the presently described embodiments, the semiconductor devices that produce the irradiation are configured in multi-device arrays which combine the optical output power of more than 10 individual semiconductor devices to produce a total optical output power of more than 100 watts.

In another aspect of the presently described embodiments, the semiconductor devices are laser diodes and such that the full width/half max output bandwidth is narrower than 20 nanometers.

In another aspect of the presently described embodiments, the semiconductor devices are surface emitting laser diodes whose full width/half max output bandwidth is narrower than 2 nanometers.

In another aspect of the presently described embodiments, the energy sources are comprised of arrays of surface emitting laser diodes producing their photonic energy output between 825 to 1075 nanometers.

In another aspect of the presently described embodiments, material/can handling facilitates individual curing of one lane of cans at production speeds in excess of 300 cans per minute.

In another aspect of the presently described embodiments, multiple parallel curing stations are arranged to individually cure at a total throughput speed in excess of 1,800 cans per minute while running all lanes except one, that lane being available for any maintenance that may be required or to provide additional production if needed so that a higher level of overall up-time may be achieved.

In another aspect of the presently described embodiments, the method eliminates hydrocarbon-based fuel use and more than 3% of aluminum is saved in a can manufacturing process as a result of higher speed, under 20 second curing which eliminates annealing and weakening of aluminum of a can body.

In another aspect of the presently described embodiments, specific additives are added into the coating specifically to interact with the narrowband infrared light to improve performance or the functionality of the cured coating.

In another aspect of the presently described embodiments, the method facilitates reformulation of the coating to eliminate BPA or other undesirable components in the coating formulation.

In another aspect of the presently described embodiments, equipment configurations of the curing method can be started and stopped easily without deleterious effect on the cans or the production process.

In another aspect of the presently described embodiments, implementation provides the ability to instantaneously and while in motion respond to modulation of the method as a result of sensory gained information from an inspection system.

In another aspect of the presently described embodiments, a system for use in a can manufacturing inside coating and curing process wherein coating has been sprayed onto an inside surface of a can comprises a can handling system configured to serially move production cans into at least one curing zone, arrays of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in less than 20 seconds to prevent de-tempering or annealing from occurring in the can.

In another aspect of the presently described embodiments, the arrays of semiconductor-based narrowband irradiation devices and the optical elements are positioned just outside a top plane of a cut edge of the cans and aim over 90% of narrowband infrared photonic energy produced by the semiconductor-based narrowband irradiation devices into an interior of a can being cured with the majority of energy being focused on the upper half of the sidewall so that the internal reflections expose the lower portions of the can.

In another aspect of the presently described embodiments, the optical elements comprise at least one micro-lens array aligned with respective devices of the arrays of semiconductor-based narrowband irradiation devices to form columnated energy, a condenser lens configured to focus the columnated energy toward and through a pinhole or aperture element and into an interior of a can being cured, and the pinhole or aperture providing an opening through the vortex of a reflective engineered shaped surface which functions to redirect narrowband energy which otherwise would have escaped from the can, back into the can.

In another aspect of the presently described embodiments, the reflective conical surface is equipped with ventilation slots or openings to facilitate vapor removal from a curing can.

In another aspect of the presently described embodiments, the reflective engineered surface is roughly conical and is made of one of copper, aluminum, gold plated metal, silver plated material, and highly reflective nano-structure.

In another aspect of the presently described embodiments, the optical elements and the arrays of semiconductor-based narrowband irradiation devices are mounted in a housing configured to prevent stray infrared energy from escaping from the housing, except through the pinhole or aperture element and is configured with a recirculating water cooling arrangement to keep the arrays and optical elements at an acceptable operating temperature in the production curing environment.

In another aspect of the presently described embodiments, the arrays of semiconductor-based narrowband irradiation devices includes at least one array of laser diodes which are positioned outside the can and the corresponding optical elements are articulated into the inside of each can during at least a portion of the curing.

In another aspect of the presently described embodiments, the optical elements comprise an objective lens configured to receive energy from the arrays of semiconductor-based narrowband irradiation devices via an optics and mirror assembly and the system further comprises insertion and withdrawal mechanisms to translate the optical elements into the cans through reflection containment plates configured to be positioned above each can so that the optical transfer of energy is aligned when the insertion mechanism positions a portion of the optical assembly inside the can so the irradiation can be activated when the optical train is positioned properly inside the container to effect the curing.

In another aspect of the presently described embodiments, a system for use in can or container manufacturing for curing a coating which has been sprayed onto the inside walls of said containers comprises an ingoing trackwork or conveyor configured to organize or facilitate movement of individual containers into single-file order toward a second conveyor, the second conveyor being configured as a rotary turret to move the individual containers into and away from at least one curing station, the at least one curing station comprising an optical configuration wherein photonic energy from at least one array of surface emitting laser diodes passes through columnating optics and then is focused by at least one condensing lens element through a pinhole or aperture where beyond the photonic energy diverges to irradiate inside sidewalls of a coated container, such pinhole or aperture being located at the vertex of a reflective cone such reflective cone functioning to reflect photonic energy back into the container to effect further curing work, wherein the coating is cured in less than 20 seconds, thus being fast enough to prevent weakening or annealing from taking place in aluminum comprising the container, the second conveyor means delivering the containers and being guided off to a third conveyor configured to bring the container out and away from the second conveyor so empty pockets are available to load waiting uncured cans to continue the serial curing while the cured containers are transferred on the third conveyor toward subsequent container manufacturing operations.

In another aspect of the presently described embodiments, the subsequent manufacturing operations include an inspection station located on the third conveyor, the function of which inspection station is at least to verify veracity of the coating and curing by way of imaging inside each container and searching for bare metal areas, and to the extent that an imaged quality level of the cured coating is not sufficient, rejecting the container with a faulty coating at a rejection station which is configured into the third conveyor after the inspection station and then sending signals to at least one of a coating system control system and a curing control system to correct the respective process.

In another aspect of the presently described embodiments, a system for use in can or open top container manufacturing for curing a coating which has been sprayed onto the inside surface of said container comprises an ingoing trackwork or conveyor configured to move single-filed individual containers toward a second conveyor, the second conveyor being configured to use a rotary motion table to move said containers into and away from at least once curing stations, the at least one curing stations incorporating one of an engineered reflector which will serve to re-direct the photonic energy from the arrays through the open top of the container and directly onto the sprayed coating on the inside surfaces of the container to effect curing process, wherein the coating is cured in less than 20 seconds, thus being fast enough to prevent weakening or annealing from taking place in aluminum comprising the container, the second conveyor configured to rotate to provide for exit for already cured containers to a third conveyor while new, uncured cans are serially loaded into the vacated positions, the third conveyor configured to receive the already cured containers an exit and convey them along toward next container manufacturing operations.

In another aspect of the presently described embodiments, the second conveyor is a rotating configuration which has multiple curing stations located around a periphery, each of which can be functioning simultaneously to cure the inside of a container with infrared energy produced by at least one laser diode array.

In another aspect of the presently described embodiments, the multiple curing stations comprises more than 8 curing stations.

In another aspect of the presently described embodiments, the second conveyor is a rotating configuration which has multiple curing stations which are rotated in synchrony with the containers so curing can continue without starting or stopping rotation of a table and wherein at least one of the electrical power, cooling, and control signals are connected to the curing stations through at least one rotary union.

In another aspect of the presently described embodiments, the ingoing trackwork or conveyor is configured to use gravity to advance the containers which are single-filed and pressure of gravity to feed each individual can into the second conveyor.

In another aspect of the presently described embodiments, a system for use in a can manufacturing inside coating and curing process wherein coating has been sprayed onto an inside surface of a can comprises a can handling system configured to serially move production cans into at least one curing zone, and broadband infrared sources positioned to individually and electrically heat inside surfaces of each can moved into a curing zone using optical elements positioned to direct irradiation toward upper sidewalls of the inside surface of the can such that the coating on the inside surface of each successive can in a series of production cans is brought to a critical temperature to produce a linking curing process in the coating, in less than 20 seconds to prevent de-tempering or annealing from occurring in the can, and a control system configured to use sensor information to modulate output of the broadband infrared sources to maintain consistent curing temperature and results.

DRAWINGS

DETAILED DESCRIPTION

Figure 1:
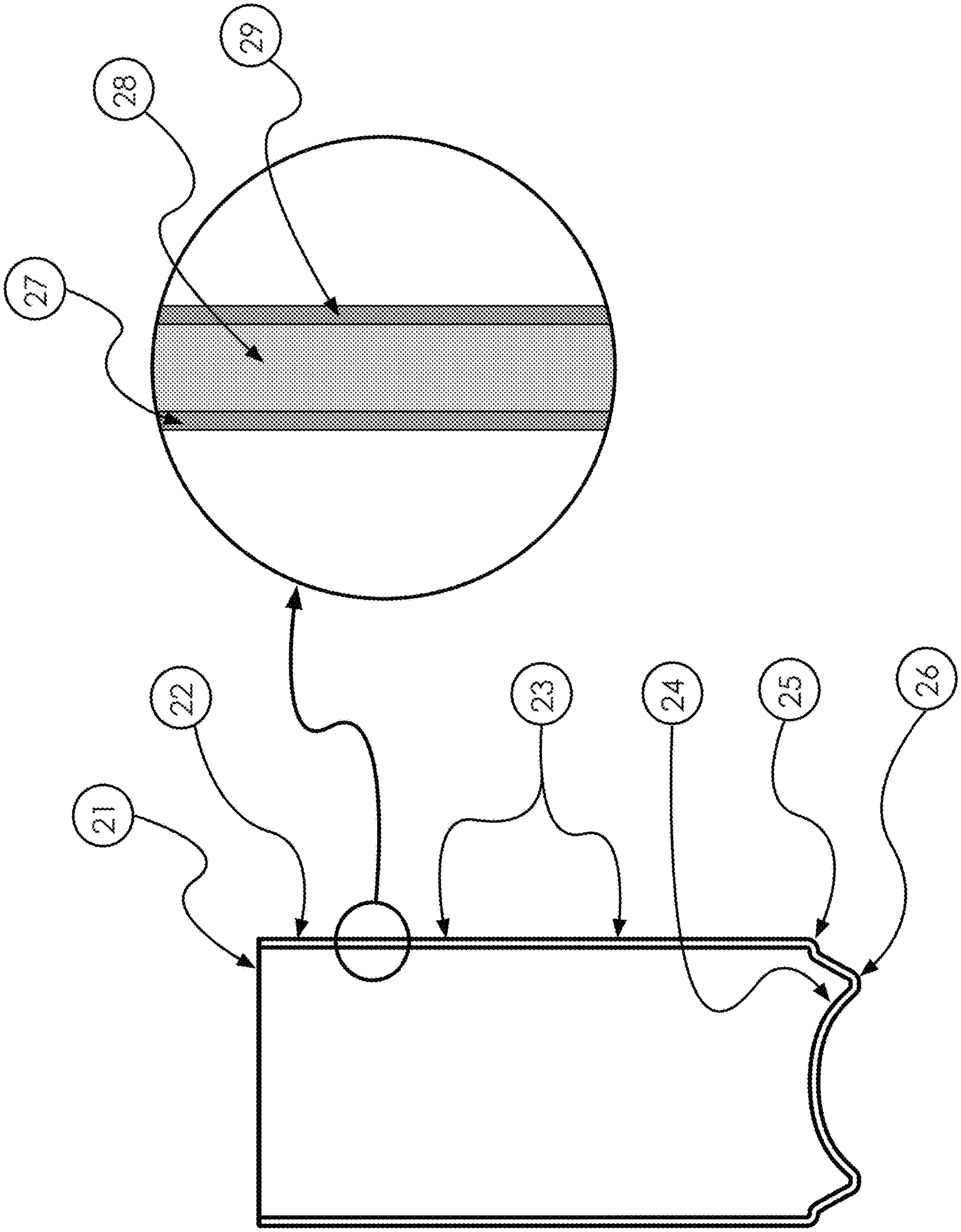
FIG. 1 shows an exemplary can to be cured using the presently described embodiments.

The presently described embodiments teach a completely new concept for applying heat to cans including for 1) curing the coating on the inside of food, beverage, and other types of cans, 2) drying cans after washing and 3) curing ink or coatings on the outside of cans. According to the presently described embodiments, many of the implementations are suited to replace all or selected ones of the conventional ovens used in can manufacturing including, the gas dryer oven, the deco oven, and/or the inside bake ovens (IBOs) (and/or, in some cases, the basecoater oven) described above in connection with the known techniques to form cans. That is, all or selected functions described herein in connection with the above identified curing the inside coating, drying the cans, or curing ink or coatings on the outside of cans, or various combinations of these functions, may be implemented.

In accordance with the presently described embodiments, increased efficiency in performance is achieved in a variety of ways. For example, the curing and drying times are decreased advantageously. For example, applying the presently described embodiments to curing the inside of can coatings at a curing station may result in heating the cans to reach a critical temperature to produce a linking (or cross-linking) curing process in the coating in, for example, less than 20 seconds (or, as further examples, less than 10 seconds, or 5 seconds or 2 seconds). For example, applying the presently described embodiments to curing of ink or coatings on the outsides of cans at a curing station may result in curing the ink or coating on each can in, for example, less than 20 seconds (or, as further examples, less than 15 seconds, or 10 seconds or 5 seconds). For example, applying the presently described embodiments to drying cans, e.g. each can serially or each can or a group of cans among a mass of cans, at a drying station may result in drying the can(s) in, for example, less than 20 seconds. Performing each of these drying and/or curing functions in less than 20 seconds prevents de-tempering, annealing or weakening from occurring in the can(s). Also, in the embodiments where all three, or two, functions are performed, with each of the irradiation or drying or curing stations performing their drying or curing functions in less than 20 seconds, de-tempering, annealing or weakening is prevented from occurring in the can. In at least one alternative, the drying (after washing) function may be implemented to consume 60 seconds or less (or, as further examples, less than 50 seconds, 40 seconds, 30 seconds, or 20 seconds), wherein de-tempering, annealing or weakening of cans may still be prevented.

First, inside of can curing will be described in connection with FIGS. 1-8. The drying after washing and ink curing techniques will be described, generally referring to FIGS. 9-14 (with reference to other figures as necessary).

In this regard, one preferred implementation contemplates using, at an inside of can curing station(s), narrowband, semi-conductor produced infrared energy which is focused into the inside of the can to affect a very high-speed curing result. It contemplates using focused high powered, radiant energy that will directly impact the coating and the side walls of the inside of the can to rapidly transmit energy to both the coating material and the walls of the can which will then both reflect and re-radiate back into the coating material. This high powered radiant, narrowband energy will be introduced directly into each individual can and will bounce around at the speed of light inside the can until virtually all of its energy is absorbed into the coating and the aluminum substrate.

While it is possible to affect the same magnitude of direct radiant energy into the inside of a can with broadband sources, for a host of reasons, a narrowband source is a preferred and likely most ideal solution. Broadband sources, such as quartz lamps could be used but many of the advantages are not achieved and the implementation is not as beneficial. It is, however, possible to implement and practice the presently described embodiments with broadband sources. For example, quartz lamps, high intensity discharge, or arc lamps could be utilized. They tend to have wavelength output bands that are a short enough wavelength range to be focused with normal glass optics. Normal optical glass starts to become ineffective, however, at wavelengths above about 2.7 microns, so much of the upper end of most broadband light sources and resistive heating sources will not pass through focusing optics without heating up the optics to sometimes excessive temperatures. Instead of focusing the thermal photonic energy with refractive optics, one can use reflective optical configurations. For example, a generally conically shaped reflector or an ellipsoidal, circularly symmetrical mirror can be used to focus the infrared energy on the inside of the upper sidewall of the can or container. That is the optimum area to have the energy hit the inside of the can because from there the internal reflections will distribute it from that preferred starting area. At the kind of production speeds we are addressing for can coating curing, the various broadband sources would almost assuredly have to be on continuously because they cannot be switched off and on at the kinds of rates necessary for this application. While it can be done, it would also be expensive to equip such a system with the switching electronics to, for example, handle the 2,000 to 3,000 Watt quartz bulbs which would be needed for each curing station. Much care would need to be taken to ensure that the cans are heated to the temperature that is needed to accomplish the linking curing action but not so hot that it anneals the can's aluminum body. Close monitoring of the can temperatures and the ability in the electronic controls to modulate the broadband device outputs would be extremely desirable. One of the fundamental advantages of this the presently described embodiments is to eliminate the weakening effect on the aluminum in order to facilitate using less weight of aluminum to manufacture a can of equal strength to the ones resulting from the conventional process that is almost universally used currently in the world can industry. One additional consideration with broadband sources is that they have an inherently shorter service life than the semi-conductor devices that are being used for narrowband sources. The life is shorter, for example, for a quartz lamp but it also continues to have less photonic output as it wears itself out. The electronics must be capable of modulating the power up to continuously account for the reduced output. Monitoring sensors can be employed just as they can with narrowband devices to provide feedback as to the can temperature and therefore the completeness of the curing.

There are many narrowband sources that could be implemented (e.g. in all embodiments described herein, for example, all embodiments described in connection with FIGS. 1-14) including high-powered lasers, various semi-conductor-based irradiation devices, laser diodes, edge emitter laser diodes, VCSEL laser diodes, surface emitting laser diodes including SE-DFB laser diodes, laser arrays, and even light emitting diodes (LEDs) such as high-powered LED arrays. Multiple device arrays (e.g. more than 10 devices per array) could be used to produce output power (e.g. more than 100 watts). Although the presently described embodiments can be executed with other modalities, high-powered, laser diode arrays because of their ease of implementation and efficacy will be a preferred implementation. Also, various examples and implementations of narrowband sources or arrays, including semiconductor narrowband infrared sources or arrays such as laser diode arrays, are described in, for example, U.S. application Ser. No. 11/003,679, filed Dec. 3, 2004 (now U.S. Pat. No. 7,425,296), U.S. application Ser. No. 12/718,899, filed Mar. 5, 2010 (now U.S. Publication No. 2011/0002677 A1), and U.S. application Ser. No. 12/718,919, filed Mar. 5, 2010 (now U.S. Pat. No. 9,282,851)—all of which are hereby incorporated herein by reference.

Narrowband energy also facilitates better optical precision because the wavelengths are similar enough to focus nearly identically, which is not the case with broadband radiant sources. In some implementations, coatings on optics, such as anti-reflective coating, can be optimized to be very efficient at the specific wavelength or narrow range of wavelengths being employed.

Because laser diode arrays can be digitally switched, instantly on and instantly off, they will facilitate a nice variety of possible implementations of the presently described embodiments. They also can be configured so that they can be optically handled in a number of convenient ways to facilitate getting the right energy directed into the can to the exact areas where it is needed for effective implementation of the high speed curing. The present disclosure will teach a number of optical implementations and a number of can handling mechanical implementations which are possible examples, depending on the exact application and preferences of the implementer of the presently described embodiments.

If the presently described embodiments are practiced effectively, it should be possible to affect a system which will cure the coating on the inside of a can as quickly as one second. With enough power from the radiant source, it is even possible to cure in less than a second, if the coating is so formulated to start the linking process sufficiently fast. It should be appreciated that any reduction of curing time compared to the conventional methods will result in an improvement in overall efficiency, benefits and results. Notably, as the curing times decrease to less than a minute, for example, the improvement substantially increases. As further examples, curing times of less than 30 seconds, less than 20 seconds, less than 10 seconds, less than 5 seconds, less than 2 seconds and (as noted above) less than 1 second, show even greater improvement. If the time for curing is fast enough, for example, less than 20 seconds in at least one embodiment or, as a further example, less than 30 seconds in at least another embodiment, annealing of the can will be prevented. Shorter curing times (e.g. less than 10 seconds, less than 5 seconds, or less than 1 second) likewise result in an avoidance of annealing. If the annealing effect can be prevented, it will prevent the need to over-strengthen the can to maintain enough remaining strength after the curing process. This can be a huge advantage to the can manufacturer because approximately 70% of the bill of materials and manufacturing cost of the average can is the cost of the aluminum material that is used to make the can. If the 8-10% over-strengthening of the can is not required, there is a huge potential material savings and thus a very large cost savings. Heretofore, there has never been a way of doing high speed curing at production speeds to prevent the need for over-building the can. This is a completely novel thought because the manufacturers have always had to over-build the can to maintain enough strength because it was not possible with previous thinking to cure at these rapid rates. The cans have historically been cured in mass conveying. The presently described embodiments introduce high speed, narrowband curing of each individual can.

It is useful to outline the many advantages that will accrue from a proper implementation of the presently described embodiments. Reducing the amount of material is a major advantage in the manufacturing of cans. An alternative savings could be a slightly less alloyed aluminum which could be available at a lower cost than the current more highly alloyed aluminum. A further advantage of the presently described embodiments is the width of the aluminum coil stock could be reduced as a result of a shorter cut edge length, thus a smaller diameter on the drawn cup. A reduction in width then means lower cost, and higher reliability in the feeding equipment and coil handling equipment. It also means a narrower bed, double action stamping press can be purchased and implemented as well as smaller, lighter, and higher speed press tooling. A narrower press bed also means greater machine rigidity and lower moving mass which results in longer press life and longer tool life. The cupper tooling which makes a smaller diameter cup will be cheaper initially and replacement tooling components will also be cheaper because there are smaller diameters involved and there is less tool steel involved. Another advantage is that the presently described embodiments use, for example, a digital, narrowband curing system which facilitates changing and precisely tuning the curing parameters to improve or optimize levels and the overall curing process. A further advantage is that this tuning can be done dynamically to correspond perfectly to any chosen production speed and for improved or optimum energy savings. A closed loop process can also be developed which will verify the veracity of the curing and correct any under-curing or over-curing that may be occurring. Also, by verifying the curing in a real-time way, either with machine vision inspection, laser scanning, or other, the amount of curing energy can be optimized. This can be used to save further energy by not injecting more joules of energy into the can that would truly be needed for a proper cure. A further advantage is that the presently described embodiments facilitate, in some embodiments, putting an additive in the coating which will absorb more readily and more optimally at the chosen wavelength, thus paving the way for an even lower energy cure and potentially a higher throughput speed. The presently described embodiments have a further advantage of facilitating tremendous energy savings. Yet a further advantage is the elimination or near elimination of any hydrocarbons or fossil fuels in the curing process. Still further advantages accrue from the evenness with which the can will be cured within itself and compared to other surrounding cans. Another advantage is the ability that the system will provide to instantly stop and instantly start the production line with minimal deleterious results. A similar advantage is the elimination of the pre-heating that is required before production line startup whether it is from cold or for a warm line after a shut down. A further related advantage is the avoidance of the necessity to clear an oven and scrap the cans as a result of unscheduled stoppages, power outages, and the like. Other quality advantages result from the ability to more casually stop the line without deleterious results, a practice which is avoided by users of the current technology because of a fear of such deleterious results. Further advantages are created by eliminating the unwanted extra plant heating that occurs around an IBO oven, which in many climates will reduce the need for extra plant cooling or air conditioning. Further advantages include the reduction or elimination of hydrocarbon-based fuel use. Yet a further advantage of the presently described embodiments is the ability to switch over from one type of can to another very quickly and fully under programmable control. Yet another advantage occurs from being able to service part of the curing portion of the line while the balance of the line continues to run since the individual single file curing lanes can be serviced independently. This brings the further advantage of being able to run more continuously and eliminate the need for periodic shutdown for oven maintenance. Ultimately, this should result in more production throughput and less downtime.

Now, with reference to the drawings, a narrowband, high-speed inside of can curing technique described in connection with the presently described embodiments can be practiced in a number of different ways. The varying ways of practicing the presently described exemplary embodiments are primarily concerning two general areas. The first is how to arrange the system such that the cans are introduced to and taken away from the narrowband irradiation source, and the second is how the narrowband irradiation is generated and directed specifically into the areas where it is needed on the inside of the can.

In accordance with the presently described embodiments, a two-piece beverage can with inside coating that will be cured typically comprises sections described hereafter as they are commonly known in the industry and as shown in FIG. 1. Although other shapes and configurations can be cured, such as cans with tapered walls, most two-piece cans are still of the configuration that will be detailed here for the education on practicing the presently described embodiments. In this regard, a can (22) comprises a straight vertical wall (23) that extends from the moat (26) and heel area (25) to the top of the can. The very top of the un-necked, straight-walled can (22) is typically referred to as the trimmed edge or trim edge (21). The inside coating and subsequent curing operations typically occur on the straight-walled, un-necked can (22). It is necked and flanged in a later operation in the area near the trim edge in a necker/flanger machine operation. At the bottom of the can (22), there are formed areas starting with the bottom section of the wall (23) which is called the heel (25) that transitions into the moat area (26) and then ultimately into the arched dome area (24) at the central bottom portion of the can (22). These various sections of the can (22) have been engineered and thoroughly tested to hold up under the pressure that is required for soft drink or beer containers, which pressure ranges generally in the range of from 90 to 110 PSI. The base metal (28) out of which the entire body of the can (22) is manufactured, is most typically manufactured from an aluminum alloy #3,004. This alloy has been chosen and standardized upon by most of the industry for its combination of strength, formability, and resilience for the can making process and application. To be sure, this alloy is more expensive than a straight aluminum material and anything that can be done to facilitate manufacturing a fully capable can from a lower alloy material will save money for the manufacturer.

The exterior surface of the can (22) is typically coated or printed with layer(s) (29) of coatings or ink, as shown. The entire inside surface of the can (22) with current industry practices is coated with a layer, such as layer (27), of epoxy-based material which is baked on to properly cure it. The industry specifications for a properly cured coating are well known in practice within the industry and are part of the manufacturer's specifications. It is, of course, completely unacceptable to have any areas on the inside of the can which have not been coated completely or properly cured. The can manufacturing industry is constantly concerned about making sure that the coating is all correctly cured and that there are no voided areas where uncured epoxy exists in the finished product. Coatings other than epoxy have been experimented with but have not been rolled out widely. If the other types of coating or partial coatings need heat or thermal curing, the presently described embodiments will be quite workable for those as well. The same is true for newer coatings which reduce or eliminate the BPA in the coatings which are thermally cured.

Although there are two primary areas requiring design attention, the first challenge that is encountered by one practicing the presently described embodiments is how to generate the powerful narrowband irradiation. The designer's first impulse is to try to configure something that can be inserted into the can which will irradiate in a multi-directional, if not with a 360° pattern. While this is possible, most of the technology which is available to generate high powered, narrowband energy is considerably larger than that which can be inserted into the can through the un-necked top of a beverage can. It is certainly possible, as technology shrinks and narrowband energy devices produce more power, more efficiently and in a smaller package, that this will become more practical. Regardless of the size of the energy-producing devices, a problem with an "inserted into the can" technique is that it involves many more moving parts and mechanisms. The insertion/retraction motion would have to occur between 200-400 strokes or insertions per minute, and that speed is likely to increase in the future. This assumes that the entire production flow through a can manufacturing line is divided into six to eight curing lanes, each running at the 200 to 400 cans per minute throughput rate. In this regard, for example, a typical production speed may be approximately 300 cans per minute or more. Nonetheless, the concept of inserting and withdrawing an irradiation source from the can is a viable implementation technique, but will require more mechanism in order to insert and withdraw the irradiation sourcing arrangement at this rapid rate. It would be expected that it would be more complicated and therefore requiring more maintenance than a non-articulated arrangement which does not enter through the opening plane of the can body.

Instead of inserting and withdrawing the actual source of the narrowband irradiation, the portion that can be inserted and withdrawn can be just the optics or some form of light guide to direct the narrowband irradiation which is produced outside the can into the proper locations on the inside of the can. This can take the form of the fiber optic light guide which is configured to gather the energy from one or more narrowband source or sources and deliver it into the can. For example, if a single very high-powered laser were used to provide the narrowband radiant energy, the fiber optic light guide could be coupled to it in a location that would locate it safely away from the rigors, vibration, and contaminants of the actual curing station. It would be necessary to design the correct lensing or diffusing at the exit end of the fiber optic light guide to produce the output pattern that will adequately irradiate the coating on the inside of the can.

The light guide could also take the form of a lensing configuration (see FIG. 3) which is arranged to gather the narrowband energy near the sources (32) and then project it through a final objective lens configuration (38) and a mirror assembly (34) which is at the exact right focal length when the articulation mechanism (33) has it completely inserted into its irradiation position inside the can (22). The photonic energy (30) would be directed down a tube (35) to the output of the objective lens (38) inside the can (22) in combination, possibly with additional diffusers (37), could then directly irradiate the coating (27) on the inside of the can. Many different permutations of the lensing and the light guide type approach can be configured by one skilled in the art of high energy lensing and optical designs. The vertical insertion and withdrawal mechanism (33) would ideally have a containment reflection plate arrangement (36) to keep the photonic energy in the can by reflecting energy back into the can. It would also keep the arrangement safer by making sure the irradiation is all delivered into the can's interior. All of the components and mechanisms would have to be designed such that they could handle the rigors of being moved at high speeds into and withdrawn from the can to meet the requirements of high-production manufacturing. This methodology may prove to be an excellent way of irradiating the inside of the can with an even irradiation pattern, but will require much in terms of articulating mechanism and engineering and, therefore, more cost to implement. It has the distinct advantage of providing a very direct way of projecting the narrowband irradiation to the coated surfaces for excellent results. It has the disadvantage of putting an impediment (35) into the can which will block some of the reflected energy (39) that needs to continue to hit coated surfaces until its energy is exhausted. It will itself (35) become a reflector, but that will waste some of the energy (30) that is lost during a reflection on an uncoated surface. It will also impart considerable heat to the optical assembly (35) & (34) which must be dealt with and removed.

Figure 2:
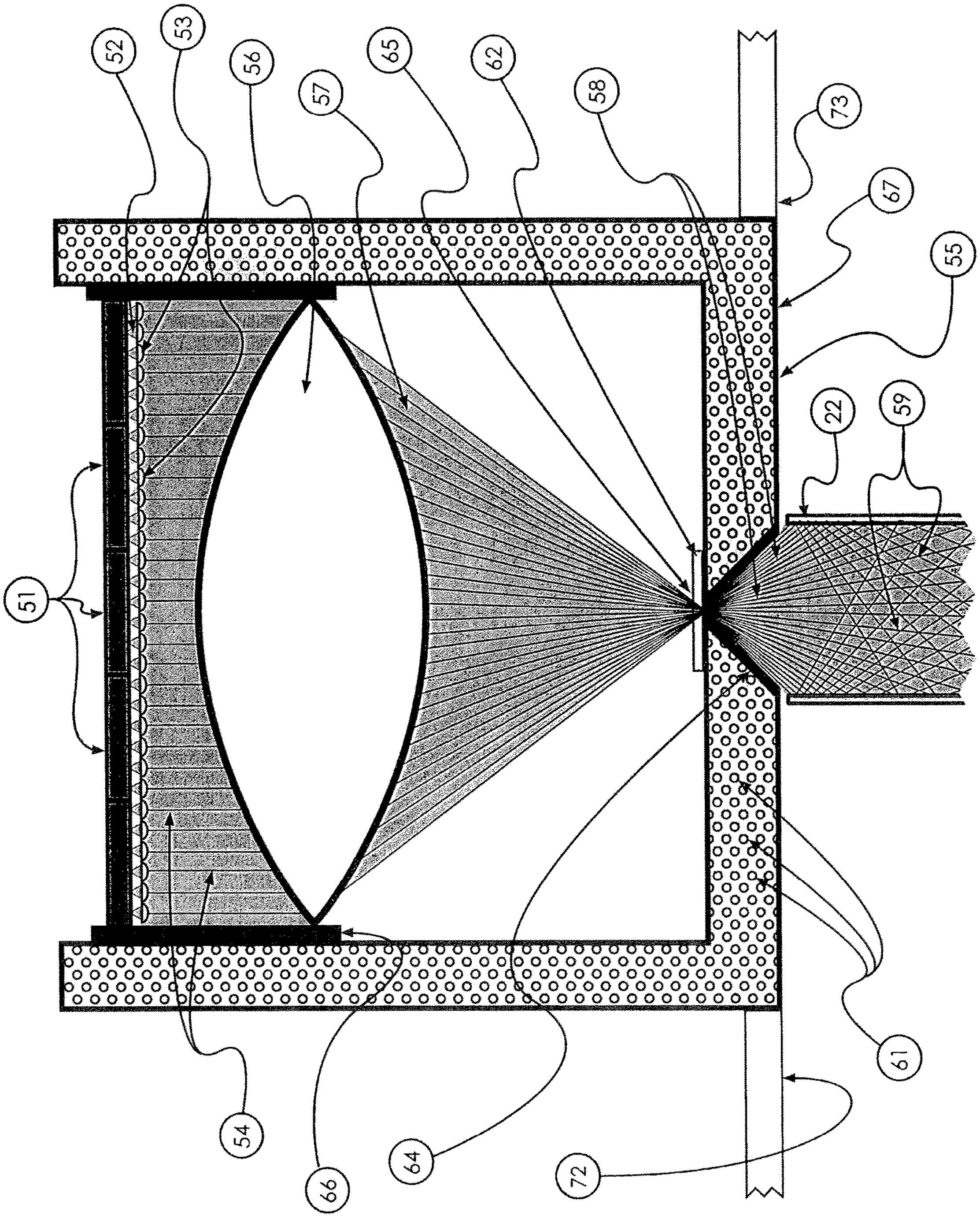
FIG. 2 shows a system according to the presently described embodiments.
Figure 3:
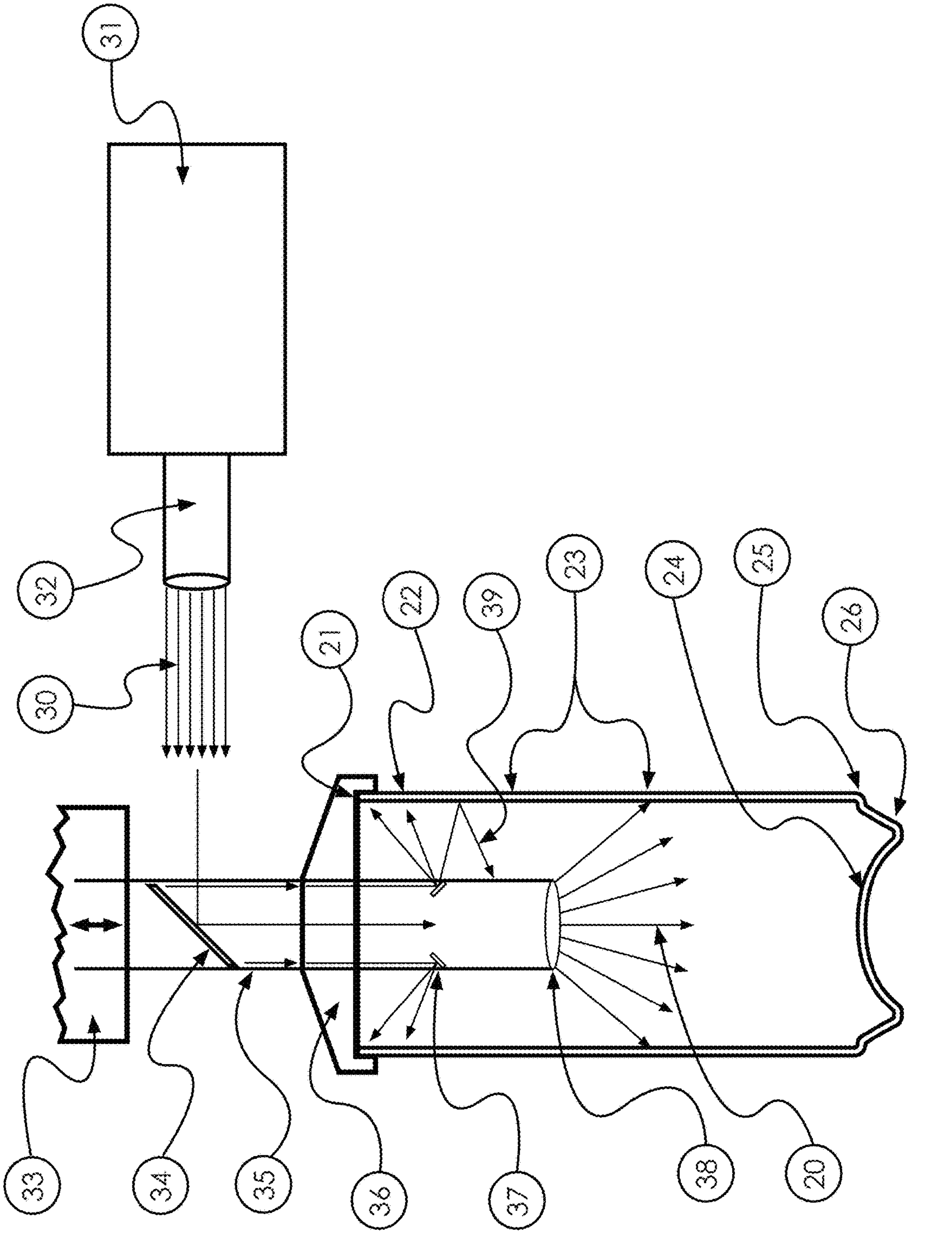
FIG. 3 shows another system according to the presently described embodiments.

Another technique for providing the irradiation energy to the inside of the can (22) is shown in FIG. 2. It comprises a design concept whereby no components break the plane of the trimmed edge (21) by protruding into the can's interior. The assumption is that the irradiation mechanism does not have to articulate into and out of the can but rather can be in some manner fixed just slightly above the can and still provide sufficiently and properly dispersed irradiation into the can. In this regard, an optical system may be incorporated into and/or used in conjunction with the irradiation system. A well-designed optical irradiation system, in at least some embodiments, will be able to focus a relatively high percentage, for example, over 95% or over 90%, of the optical energy that emerges from the optical configuration directly and evenly into the interior of the can for curing purposes. Since the aluminum is highly reflective at these infrared wavelengths and since the can is cylindrical, much internal reflection is reliably predicted. For most implementations, care should be taken in the design to make sure that energy that is randomly reflected out through the open top of the can is reflected back into the can to continue the internal reflection process until the energy is exhausted. Because the infrared light energy is traveling at the speed of light, plenty of reflections can occur within the seconds long exposure time for high speed curing.

This configuration relies on the reality that the aluminum is highly reflective in not only the visible and near-infrared, but also in the short-wave infrared waveband. If the plane of the bottom of the narrowband irradiation assembly is located, for example, about 0.030" to 0.045" away from the top trimmed edge of the can (21), it is close enough to not have excessive energy losses through the gap, but it is close enough that sufficiently good transfer of energy will occur at the necessary angles to efficiently cure the coating by bouncing the energy around the inside of the can. It needs to be close enough that the cone or conical surface (64) is able to interface with the can's interior geometry to return most of the energy that is reflected out the open top of the can, back into the can. The conical surface could be formed of a variety of different materials including copper, aluminum, gold plated metal, silver plated metal and/or highly reflective nano-structure material.

The embodiment shown in FIG. 2 may also be modified. In this regard, with reference to FIG. 7, a reflection cone (64), or whatever geometry is chosen, should in most embodiments also provide, most optimally, for ventilation of the water vapor out of the can by positioning louvers accordingly. The louvers (74) must be shaped so they are reflectors facing the interior of the can but with spaces between the louvers to provide for vacuum air flow through vacuum port or vent tubes 75. The well designed airflow system should actually be both pushing air into the can as well as pulling vapor-laden air out of the can through the louvers (74) or venting holes in the reflection cone.

If a 90° included angle (69), for example, is designed into the interior geometry of the cone (64), it will serve as an excellent multi-angle reflector to reflect or return the narrowband energy back into the can for further curing. The energy may, depending on the wavelength chosen, bounce around the inside of the can hundreds or even thousands of times until all of the energy has been absorbed into the coating (27) or the substrate aluminum (28).

A primary purpose of the optical arrangement shown in FIG. 2 (or FIG. 7) is to inject photonic energy into the inside of the can (22) as shown. In one example, narrowband photonic radiant energy is generated in arrays (51) at the top of the diagram in FIG. 2. The array or arrays (51) can have any number of laser diodes connect to an appropriate electric power supply. The designer of an array can use a combination of series and/or parallel connections of the laser diode devices to attain his desired current and voltage input preference to suit the system that he is designing. This will determine the current capacity and voltage required from the power supply. Choosing the right combination will allow optimization of the power supply specifications. The laser diodes can be of an edge emitter design or a surface emitting type of design. The surface emitting design has substantial robustness advantages because the effective aperture is much larger and therefore less susceptible to damage from contaminants. The traditional edge emitters are most often coupled to fiber optic light guides to provide for a better way of getting the narrowband energy to the optical train without exposing their rather fragile apertures to the difficult environment and contaminants that might cause catastrophic aperture failure. The additional cost and assembly complications related to the fiber optic coupling to the devices makes the traditional edge emitting laser diodes a viable solution for practicing the presently described embodiments but less desirable and much more costly than other solutions. On the other hand, surface emitting types of laser diodes often do not need to be fiber coupled. They can usually be configured to directly irradiate into an optical configuration which will guide the narrowband output into the can directly. This arrangement may, in some cases, make them more vulnerable because they are closer to the curing location, but elimination of the fiber coupling can save a great deal of cost and provide for more reliability in the overall configuration. Regardless of which type of device might be chosen for the application, it must be mounted in a housing (55) in such a way that its optical output is directed toward the condenser lens (56). In at least one embodiment, the housing is configured to prevent stray infrared energy from escaping the housing, except through a pinhole element or a suitably sized aperture element (described below), although a variety of configurations of the housing could be implemented. The output of the laser diodes will either be diverging in two directions—a fast axis and a slow axis, or diverging in a single direction. In the case of an SE-DFB, the output is columnated in one direction, and has a slow divergence in the other. With an SE-DFB, the slow axis would be considered the columnated direction and the fast axis would typically be diverging at 7-10°. If a VCSEL is used as the narrowband, photonic energy generating device, it has a conical output pattern. Regardless of which type of laser diode is chosen, they must be packaged and configured in multiple device arrays so their total output power is sufficient. With SE-DFB's, VCEL's, and any other surface emitting devices, they can be packaged onto cooled circuit boards in an X by Y or some other pattern, but such that the energy is largely directed orthogonally to the mounting circuit board.

The arrays can certainly be of varying sizes to execute the presently described embodiments. In at least some embodiments, arrays may be built and used for inside can curing which range in total output from 250 watts to over 500 watts. For example, a 500 watt array could be comprised of 50 surface emitting laser diodes, each of which can produce 10 watts of optical narrowband near-infrared power. This may not be enough optical power to perform the inside coating curing in a specified time, so multiples of same array may be the designer's best configuration. One assay showed that a single 300 watt laser diode array was able to properly cure an extra-thick layer of inside coating in under 10-15 seconds without careful attention paid to an optimized optical arrangement. An example of a proper optical configuration, such as the example shown in FIG. 2, could distribute the photonic energy exactly where it is needed for improved uniformity and a much faster cure. This optical configuration will ensure that less photonic energy is wasted and will effect a much faster curing time. By ganging up the right number and design of arrays, it is quite reasonable in an improved (e.g. up to optimized) and production engineered configuration, to cure the epoxy coating inside each individual can in under a second. It should be appreciated that the optical configuration, in at least some embodiments, could be designed or tuned to deposit desired amounts of energy in desired locations on the inside of the can. For example, an optical configuration could be implemented that deposits more energy at the top of the inside sidewall surface of the can and smooths out the decrease in energy down the sidewall of the can. Various optical elements (for example, refractive, reflective, non-linear, aspheric or other elements) could be used to accomplish these objectives and others to suit the needs of a particular configuration.

In such an improved or optimized configuration, with continuing reference to FIG. 2 (and FIG. 7), optics or a microlens array (52) could be selected so that it creates columnated energy (54) directed in parallel with the central optical axis of the system. Once the columnated energy has been produced and is directed toward the condensing lens (56), the output energy (57) will converge toward a focal point that is in the pinhole (65), then the light energy will cross in the pinhole (65) and become diverging rays (58) as it then is headed toward the coating on the inside of the can (22). Once the photonic energy has reached the walls of the inside of the can having passed through the first layer of coating (27), there will be a reflection off the inside wall of the can (28) such that the energy passes back through the coating (27) again. The photonic energy will continue to process through the coating (27) and bounce off the walls (28) and back through the coating (27), as shown for example at (59), until it has imparted all of its energy to the coating and the can wall. Some of those bounces will also impact the reflection cone surface (64) and will then bounce back into the can and continue the process. The cone surface (64) should either be fabricated from or be coated with a highly reflective material. It may be copper, silver coated, gold coated or other such that it is as highly reflective of the particular wavelength of infrared that is being utilized as possible. The pinhole (65) & (71) is in a plate (62) which is designed to be replaceable to provide for easy maintenance to maintain a clean sharp pinhole area. The pinhole size (which could be, as but one example, 3 mm) and sidewall shape should be the smallest that the optical configuration can accommodate such that virtually all the focused photonic energy passes through the hole without depositing energy on the pinhole plate (62), but not an unnecessarily large opening in the plate (62) and the cone (64). It should be appreciated, however, that a suitably sized aperture may be used as or in place of the pinhole (65). In this regard, a pinhole such as pinhole (65) may well be implemented for systems according to the presently described embodiments that require more precise focusing of the irradiation into the inside of the can. However, such arrangements (which may generate more heat or have a higher implementation cost) may not be necessary for all configurations. Accordingly, any suitably sized aperture, for example, apertures that have a diameter smaller than the opening of the top of the can, could be implemented to achieve desired results. In this regard, such an aperture, as but one example, could be smaller than 2 inches, or another dimension dependent on the size of the can. The reflection structure (64) which can be formed in whatever geometrical shape that serves the best to reflect energy back into the can, is also made so that it can be replaced for easy renewing and to provide a clean reflective surface. It can be quickly and easily replaced periodically when necessary, and should be designed such that it can be done with minimal tools. The angle of the reflective cone insert (64) should be carefully modeled so that reflects the maximum amount of energy back into the can, given the particular shape of the can's geometry. The housing (55) should be made out of a material which can handle the scattered reflections of the infrared radiation that it will be containing. It preferably should be designed with cooling holes (61) throughout it so that water or a coolant can be circulated through the housing to keep it cool at all times. This is necessary to keep it at a comfortable operating temperature so that the semiconductor device arrays (51) are not trying to operate in too warm an ambient environment. The laser diode arrays (51) should have some form of cooling as well. They can be cooled by a refrigerant circulation system through the actual arrays or it could be deionized water. In a most desired implementation, it could be plain water circulation through the arrays. If the devices are highly efficient, as may be the case in the future, gas or liquid coolant may not be needed and air cooling with heat sinks and fans may be adequate to keep the devices in a comfortable operating temperature range. The housing (55) may also have cooling facilities so that any of the components that are mounted there, including the optics and the laser diode arrays, are not seeing too much heat. Again, the cooling for the housing (66) can either be a recirculating water jacket or could be a forced air-cooling arrangement. It should also be appreciated that bottom surface (67) is, in at least one form, configured to control reflections of any escaping energy from the inside of the can (22). Although a variety of configurations and/or techniques could be implemented to accomplish this objective, as shown, the surface (67) is provided with grooves, e.g. deep grooves, to provide such control over any escaping energy. No matter the configuration of the bottom surface (67), the flush mating surfaces before and after the housing (55), should be engineered and assembled so that the incoming surface (73) is at the same level as the farthest reach of the bottom surface (67) of the housing (55). The outgoing surface (72) must also be at the same level or slightly higher than the farthest reach of the bottom surface (67) of the housing (55) so that a bump is not encountered by the trim edge surface of the top of the can (22).

With these various techniques, it is possible to use a broadband infrared irradiation source such as quartz lamps or high energy discharge lamps and the like. They are, however, more difficult to precisely focus the energy. They are not as energy efficient at producing the most efficient wavelengths to match the coating for best and fastest curing. They will inherently run much hotter because of the way they fundamentally produce their output energy. This will require much additional engineering to keep everything cool and to not completely overheat the cans. If the cans are overheated, they can be annealed or de-tempered even if it is for a brief period of time duration. These broadband infrared sources will have less control over the heat imparted to the cans and there will be a requirement to modulate their output as a function of the throughput speed. But, while they cannot be turned on and off quickly and in a precise way like the semiconductor-based irradiation, this can be modulated with careful engineering. For example, as noted above, broadband electrical infrared components such as quartz lamps, high intensity discharge lamps, or arc lamps could be utilized. Again, instead of focusing the thermal photonic energy with refractive optics, one can use reflective optical configurations. For example, a suitably engineered reflector arrangement, a generally conically shaped reflector or an ellipsoidal, circularly symmetrical mirror can be used to focus the infrared energy on the inside of the upper sidewall of the can or container. That is the optimum area to have the energy hit the inside of the can because from there the internal reflections will distribute it from that preferred starting area. In this regard, the configuration shown in FIG. 3 (and also the configuration shown in FIG. 2) could be suitably modified to implement a broadband embodiment wherein the radiation source is implemented with a broadband source and the optical elements are implemented using reflective, as opposed to refractive, elements and arranged to aim or direct the radiation at the upper sidewalls of the inner surface of the can.

Figure 8:
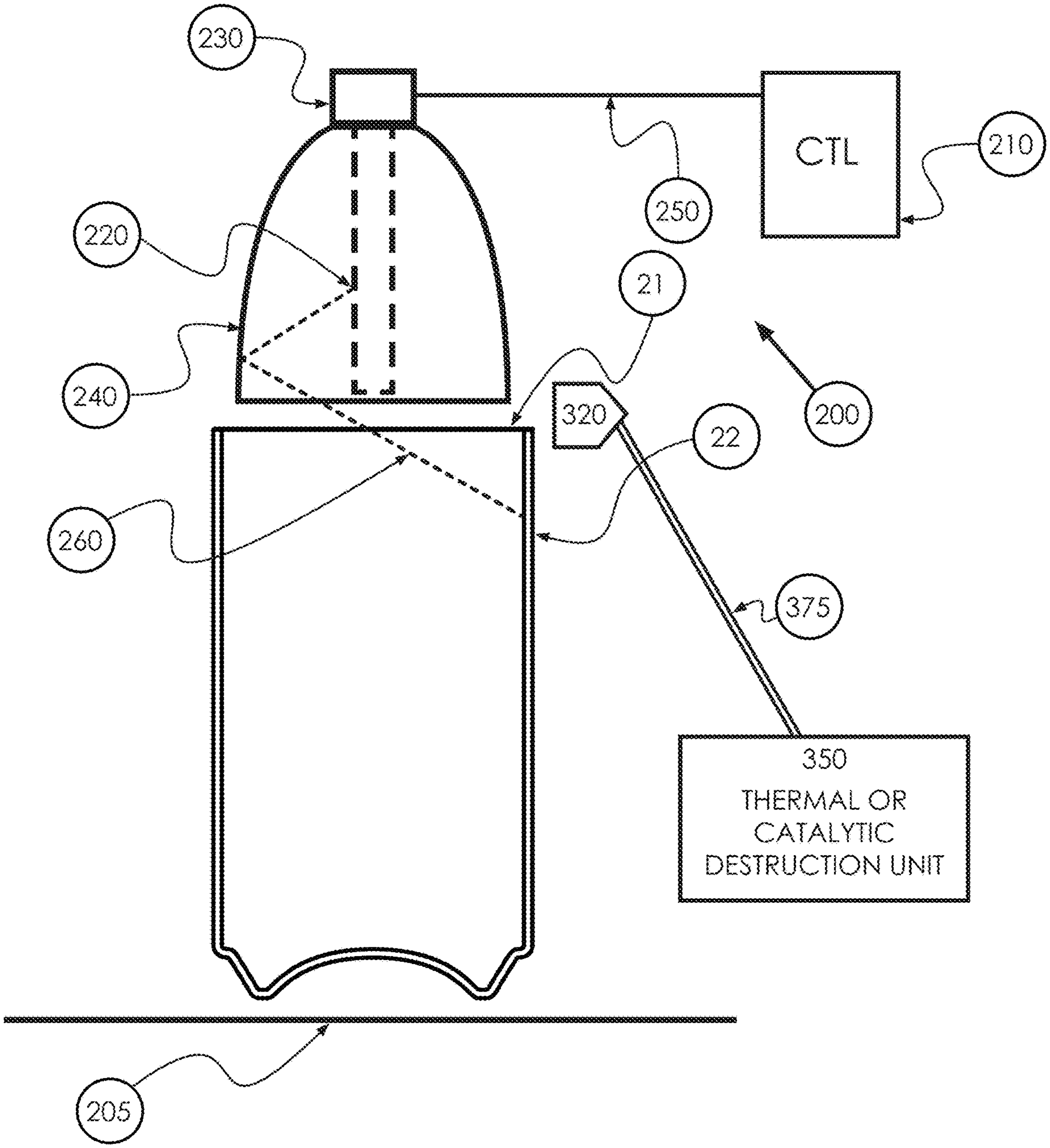
FIG. 8 shows another system according to the presently described embodiments.

Also, with reference now to FIG. 8, a broadband infrared system 200 is representatively illustrated. The system 200, for use in a can manufacturing inside coating and curing process wherein coating has been sprayed onto an inside surface of a can, includes comprises a can handling system 205 (not shown in detail) configured to serially move production cans into at least one curing zone. In addition, the system 200 includes broadband infrared sources, such as broadband infrared source 230 including quartz lamp 220, positioned to individually and electrically heat inside surfaces of each can 22 (shown in cross-section) moved into a curing zone using optical elements 240 positioned to direct irradiation (representatively shown at 260, for example) toward upper sidewalls of the inside surface of the can such that the coating on the inside surface of each successive can in a series of production cans is brought to a critical temperature to produce a linking curing process in the coating, in less than 20 seconds to prevent de-tempering or annealing from occurring in the can. The system is also provided with a control system 210 (connected using a link 250—which could take a variety of forms and is only representatively shown) configured to use sensor information (not shown) to modulate output of the broadband infrared sources to maintain consistent curing temperature and results. Although the form of such a system 200 may vary, as shown, the optical elements may take the form, as describe by example above, of a suitably engineered reflector arrangement, a generally conically shaped reflector or an ellipsoidal, circularly symmetrical mirror used to focus the infrared energy on the inside of the upper sidewall of the can or container 22. In at least one form, such optical elements would be of a size at least slightly smaller than a diameter of the container or opening of the container, such as container 22, to allow for a suitable transmission of energy into the can and appropriate maintenance of that energy in the can for curing purposes.

However, as noted herein, the precise digital control and precision energy control favors the semiconductor solution. The semiconductor-based irradiation configuration should have a much longer life and much more consistent output during that useful life. While broadband sources may have a useful life of several thousand hours, their output will drop continually during that time, so it must be modulated carefully to ensure a consistent curing result. They will not all wear at the same rate, so it will be an engineering challenge as well as a chronic maintenance problem to make sure that the irradiant output of each lamp is adequate to ensure proper curing.

Figure 4:
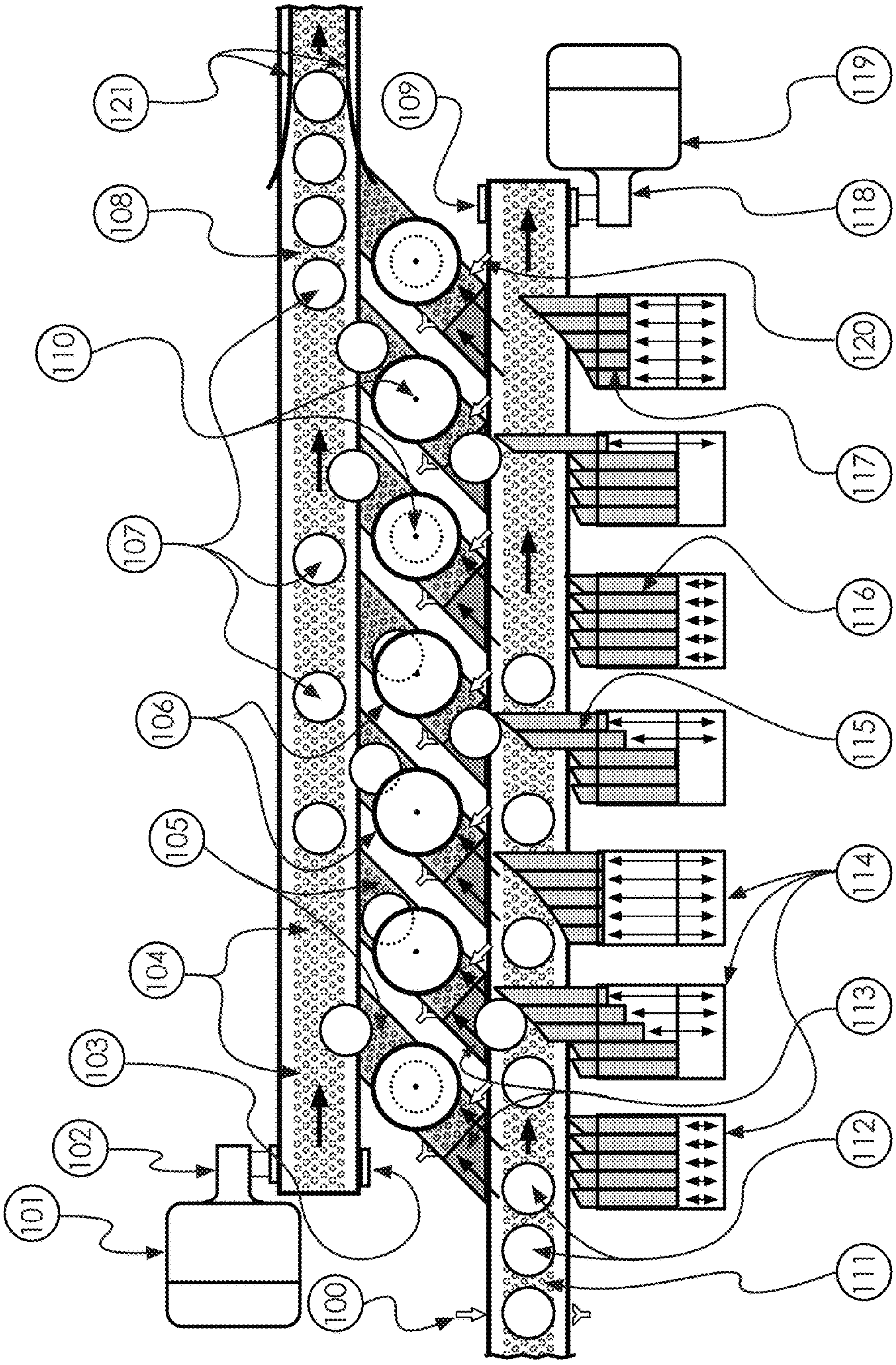
FIG. 4 shows another system according to the presently described embodiments.
Figure 5:
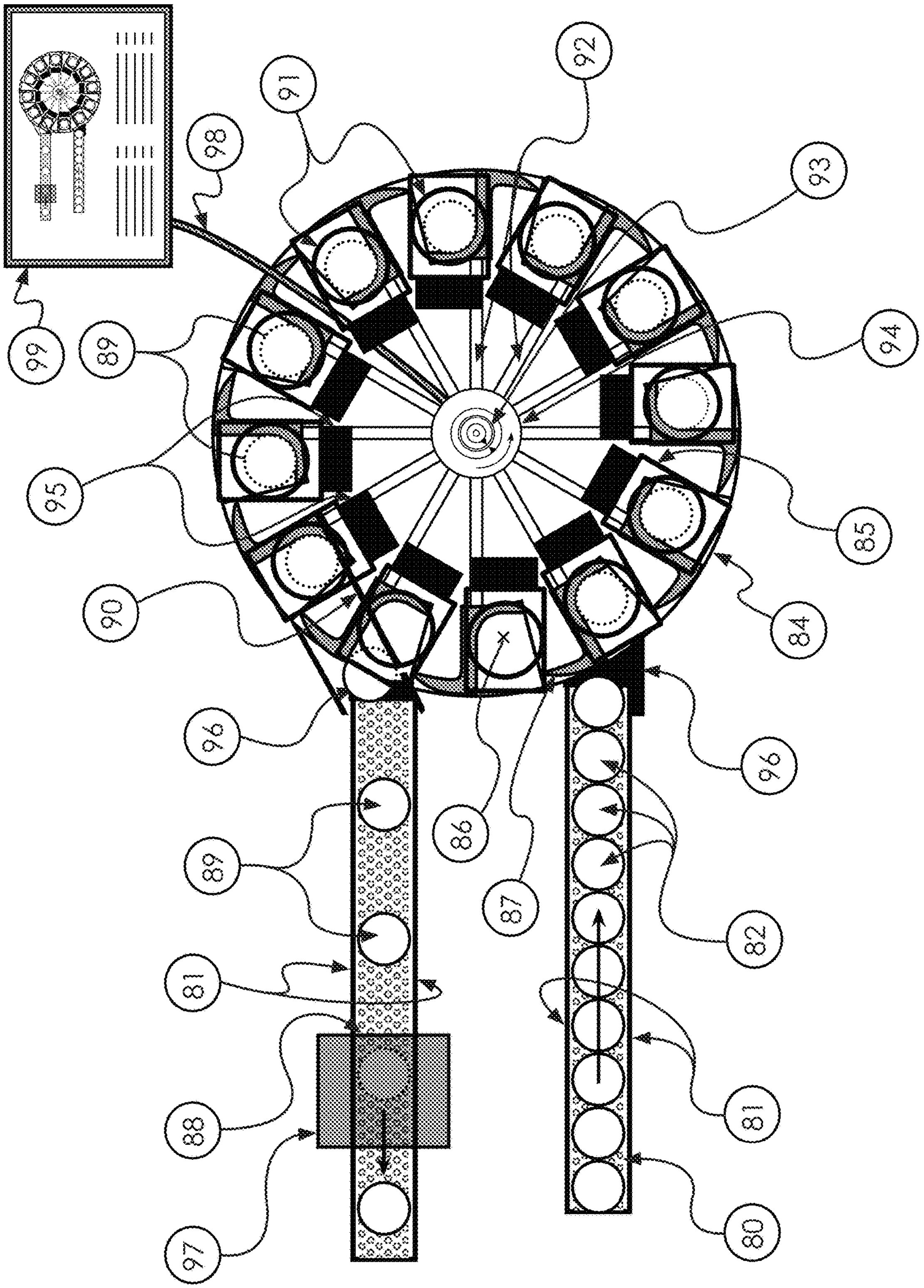
FIG. 5 shows another system according to the presently described embodiments.

With reference now to FIGS. 4 and 5, the implementations of the presently described embodiments also should, in most forms, address preferred configurations for the mechanical can handling. These configurations can come in at least four different forms. Also, it should be appreciated that descriptions of FIGS. 4 and 5 include references to examples of narrowband sources of irradiation; however, broadband infrared sources and corresponding systems could also be employed in these embodiments with suitable modifications, where necessary.

Further, although example implementations are illustrated in FIGS. 4 and 5, implementations may take a variety of forms. Along these lines, methods and/or systems according to the presently described embodiments may be implemented in a can manufacturing inside coating and curing process wherein coating has been sprayed onto an inside surface of cans. Can handling systems (including, for example, conveyors which may take a variety of forms) serially transport the cans toward at least one curing station. Then, cans are individually and electrically heated using, for example, narrowband semiconductor-produced radiant infrared energy (produced by, for example, arrays of semiconductor-based narrowband irradiation devices) and optical elements positioned outside of the cans in the at least one curing station such that the coating on the inside surface of each successive can in a series of single-filed production cans is brought to a critical temperature to accomplish a linking curing process in the coating in less than 20 seconds to prevent de-tempering or annealing from occurring in the can. Thus, with this technique, the amount of aluminum, for example, can be reduced, e.g. by 3% or greater and, when compared to previous techniques, will have similar sidewall axial strength, bottom reversal strength and overall strength when compared to thicker, heavier cans cured for a longer time because the thicker cans weaken during longer curing. Also, example embodiments include an ingoing trackwork or conveyor configured to organize or facilitate movement of individual containers into single-file order toward a second conveyor, the second conveyor being configured as a rotary turret to move the individual containers into and away from at least one curing station, the at least one curing station comprising an optical configuration wherein photonic energy from at least one array of surface emitting laser diodes passes through columnating optics and then is focused by at least one condensing lens element through a pinhole or aperture where beyond the photonic energy diverges to irradiate inside sidewalls of a coated container, such pinhole or aperture being located at the vertex of a reflective cone, such reflective cone functioning to reflect photonic energy back into the container to effect further curing work, wherein the coating is cured in less than 20 seconds, thus being fast enough to prevent weakening or annealing from taking place in aluminum comprising the container, and the second conveyor delivering the containers and being guided off to a third conveyor configured to bring the container out and away from the second conveyor so empty pockets are available to load waiting uncured cans to continue serial curing while the cured containers are transferred on the third conveyor toward subsequent container manufacturing operations. Still further, example embodiments include an ingoing trackwork or conveyor configured to organize or facilitate movement of individual containers into single-file order toward a second conveyor, the second conveyor being configured as a rotary turret to move the individual containers into and away from at least one curing station, the at least one curing station comprising an optical configuration wherein photonic energy from at least one array of surface emitting laser diodes passes through columnating optics and then is focused by at least one condensing lens element through a pinhole or aperture where beyond the photonic energy diverges to irradiate inside sidewalls of a coated container, such pinhole or aperture being located at the vertex of a reflective cone, such reflective cone functioning to reflect photonic energy back into the container to effect further curing work, wherein the coating is cured in less than 20 seconds, thus being fast enough to prevent weakening or annealing from taking place in aluminum comprising the container, and the second conveyor delivering the containers and being guided off to a third conveyor configured to bring the container out and away from the second conveyor so empty pockets are available to load waiting uncured cans to continue serial curing while the cured containers are transferred on the third conveyor toward subsequent container manufacturing operations.

More specifically, referring back to the drawings, one example configuration, which will be outlined in connection with FIG. 5 is a configuration involving continuous rotary motion. In this arrangement, the narrowband irradiation sources (and, possibly, controllers), optics, cooling (e.g. heat exchanges, chillers, and/or recirculation pumps) and power supplies (e.g. DC power supply) rotate along with a starwheel which organizes the cans into correct spacing, provides the propulsion to move the cans, and delivers them to the proper location for the irradiation. A rotary union would be designed into the system to provide for the delivery of whatever electrical power, control signals, compressed air, vacuum, and/or cooling that is needed on the continuously rotating turntable or turret. The assumption here is that it is configured so that the narrowband irradiation arrays or sources can continuously irradiate the inside of the can through their optical configurations for the time period necessary to impart enough joules of energy to do the full curing. The entire irradiation system would rotate right along with the cans in synchronous motion. The irradiant energy would turn on when the can rotates through the starting irradiation station and then would turn off prior to the can exiting the starwheel. As an example, if the particular narrowband irradiation system is capable of producing 500 joules, and for correct curing a particular can requires 850 joules, then the irradiation must be turned on during 1.7 second portion of the arc of the starwheel. The start time and duration of on-time can be fixed or more ideally, a programmable parameter. The intensity or pulse width modulated on-time (duty cycle) should be programmable in at least some forms. The user interface can be configured to meet the needs of the end customer. It can be as simple as screen entries on the display of a programmable controller or as complex as a PC-driven user interface with user friendly graphics showing on/off timing, duration, and intensity. It could also facilitate the programmability or the graphical setting of the intensity curve as a function of time or turntable position. The system's controller could also communicate with portable devices, whether tablets, smart phones, smart watches, or other to make it very convenient to monitor the settings, speed and functioning of the curing systems. The starwheel's diameter and RPM must be configured so that an adequate period of dwell is provided for the irradiation to execute proper curing. This configuration of the presently described embodiments will be described in greater detail below.

Because this narrowband radiant curing system is so programmable and flexible, it can be connected in other ways as well. A downstream inspection system (97) could inspect the outgoing cans (89) to make sure that the coating has covered the entire inside of the can and to make sure that it is fully and properly cured. This inspection system could utilize either a visible light grey scale or color camera or it could use an infrared camera on the way out of the curing system, or it could use both types. The inspection system could ultimately try to determine if there was any bare, uncoated metal or uncured coating. If the inspection system (97) has not verified that the coating is not properly cured, the system could close the loop and gradually turn up the joules of energy that are being applied to the various cans from the respective stations to make sure that they are correctly cured. The system would be able to correlate that it would know which can was cured by which curing system (91). To the extent that the cans from an individual curing station were under-cured, the system would be able to correct and increase the curing energy from any particular curing station. A similar process correction by way of closing the loop from an inspection station back to the specific curing station could be accomplished on any of the configurations in which the presently described embodiments could be practiced.

The system in FIG. 5 would function as follows. The sprayed but uncured cans (82) would arrive by way of a conveyor, trackwork or similar mechanism or system configured to organize or facilitate movement of individual containers into single-file order toward, for example, another conveyor or device. Such a conveyor could be in any form of conveyor including a vacuum conveyor or it could mean trackwork to simply guide the cans while air or gravity pushes them along. What is shown schematically is a vacuum belted type conveyor (80) which also has guiding trackwork (81) along both sides of the row of cans. The row of cans (82) is pushed along such that a slight pressure is exerted on the hold out plate (87) as the next can for loading sits on the dead plate (96). As the turntable or turret (84) rotates, the can continues to press against the holdout plate (87) until the next empty pocket (86) arrives and the can is able to be pushed into the pocket. As the can is pushed into the pocket (86), it can be assisted by vacuum which is pulled from the back section of the nest hold out plate (87), the portion which is closest to the center of the turntable. The shape of the holdout/nest plate must be carefully derived so that the can slips in smoothly when the pocket has opened-up and is available and so that it does not dent or deform the can. It must also create a consistent location for the can and hold it securely and in a consistent position during the time that it is being cured. As the turntable (84) continues to rotate, it will transport the can in the nest position (86) and once it has cleared the loading station, a signal will be given to turn on the irradiation energy. The control system will turn on the energy at a rate which the irradiation devices can handle without a deleterious effect but not so slowly that time is wasted which could be viably used for curing. As the arrays of irradiation devices (85) are actuated, they are powered by the control system and power supply (95) which correspond to each irradiation station. The can should be situated centrally under the irradiation optics (91) the entire time that they are rotated by the turntable. The optics (91), the arrays (85), and the power supplies and control system (95) are rotated with the turntable (84) and maintain their relative position to one another during the entire rotation process. An encoder (93) is continually feeding back the rotary position and speed information to the central control system (99) by way of cabling (98). The central control system (99) is feeding back the relevant information that each station needs to have to the local control (95) that it needs in order to properly actuate each of the irradiation stations (91) with their appropriate timing and power levels. Each of the control systems (95) will monitor the cooling for each of their respective stations and will feed that back by way of the interconnect (98) to the central control (99) in order to facilitate full supervisory control over all stations.

As the cured cans (89) approach the unloading station, they will gradually come into contact with the stripper arm (90) which will gradually and gently push them out of the station on to the already moving vacuum conveyor belt (88). The cured cans (89) will continue to proceed down the vacuum conveyor (88) and will pass under the inspection station (97) on their path out of the curing system. As an alternative to a vacuum conveyor, a trackwork system which takes advantage of gravity or high volume, low pressure air to move them along to exit the curing system.

Another viable configuration for the presently described embodiments are somewhat similar in that it employs continuous rotary or linear motion, but it uses fixed position irradiation systems that strobe to impart the energy when the can is passing by the correct location. This configuration would require a very powerful and very short pulse of irradiation energy which must be timed correctly. The duration of such a high-speed strobe pulse would vary with the exact implementation details and throughput speeds of the material handling but would most likely require a pulse of less than 500 milliseconds, but could be as short as 300 microseconds, for some higher speed applications. It is possible to over pulse arrays of narrowband infrared semiconductors to get very high outputs for very short periods of time. The concept here is that if perhaps the normal electrical supply current rating on an array is x, that for a very short duration of time perhaps 10, 15, or 20× is possible to get a much higher peak output. If, for example if 1700 joules is required for correct irradiation, the group of irradiation arrays can normally put out 1700 joules in 1.7 seconds with a current input of 15 amps, could be strobed at ten times their normal current, which in this case would be 150 amps, to produce the 1700 joules in 170 milliseconds. This overall configuration requires less mechanism and the irradiation arrays do not need to be mechanically moved or dynamically articulated, but more electrical and electronic work needs to be done to pulse such large currents of power and the arrays need to be capable of withstanding the impulse power and produce proportionally high outputs. They need to be tested to verify if indeed they can be over-pulsed to this extent and still have a usable service life for the particular implementation.

The strobed and over-pulsed configuration can be executed in either a rotary motion configured system or in a continuous linear motion configured system. Either arrangement will facilitate allowing the cans to pass single file under a strobed narrowband irradiation array for the curing exposure. The implementer of the presently described embodiments will be constantly debating the relative merits of material handling throughput speed versus the power and configuration of the irradiation system. A more powerful irradiation system will ostensibly irradiate in a shorter period of time directly proportionate to the power it incorporates. For example, for practical purposes, a 2,000-watt array will irradiate roughly twice as fast as a 1,000 watt array, but more material handling equipment that runs at a slower speed will be required for the 1,000 watt array because the system must be designed with more serial or parallel mechanism to attain a particular throughput speed. A material handling system, whether it is starwheels, conveyors, or other, can process twice as many cans in a given period of time if it runs at the doubled speed. However, in order to cure at the doubled speed, one needs roughly twice the power output in the narrowband irradiation arrays and larger power supplies and so on. Higher powered irradiation systems generally require that much more cooling and everything in the system, including the optical train, must be capable of handling the much higher power levels. Similarly, high speed material handling equipment brings its own challenges. Since the kinetic energy in a moving item increases by the square of its velocity, a material handling system that runs at twice the speed must deal with four times the inertial or kinetic energy throughout the system including in the cans that are being handled. As a result of all these factors, the designer and implementer of the presently described embodiments must determine into how many separate lanes a system will be divided to get the specified throughput and then how much power is required in the irradiation system in order to cure at the rates that the material handling system demands.

A typical can line divides the production flow into seven lanes currently to do the inside of can coating. One of those lanes is assumed to be available for maintenance at any time while the other six run continuous production. According to the presently described embodiments, each curing lane could, for example, cure individual cans at production speeds of 300 cans per minute (which translates to 1800 cans per minute for six lanes). The full output of those six active lanes is then brought back together into mass conveying before it passes through the IBO. With the presently described embodiments, the lanes would proceed on through the corresponding curing lanes while still separated. Thus, since the curing lanes are parallel, independent lanes, they may be started and stopped independently. They maintain the independence for control, servicing, and speed optimization. This configuration of independent curing lanes allows for any lane to be started or stopped for any reason without shutting down plant or whole line production. It facilitates both scheduled maintenance while production is maintained as well as spontaneous maintenance or jam clearing without shutting down production. If any electronic troubleshooting or component replacement is needed, it can be done seamlessly while normal production proceeds. The separate lanes of curing could then be merged into one high speed, single file lane again for the trip through the next production step, which typically is the necker flanger.

Another arrangement that could be implemented according to the presently described embodiments incorporates high speed, indexed rotary motion. This configuration will involve a turntable or starwheel arrangement which incorporates a rotary index configuration which will move a specified arc of movement repetitively. The indexing technology can be one of a number of mechanical or electromechanical considerations. The periodic indexing can be one of a number of technologies including electric servo, cam, ratcheting or clutch mechanical, pneumatic, or any number of other indexing mechanisms. Although they are employed in a unique way here, all of these mechanical mechanisms are well detailed in the literature and the patent database and will not be explained in detail here. Commercially available products can fill this need very well for the basic mechanism but then they must be tooled very specifically and accordingly to handle cans through the high-speed irradiation curing stations.

The properly indexed starwheel or turntable facilitates moving the can under the irradiation source and will provide a dwell during which the irradiation source can be turned on and then ultimately turned off prior to indexing the can out from under the narrowband irradiation source and bringing a new can in to position to allow irradiation for it. This repetitive indexing cycle has the advantage of providing whatever length of dwell duration is required for the application. It must provide whatever number of joules of energy are required for a proper curing, but the speed and throughput will demand that certain radiant power be matched with the right speed of indexer to meet the overall production demands for the system.

The indexing arrangement can provide for moving single cans into and away from the narrowband irradiation source. Alternatively, with each index it could move multiple cans into position under multiple irradiation sources. It is, therefore, possible to design the system so that it is optimized by having the perfect number of irradiation sources to deal with the curing duties while the indexing turntable can be run at a speed which is within the range of high reliability for its mechanisms.

It is important to design a servo driven indexing system to have the right ratio of indexing dwell to indexing time to indexing arc length. That will facilitate configuring the narrowband irradiation sources so that they can take full advantage of the maximum radiation time while minimizing the actual indexing time. It is also possible to have multiple stations for irradiation so that all of the irradiation does not have to take place at a single station. This technique would facilitate gradual irradiation such that the coating in the can could be heated up through a series of irradiation stops. Since an aluminum can cools down very quickly, this could cause a considerable amount of wasted heat which would require injecting more heat at a subsequent station. It may be a viable configuration, however, if it is necessary to keep the coating at the elevated temperature for a more extended duration to suit a particular kind of coating. It will also facilitate multiple repeated irradiations if a longer period of irradiation is required than can be facilitated by the mechanism otherwise. This could also facilitate a higher throughput speed if configured carefully. In some cases the longer effective duration time may be required to drive off the water or for other curing reasons.

The implementation of any of the rotary motion configurations of the presently described embodiments can utilize gravity to assist the movement of the cans through their various respective track work. The cans can be basically touch one another as they move through the track work either on the path to or from the narrowband, high speed radiant curing stations. To provide for gentle pressure to push the next can into it respective turntable transport nest, a steep incline or vertical track work full of cans is very helpful. For example, in FIG. 5, if the track work (81), whether backed by a vacuum conveyor (80) or not, can be configured so that it is either vertical or at a steep angle so that the cans (82) push each other along. The gentle push of gravity, which force can be increased or decreased by increasing the verticality or the stack length before the transport nest (86) with the help of the peel-off guide (87) gently guides the next can into the transport nest (86).

Another way of implementing the presently described embodiments is by way of a linear escapement configuration as shown, for example, in FIG. 4. This involves having two parallel conveyors, an input conveyor and an output conveyor. They are located in parallel with one another and side by side but with space between them for escapement tracks and stations. Programmable escapement pushers are arranged along the input conveyor which are configured to provide properly timed push off into the escapement tracks between the two conveyors. The narrowband irradiation system is provided above the work station on each escapement track at an escapement work station so that when the can is pushed off and made to dwell in the work station, the irradiation can proceed as long as necessary for proper curing. Once the curing duration has been accomplished, the can is pushed out of the work station and to the exit conveyor with proper timing so that it fits into a gap between other cans that are already in process on the high-speed exit conveyor. This type of arrangement allows a lot of parallelism for long dwell times but with high programmability. It can typically be implemented at a lower cost point and may provide for higher flexibility and more modularity than most of the other configurations. It does, however, require more sensing, more programming, and more articulation of the cans. The linear escapement configuration in FIG. 4 will be explained in greater detail here.

The linear escapement configuration would work as follows. Referring to FIG. 4, the incoming conveyor (111) brings a row of single file upright cans. The open top is facing away from the vacuum conveyor on which it is transported. The input speed of the conveyor (111) will depend on the throughput speed and handling speed of the entire balance of the system. The actual speed and belt position is constantly being monitored by an encoder (109) which is directly linked to the drive of the conveyor (118) and (119). The encoder is connected to the computer, the control system, or the programmable controller which constantly logs the position of the belt and by way of the input from a photo cell (100) is monitoring the position of every can that enters the material handling system. As the uncured cans (112) enter on the input belt, the control system determines which irradiation station is going to be available for the can to enter. Seven fully independent irradiation curing stations (106) are shown in FIG. 4. If the programmable controller determines that it will send the can to station three, it will alert the station three diverter (114) to extend its fingers with very precise timing to provide the necessary vectoral force to angle the can off into the irradiation station number three. There will be a pushing sliding motion created by the combination of the kinetic action provided by the moving belt as the can comes against the fingers of the diverter (114) as it approaches station three. As the can is pushed off onto the station three sidetrack conveyor, it will first slide over a dead plate (113) before it is picked up by a station diverter conveyor (105). The diverter conveyor will continue to transport the non-cured can into its respective curing station (106) until the center point (110) is over the center point of the uncured can under the curing station (106). The diverter (105) will continue to transfer the can into the curing station (106) until the photo cell (120) verifies its arrival. At that instant, the diverter conveyor (105) will stop moving the conveyor and the irradiation station (106) will be activated and will irradiate the inside of the can. The electro-optical system may be very similar to the one shown in FIG. 2. When the on time indicates that the correct number of joules of energy have been imparted to the inside of the can, the narrowband curing system (106) will be turned off and the control system will know that the now cured can is ready for its exit. The control system, which will have been tracking the position of all cans in the system, will know how long it will take for the diversion conveyor to transport the can out to the exit conveyor (108). When the timing is right and a gap between the cans (107) as is shown in FIG. 4, it will prepare to re-activate the diverter conveyor to transport the cured can into the proper gap between cans that are traveling down the exit conveyor (108). It knows the speed of the diverter conveyors (105) and can modulate their speed if so equipped to facilitate positioning the cans with reasonably even spacing on the exit conveyor (108). The diverter conveyors (105) can be equipped with perforated belts through which a vacuum is pulled so that the cans adhere tightly and so they can be accelerated quickly. The exit conveyor (108) also can be equipped with vacuum holes (104) through which a vacuum can be pulled to hold the cans down tightly on the belt for good acceleration and control. The entrance conveyor (111) will be driven by motor (119) and gear drive (118) and the exit conveyor (108) will be similarly driven by the motor (101) and gear drive (102) and both of those can be variable speed motors which can be adjusted by the control system for the smoothest can mesh according to the production speeds that are being supported. The diverters (114) must be designed so that the fingers are fast enough to divert the cans but they must do it smoothly so that the cans are not tipped over or deformed. But the fingers also must retract fast enough to get out of the way before the oncoming next can comes along. The control system must know the reaction time to extend fingers and to retract fingers and must be able to coordinate the timing of all the can transportation, diverting, and then exiting the system on conveyor (108).

It should be appreciated that much of the functionality of the presently described embodiments (including, for example, the embodiments described in connection with FIGS. 1-14)—such as functionality to produce narrowband infrared energy (or broadband energy), functionality to produce cans, functionality to inspect cans/coatings and/or feedback information, and the functionality to perform can handling—in at least some forms, will be controlled by a suitable controller or control system. Such controllers or control systems may take a variety of forms, depending on the specific implementations, but will, in at least one form, be implemented with suitable hardware configurations and/or software routines to realize the form and function of the presently described embodiments. For example, such controllers or control systems, in at least one form, include at least one processor and at least one memory having stored thereon code or instructions that, when executed, cause the processors or other components of the system(s) to act or function in a particular manner. The memories may take a variety of forms including non-transitory, computer-readable media or devices such as read-only memory (ROM), random access memory (RAM), or other memory structures. Further, such controllers or control systems may be, for example, stand alone systems, distributed systems or incorporated in another or a more comprehensive system.

The different form factors through which the presently described embodiments can be executed which are detailed above are primarily to facilitate the direct narrowband irradiation portions of the curing. Depending on various factors, it may be necessary to augment the above configurations for complete curing. One form of augmentation may involve having a pre-warming section through which the cans pass immediately prior to the narrowband irradiation section. This can facilitate pre-warming the can so that less joules of energy are required from the narrowband irradiation section.

Another form of augmentation may involve a post-blowing section after the narrowband irradiation. Since a great portion of the wet coating is liquid water, it is necessary to drive off the moisture at some point in the curing process. Once the water is vaporized which should have happened just prior to reaching the curing and cross-linking temperature, that vapor must be removed from the cans. It may require warm air or it may just require blowing air over the cans to remove the vapor from the cans. This can be configured as a post-warming section as either a circular or linear arrangement with track work guiding the cans through the respective section.

The pre-warming section can either be warm air or it could be radiant and be equipped with for example, quartz lamp banks to provide a gentle radiant preheating. The augmentation sections can vary widely and will depend on the exact circumstances, plant configuration, and geographical climate into which a system is to be installed. One skilled in the art will understand that not only can the narrowband curing system be configured in many different ways beyond the specific examples which are taught here, but the augmentation, both before and after it, can take many forms as well.

One important difference between the presently described embodiments and the traditional ways of curing the inside of the beverage can, is that the presently described embodiments cure by way of direct radiant energy. The conventional IBO curing ovens heat the inside of the can by way of hot air convection. An IBO heats the air by, in some form, combusting natural gas or by resistant electrical heating. Both of these heat the air and the hot air heats the can. Because the belt on which the cans sit is hot, a tiny amount of heating occurs by way of conduction from the conveyor belt to the base of the metal can. This is also a deficiency and inefficiency of an IBO, that there is a drain off of heat from the oven by way of continually heating the belt as it passes repeatedly through the oven. Certainly, the intention of current vintage IBO's is that the lion's share of the can heating is done by way of the direct hot convective air.

Convection heating is generally an inefficient heat transfer process. It is a multi-stage process and inherently has lossiness between each stage. The air must be heated initially and then the air must be in contact with a can to transfer its heat into the can and its coating. A similar amount of hot air hits the outside of the can as that which hits the inside of the can. Of course, the hot air that hits the inside of the can hits the coating first before it conductively soaks through to heat the metal. The hot air which hits the outside of the can, however, must heat the metal and then the metal must heat the coating. In a perfect world, it is much more desirable to just heat the coating to its cross-linking, curing temperature. This is virtually impossible, however, since the coating is in intimate contact with the aluminum substrate that comprises the body of the can and because it is very thin, it will transmit the heat directly into the metal substrate. Because of this method of heating, the metal substrate is heated as much as the coating. Also, the hot air in the oven is not completely uniform. Hot spots inherently exist in the oven and the air movement varies from place to place, so it will have a tendency to overheat some cans and under-heat others. The cure for this tendency is to use more oven heat than is truly optimal to prevent uncured cans.

Especially with aluminum cans, holding the aluminum at these temperatures for a significant period of time has the result of weakening them. It is well known in the industry that cans have to be manufactured heavier and stronger than the ultimate specification so that they can withstand the weakening effect which occurs after spending two to three minutes at the elevated temperature in the IBO.

It is not completely clear whether this weakening effect is a de-tempering or an annealing effect. Metallurgists disagree as to what to name the effect. What is very clear and well known is that the aluminum is definitely weakened by way of its trip through the IBO. It is generally thought to lose between eight and ten percent of its bottom reversal strength as a direct result of its trip through the oven.

Classical annealing typically takes higher temperatures and longer durations at the elevated temperature than the time the can spends in the IBO oven. A literature search bears this out for the 3004 alloy and other similar alloy families. A deeper dive into the literature and at least one study indicate that this annealing and de-tempering process can occur so quickly in a can because the aluminum is so extremely thin. Aluminum is a fabulous thermal conductor and at the typical three or four thousandths of an inch wall thickness, the heat soak is almost immediate. It is measured in seconds not minutes or hours as would be the case with most items which would be candidates for annealing.

The 3004 alloy aluminum which is also known as UNS A93004 has the following chemical composition in addition to the base aluminum. It has silicone at 0.3% max, iron at 0.7 maximum percentage, copper at 0.25 max, manganese at between 1 and 1.5%, magnesium between 0.8 and 1.3%, zinc at 0.25% max and then other elements which are less than or equal to 0.05% each up to 0.15% total. Several temper variations are available for this alloy. Standard tempers available include 0 (annealed), H32, H34, H36, and H38. The H indicates strain hardened and there is an H3X which is strain hardened and stabilized. The specific temper typically used for aluminum beverage cans is an H19 number which is less strain hardened than H32 but is harder than the annealed condition. The H19 temper seems ideal to handle the significant cold working that occurs during the D&I (Drawn & Ironed) process. The specifications regarding tensile strength vary from 26 KPSI to 41 KPSI. The yield strength varies from 10 KPSI at the 0 temper or annealed product up to 36 KPSI for an H38 temper.

The reduction of the can's strength by eight to ten percent is truly a reduction in the buckle strength or bottom reversal strength that a can is able to sustain under pressure. It should be noted that the buckle strength is not directly correlated to yield or tensile strength because the exact geometry and the thickness of the can's shape are significant factors in the strength of the can. But, since these are as identical as can be measured both before and after curing, it clearly is the change in tensile strength and yield strength which are responsible for the loss of buckle or bottom reversal strength. This annealing/de-tempering effect is clearly a factor that has to be dealt with accordingly in the can manufacturing industry.

The presently described embodiments can virtually eliminate this annealing/de-tempering effect that occurs in the IBO. The presently described embodiments eliminate the IBO and substitutes a high speed, narrowband infrared radiant curing technology in its place. The cans are single filed, and irradiation is directed individually into each can. They are cured one at a time serially instead of in mass as a group. Due to the controllability and relative efficiency of the narrowband irradiant heating, the coating can be brought up to the full curing and cross-linking temperature in only a few seconds. Since the can spends so little time at the elevated temperature, the weakening effect does not have time to occur. The details and techniques for implementing this high speed, radiant curing technology are taught in more detail throughout this document.

Based on the results of an absorption spectrum analysis, a penetration depth can be calculated for the spray coating sample. In this application, a low penetration is actually advantageous as it corresponds to faster absorption of the IR radiation.

The expression for penetration depth (95% absorbed) is: $\beta=(3*l)/A$ where is the depth in millimeters, l is the path length of the experimental sample and A is the absorbance at a given wavelength. As an example, a wavelength of 1930 nm where the absorption is 1.526, results in a penetration depth of $\beta=3.93$ mm. This means that the infrared light would have to pass through 3.93 mm of coating before 95% of the incident energy was absorbed. This will obviously not be possible when considering coating thicknesses as low as 0.00254 mm on the sidewall of the can. Fortunately, aluminum is a very good reflector of IR radiation. The infrared light will be slightly absorbed on its first pass through the spray coating, but will then reflect off of the aluminum substrate under the coating and then pass back through the coating as it starts the process of reflecting around the inside of the can. It will contact spray coating and aluminum walls with each reflection pass. Even the small amount of energy absorbed by the aluminum during the slightly imperfect reflections will benefit the curing process as it will result in heat energy on the aluminum surface holding the spray compound, thus heating the compound further. Also, it should be appreciated that if the aluminum heats up sufficiently, the external decoration on the can may also be cured. This might be desirable for some implementations so the system could be designed, configured or tuned to accommodate such heating and curing objectives.

For the thinnest standard coating thickness, each reflection inside the can will result in 0.00508 mm of travel through the spray coating because of the double coating pass with each reflection. In order to reach the 95% absorption figure determined above, 774 passes through the body of the can will be required before 3.93 mm of spray coating have been interacted with. In a 65 mm wide can (assuming perfect orthogonal wall-to-wall reflections, which will not be reality), that means the light must travel approximately 50 m before being fully absorbed. This may seem like a lengthy process, but the speed of light ($c=3\times10^8$ m/s) is so fast that it is actually very fast. The results of a timing calculation for both the thinnest and thickest coating thickness are: 0.17 nanoseconds for 0.1 mil thickness, and 0.03 nanoseconds for 0.5 mil thickness. As the results show, it will actually require significantly more time to emit the energy from the laser diode than it will for it to be absorbed by the coating.

As has been discussed, the current traditional method for can coating curing utilizes a large oven with a mass conveyor. Three successive sections heat the cans. The oven is fed by natural gas in which the temperature in the final section is maintained between 375 to 450 degrees F. The cans are passed through this hottest section of the oven for curing times on the order of one (1) minute through the use of a mass conveyor belt. Because of the high cost associated with initial oven heat-up procedures, these ovens are left on as much as possible, which is wasteful both during line down time or during a jam which can back up prior to or in the oven.

TABLE 1 shows the cost buildup, based on reasonable assumptions and current natural gas costs in the United States. As TABLE 1 shows, a rather substantial amount of heat must be continuously supplied in order to keep the oven interior at a consistently high temperature. The cost of natural gas is also a key component of the total yearly cost of operation.

TABLE 1

Conventional Natural Gas Fired Oven Cost to Operate

| | |
|---|---|
| Part Rate | 2,400 cpm |
| BTU per hour | 3,000,000 |
| BTU/MCF Nat. Gas | 1,026,000 |
| Conversion Efficiency | 90% |
| Consumption | 3.25 MCF per hour |
| Cost | $11.00/MCF |
| Cost per hour | $35.74 |
| Cost per 24 hours | $857.70 |
| Oven Uptime (% of 24/7) | 95% |
| Cost per Year | $297,407 |

The high coating thickness results from above were used to represent the worst case scenario. Additional differences between this analysis and the conventional variables include the difference in conversion efficiency between natural gas to heat and electricity to radiant heat, the difference between $/MCF for natural gas and $/kWh for electricity, and the difference between oven uptime and diode array uptime.

While not directly comparable, the difference does play out in favor of the narrowband radiant electrical heating. Assuming a common line uptime (the time used to actually produce cans) of 89% of all the available time in a year, it was assumed that the oven would actually remain active for a greater period of time due to the cost and time associated with a cold start up. So, while the line may only be producing cans 89% of the time, the oven will actually remain at temperature 95% of the available time during the year. On the other hand, the narrowband radiant heating elements are designed to be pulsed and would therefore only use electrical power when a can is present and actually being cured. Not only does this allow for greater efficiency during operation, but when the line is down for maintenance or a line jam, the diodes are not in operation. The result is a diode array uptime on par with the actual line uptime.

From a purely environmental standpoint, in the pro-forma example, the 3,000,000 BTU/hr required to cure the cans and keep the oven in the correct temperature range can be converted to joules such that 3,000,000 BTU=3,165,167,700 joules. Comparing this to the hourly plug power for the radiant heating system, TABLE 2 reveals the dramatic savings available when the heat is properly "aimed". Over 12 times the amount of energy is required just to heat the conventional oven versus the theoretical energy requirements for the narrowband radiant heating system to cure the coating. In other words, with the current IBO technology, approximately 92% of the energy that is consumed is actually wasted.

TABLE 2

Narrowband Radiant Curing Cost to Operate

| | |
|---|---|
| Part Rate | 2,400 cpm |
| Joules per can, used to cure | 700 |
| Conversion Efficiency | 40% |
| Joules per can, wall plug | 1786 |
| Joules per minute, wall plug | 4,285,714 |
| Joules per hour, wall plug | 257,142,857 |
| kW | 71.4 |
| Cost per KWh | $0.107 |
| Cost per hour | $7.64 |
| Cost per 24 hours | $183.43 |
| Diode Uptime (% of 24 / 7) | 89% |
| Cost per Year | $59,587 |

Comparing the results of the conventional, current standard curing method with the presently described embodiments reveal a significant savings of roughly $240,000 per year, based on current cost estimates.

The benefits of this technology to a can manufacturer are many. Not only is there a dramatic energy conservation as discussed above in a pro-forma example, but there is substantially less air pollution. The energy and cost savings is actually greater than the example above, because it does not count the energy savings from the elimination of typically 95 HP of electric motors and the high maintenance aspects of the mass conveyor style ovens. Perhaps the most dramatic benefit to the can manufacturer is the fact that, if the presently described embodiments are implemented correctly, the annealing/de-tempering effect is either completely or nearly completely eliminated. As a result, the can manufacturer is able to make cans with less aluminum. Some production cans have weighed approximately 0.34 to 0.39 ounces but it will be appreciated that can weight/mass may vary as a function of, for example, exact geometry and material thickness. Also, can manufacturers periodically redesign cans, can tooling and manufacturing processes to vary weight/mass (e.g. make cans weigh less). Further, some cans, e.g. specialty cans, might even be designed to have increased weight/mass. Skillful implementation may yield as much as 9 to 14 percent savings in aluminum used. However, any reduction in amount of aluminum, such as reducing the weight of aluminum by 3%, 5%, 8% or greater, would be beneficial. Since roughly 70% of the cost of a beverage can is the cost of the aluminum material, that represents a huge savings to the can manufacturer or the can user. It also is an environmental gain in other ways since less aluminum needs to be mined, refined, manufactured, and transported.

The elimination of the weakening effect through the oven will be beneficial in one of three ways or a combination of ways. The can could be made with the current aluminum and tooling, but would simply be substantially stronger than the current can because of the elimination of the weakening of the aluminum. Alternatively, less aluminum is required to manufacture the can. The third possibility is that a cheaper, lower alloyed, or lower tempered aluminum may be used in place of the current higher priced aluminum product. It can be a combination of these, depending on how the manufacturer chooses to implement the presently described embodiments of this technology.

There are multiple novel ways of reducing the amount of aluminum that is used to manufacture a can when employing the presently described embodiments. The manufacturers and suppliers of the aluminum coil stock routinely charge a premium for rolling the aluminum to a particular precision and thickness. Aluminum is priced and sold by the pound, but there are significant process charges as well for the rolling to thickness and finishing processes. While less weight of aluminum would be required, the manufacturer of the aluminum coil stock could be required to roll it to a thinner but still precision specification. In order to maintain their profit position, they may charge a greater rolling premium than they do for the greater weight of aluminum at the greater thickness. A savings may not result if this is the case if the rolling mill takes this business approach. A more novel way of implementing the presently described embodiments, would be to reduce the cut edge diameter of the blank and thus the diameter of the resulting cup. The starting cup for a typical 12-ounce two-piece can is 5.100" diameter. This technique would reduce the weight by proportionally reducing the cup size but keep the same coil sheet thickness and thus the same rolling premium. The first step in the D&I process is to deep draw a "starting cup". Again, this would mean that the aluminum coil would have less width but the same thickness as it currently does, so it should fall into industry standard pricing and simply be slit to a narrower width. By starting out with a smaller diameter cup, the can body end product will end up at the desired thinner specification in the finished can, but without a premium paid for rolling the aluminum to a thinner gauge specification. The modifications to or reconfiguration of the tooling will be understood by a skilled toolmaker. In order to end up with a proportionately smaller diameter cup, which is the deep drawn cup that is the first step in the D&I process, the tooling must be made or modified so that every part of it is intended and correctly specified for the new diameter. The cup is made in a double action cupping press and the tooling is many cups wide, depending on the design and vintage of the cupping press setup. The diameter of the blanks must be made smaller thus reducing the so called "cut edge". Those blanks are tightly nested across the width of the coil at a 60° angle to the coil edge to minimize the scrap amount between the blanks and with a minimum aluminum web left over between the tangential edges of the blanks. To implement this, one would reduce the overall width of the coil stock and make the same number of cup blanks across its width as the larger diameter traditional sized blanks. An alternative is to retool in such a way that a wider coil width is maintained but more cup blanks and cups are made across its width. In any event, the compound deep draw tooling, at each tooling station in the stamping die, will have to be remade with the correct new diameters, clearances, and depths. The new punch, draw ring, holdown and all associated tooling components will have to match the new diameter. The geometric relationships of each tooling station will need to be adjusted to maintain the tightly nested configuration and minimal scrap relationship between the respective blanks. The tooling components will be smaller in diameter and will therefore require less tool steel and less machining, so they should be comparatively cheaper than the current larger versions. Although the modification to the cupper press tooling will be required in order to make the smaller diameter cup, the payback for making that change can be quite substantial. The balance of the cupper press, feeding equipment and overall system should be reconfigurable to use the new tooling or tooling modification.

In order to implement this technology correctly, it is important to understand more details about how the presently described embodiments work. The presently described embodiments that the preferred reduction to practice teaches injecting intense infrared narrowband energy as directly as possible into the interior of the can and at the coating itself. This means aiming and projecting the infrared energy directly into the inside of each individual can and not wasting energy by bouncing it around the factory or trying to heat groups or masses of cans. While it is possible to implement the presently described embodiments by irradiating the outside of the can or both the outside of the can and the inside of the can, the more efficient implementation will be to aim the energy directly into the inside of the can. This is much more efficient because the photons from the narrowband energy will actually penetrate the coating in its liquid, pre-cured form, and be partially absorbed by it. It will actually pass all the way through the coating while some energy is directly absorbed and will then be reflected from the aluminum substrate back through the coating for a second pass and corresponding further absorption. Additional energy will be absorbed as the photons pass through the coating on the return trip and on every subsequent reflection there will be two passes through the coating. The coating is so thin that it will not absorb all of the photonic energy quickly and the photons will continue on their reflective path until they impact the next coated surface. Imagine a billiards ball ricocheting off the interior surfaces of the can with an inbound and an outbound pass through the coating before the additional reflection with each bounce. As we continue with the billiard ball analogy, the reason the billiard ball eventually slows down and stops is because it has lost all of its energy to the bumpers and a smaller amount to rolling friction. Similarly, the photons lose their energy in two principle ways. Energy is absorbed as it passes through the coating on each pass and a slight amount of energy is lost to the aluminum in the imperfect reflection impact. Depending on what wavelength narrowband infrared irradiant energy is being utilized, there will be somewhere between a few hundred and about 1,500 reflections before the entire amount of energy of the photons is absorbed by the coating and by heating the aluminum. Of course, the thicker the coating the more energy will be absorbed in the coating with each pass through it. A longer path through the coating means that more absorption occurs from photonic impacts which have occurred while the photons are passing through the coating. As an example, a steep angle of entry and passage through the coating will provide for more path length and thus more absorption.

There are a number of ways of producing powerful, narrowband irradiation energy and directing it effectively to the inside of the can. While it is possible to use broadband irradiant energy, it is much messier to implement effectively and efficiently. Broadband energy produced from quartz lamps, for example, cannot be switched on and off at the kinds of speeds that are necessary for a really clean implementation. The turn-on stewing rate and full warmup time for quartz lamps is measured in seconds and the entire optimal on-time may only be one or two seconds or even fractions of a second for many configurations. It is also much more difficult to focus the energy exactly where it is needed because of their inherent shape and filament configurations. They don't easily facilitate the precision delivery of the correct number of joules but rather tend to work better in a flood arrangement where the joules of energy are delivered to a larger specific area but it is difficult to control. Broadband sources, because of their inherent properties, may not facilitate the super-fast cure and thus may still induce some or all of the annealing effect by rapidly overheating the can. There are many advantages to both narrowband irradiation and to semiconductor-based production of the narrowband energy. First, they can be turned off and on at microsecond speeds. They only produce photonic energy when they are actually receiving a DC voltage input (typically between 1.2 and 3.3 volts) and they do not have the hysteresis or high black body equivalence which causes substantial output after the electrical input current stops flowing, like a quartz or gas discharge lamp does. Broadband sources typically operate at very high temperatures, which brings a whole series of implementation problems. Their presence causes the whole curing environment to be quite hot, thus reducing reliability of components and requiring optics that are capable of much higher temperatures. They have inherently much shorter lifespans and must be replaced frequently, adding to maintenance and downtime. Further, the narrowband setup also lends itself to a superior implementation of anti-reflective coating. This is the case because the coating can be designed and optimized for the exact narrow wavelength band that is being employed. It does not need to be the less optimal, broadband anti-reflective coating. Similarly, the optics and optical coatings, such as cold mirror coatings, can be more easily designed for a narrow specific wavelength range. Lenses focus at different distances for different wavelengths, so more precision can be an advantage when designing the optical train for a narrowband system. It should be appreciated that narrowband can be interpreted differently but we are referring to the production of optical or photonic energy whose full width, half max bandwidth is typically less than 100 nanometers. If the source of the narrowband energy is a solid state or a semi-conductor source, this will normally be the case unless a broadband fluorescence is added to the device configuration. The raw output from LED's is generally narrowband inherently within that range but laser diodes are narrower, for example, less than 20 nanometers (nm), usually less than ±10 nanometers (full width/half max) or even as narrow as ±1 nm (full width/half max) for certain types. VCELS and SE-DFB devices, for example, are usually less than ±2 nm (full width/half max) in bandwidth. The exact bandwidth is not as important as the central wavelength of the output. The wavelength can determine how quickly the energy is absorbed by the coating itself. The transmissivity of the coating can be measured at varying wavelengths and a wavelength that achieves the best absorption results can be chosen. For example, in at least some embodiments, the narrowband infrared energy used for curing (which, as detailed above, could be as narrow as ±1 nm (full width/half max), depending on the implementation), will match at least one absorption characteristic of the coating. Accordingly, for the example of a water-based epoxy coating which is commonly applied to the inside surfaces of cans, the narrowband wavelength may fall in the range of 800-1200 nm, for example, at approximately 972 nm. 972 nm represents a deep penetration wavelength for a water-based epoxy coating, as discussed herein. Substantially faster absorption by the coating is possible in a range of 1400 nm to 1600 nm, for example, at about 1,454 nm or 1456 nm, but the wall plug efficiency is not as high, so the tradeoff is a decision that the system designer must make. Similar wall plug efficiency challenges exist in the range of 1850 nm to 2000 nm, for example, at 1935 nm.

Like many high-powered industrial processes, this process must be implemented with safety foremost in the mind of the system designer. Regardless of how the presently described embodiments are reduced to practice in its final design, it must have appropriate safety guards to prevent physical or optical exposure to the dangerous aspects of the technology. Powerful infrared energy can cause eye damage or blindness, so it must be prevented through safe designs. The actual material handling portion of the system has many moving parts which could be dangerous when moving or when suddenly actuated to perform a function. Guarding, either physical guards or electronic sensing that will halt motion safely when humans are present, must be implemented. OSHA, CSA, or CE safety standards should be adhered to as the systems are designed, for all aspects of the safety of the system.

The narrowband irradiation aspects of the systems should have very strict attention paid to the safety aspects of the systems. The powerful infrared energy that is so effective at rapidly curing the coating is very dangerous to the naked eye. It's invisible and is powerful enough to quickly blind a person or animal before he or she can blink. Even sunglasses, or welding glasses, because they have weak filters and may filter the wrong wavelengths, are not adequate to stop the powerful photonic energy from damaging the eye. Some of the longer infrared wavelengths that could be used for the reduction to practice are not able to penetrate to the retina of the eye, but can still damage the cornea, sclera, iris and/or lens of the eye. Often, such wavelengths are incorrectly referred to as being "eye-safe", but that is only true as to the potential damage to the retina of the eye. The system should be designed such that it should eliminate the possibility that anyone could have eye exposure beyond a minimal safe threshold to the narrowband photonic energy that the laser diodes or arrays produce. Failsafe, for example, double backed-up interlock systems, could be designed into control panels or safety guards. They should be designed so that the guards cannot be removed while power is being supplied to the narrowband devices, nor should the design allow power to be jumpered or jerry-rigged to power the devices while any safety guards are removed. Further, all enclosures and guards should be designed so they are light-tight when power could be supplied to the narrowband devices. It is also strongly advised to design the arrays so they cannot be casually hooked up to a power supply when they are not inside the system so that service personnel or curiosity seekers are not tempted to power up the devices and get hurt as a result. Because the powerful narrowband infrared energy is completely invisible to the human eye, the eye cannot actuate a blink reflex until after the damage has been done. While exposure to other parts of the body can be unpleasant or even cause severe burns, it is not as serious as instantaneous exposure of the eye to this energy. Therefore, all applicable agency safety standards should be adhered to and solid design common sense should be exercised to make sure that the narrowband high-speed curing system is safe. It will provide excellent utility but safety must be an integral part of all aspects of using a system built according to the presently described embodiments.

Also, a powerful way of further improving the performance of the presently described embodiments involves putting a special additive into the coating. This will dramatically increase the absorption at a given wavelength. If carefully chosen and matched to the wavelength being employed for the curing, this can help put more of the heat into the coating and less into the aluminum or steel can stock. In other words, the additive or dew point will make the coating much ore absorptive at the wavelength being employed so more of the heating is directly into the coating itself rather than conducted from the metal. It can improve the efficiency of the system by having fewer bounces and therefore less energy wasted in non-curing functionality to attain the required curing or cross-linking temperature.

It is also possible to incorporate using the narrowband infrared energy of this curing system to further optimize the coating that is used. The manufacturer of the coating could employ IR actuated chemical reaction actuators or accelerators that are appropriate for the inside can coating purposes. Also, functional dyes are available which can absorb in specific narrowband infrared wavelength bands. Such dyes are made, for example, by Yamada Chemical Co. The narrowband IR irradiation can be used by chemical coating manufacturers in creative ways to improve their coatings, reduce or eliminate the BPA based coatings, or improve the performance in various ways. Some of the reflections inside the can would inherently direct energy out through the open top of the can. A properly designed system will place reflective surfaces appropriately to, at least partially, direct any exiting energy back into the can to perform further curing until it is spent. However, even the most reflective surfaces give up a few percent of the impacting energy into the reflective material. They are often called Fresnel reflections. Also, some of the energy may be scattered or reflected incorrectly and may never get back into the can. A properly designed reflective shape or cone (64) can provide for better placement of the returned energy so that more of it will be absorbed in the additional passes through the coating and reflections off the base material.

With the embodiments involving the inside of can curing detailed, both the drying oven (for example, a drying station) and the pin chain oven (for example, an outer can surface curing station) functions can be accomplished with major advantages by likewise using precisely directed and controlled narrowband heating technology. As noted above, with each of these stations performing their drying or curing functions in less than 20 seconds, de-tempering, annealing or weakening are prevented from occurring in the can(s). Also, the respective ovens would be designed and configured very differently but they would have in common that they use narrowband infrared radiant technology. Because the narrowband infrared technology uses electricity to provide the fundamental energy to ultimately create the infrared energy, it can completely eliminate hydrocarbon use in the ovens. If the entire plant does so with the three main “heat Process” functions of drying, ink curing, and inside coating curing, the entire plant can be without any hydrocarbon fuel-based heat or oven processes.

Figure 6:
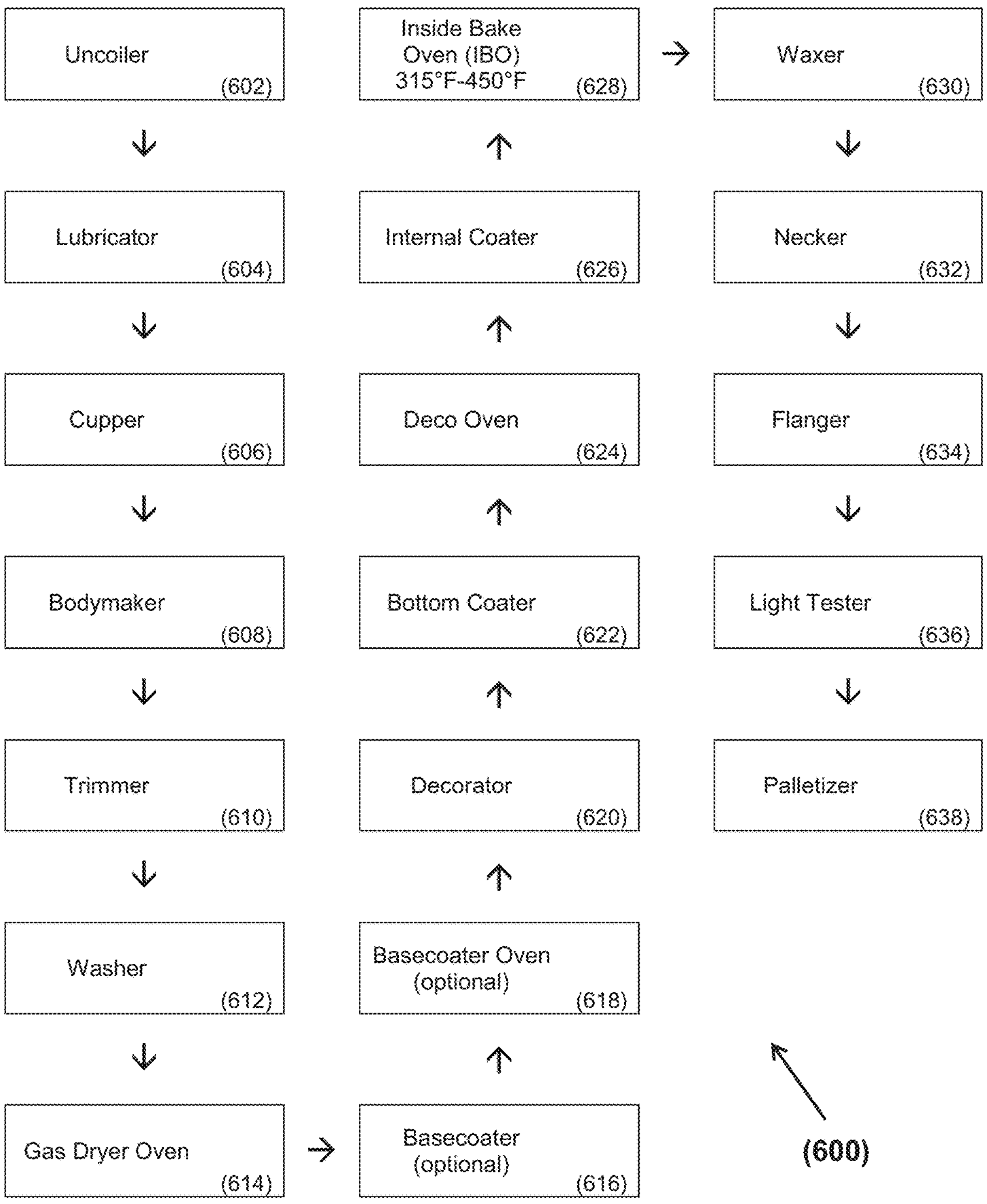
FIG. 6 shows a flow diagram illustrating an exemplary prior method for forming cans.

The drying oven, or drying station, comes just after the washing process in the sequence of can production as shown in FIG. 6 and would still take the form of a mass conveying system. It would employ an open mesh conveyor belt or an open hinged slat arrangement so that radiant infrared energy can be projected from below and up into the cans through their open end, which is facing down. Ideally, the largest possible mesh cross section, providing for maximum open space through which the infrared energy can pass, would create the most efficient design. The width and the speed of the mass conveyor will be sized according to the plant speed and throughput desires. They typically are from 20 to 40 can diameters wide, but can vary beyond that. But it could easily be configured whatever width is desirable and optimal for the can manufacturing plant’s throughput and production speed requirements.

In this mass conveyor drying process application, the actual heating takes place in two ways with the presently described embodiments. The narrowband radiant infrared energy is aimed or projected up through the mesh or perforate belt into the open top of the inverted can. The energy begins bouncing around the inside of the can and imparts energy to the can with each bounce. If the photonic energy encounters water on its way to the interior walls of the can, it will pass through the water thus imparting another quanta of energy which will depend on the thickness of the encountered water. This interplay continues until enough photonic energy has been absorbed by the combination of the water and the aluminum to heat the water to an evaporation temperature. Increased evaporation occurs at quite modest temperatures but is accelerated at higher and higher temperatures. Of course, if the water reaches its gas transition temperature of 212 degrees Fahrenheit, it will become water vapor and then only needs air movement to remove it from the can. The air movement can be provided by fans and blowers configured to introduce fresh, drier air into the cans to allow the heavier vapor-laden air to come out and be ducted away.

Although many different infrared wavelengths will work effectively for this application, even greater efficiency can be gained by utilizing a wavelength that is much more rapidly absorbed by the target. Water is the major component of the coating. The shortest wavelength water absorption peak is at 1456 nanometers. While any of the water absorption peaks can be used, 1456 is the easiest wavelength at which to manufacture powerful semiconductor-based irradiation devices. The absorption propensity at circa 1450 nanometers is many times what the absorption rate is at for example 1000 nanometers. Another absorption peak exists at 1932 nanometers which is about four times as absorbent as the 1450 peak. It is however much more difficult to manufacture semiconductor-based irradiation devices at 1932 versus 1450. The longer the wavelength, the lower the wall plug efficiency of the semiconductor devices will be. The aluminum, however, has an absorption at around 1000 nanometers that is greater than at longer wavelengths, so there may be an optimization tradeoff to be considered. Therefor it is necessary for the application engineer to determine if the extra absorptivity is worth the reduced power and reduced wall plug efficiency that is typical of the longer wavelength devices.

While what has been described so far utilizes narrowband technology with a mass conveyor, it is also possible to configure it such that it dries each individual can on, for example, a serial, single file conveyor. The configurations would be very similar to the inside of can curing described above. The biggest difference would be that the can does not yet have any coating in it and does not need to be heated up to as high a temperature as do cans that have an inside of can coating that is being cured. The objective of the drying oven is to simply remove the leftover deionized water which has not yet drained or evaporated out of the can. Again, the evaporation of the water is accelerated by any temperature elevation but need not ever be raised above the boiling point of 212 degrees Fahrenheit at sea level. At higher altitude locations, it might not be necessary to raise the temperature as high to get the state change to water vapor and thus provide for faster evaporation.

The pin chain oven, or outer can surface curing station, requires a completely different deployment of narrowband technology. The pin chain oven’s purpose is to cure the ink that has just been printed on to the outside perimeter of the can. The reality is, it does not completely cure the ink in this oven but during its short exposure in the pin chain oven, it cures it sufficiently that it will not rub, smear, or spoil the printing until further curing occurs in the IBO.

The application requirements in the pin chain oven set up well to take good advantage of the aiming and focusing capability of the laser arrays. As radiant energy is aimed at the cylindrical outer periphery of the can, some of the energy is absorbed in the ink and then proceeds through and some of it is absorbed in the aluminum substrate. It will bounce off the aluminum substrate and pass back through the ink thus providing for more deposition of heat energy in the ink on its way out. However, unlike when energy is projected inside the can, care must be taken with this application to make sure that the energy is returned to the can and not reflected off into random space and wasted. Mirrored surfaces can be placed around the can to reflect the energy back in the direction of the can. But the problem with a mirror is the angle of incidence equals the angle of reflection so it is extremely difficult if not impossible to position mirrored surfaces that will actually reflect the energy back precisely where it is needed on the outside of the can. Modeling shows that after the first couple reflections, control of the direction of the reflections is almost completely lost.

Figure 9:
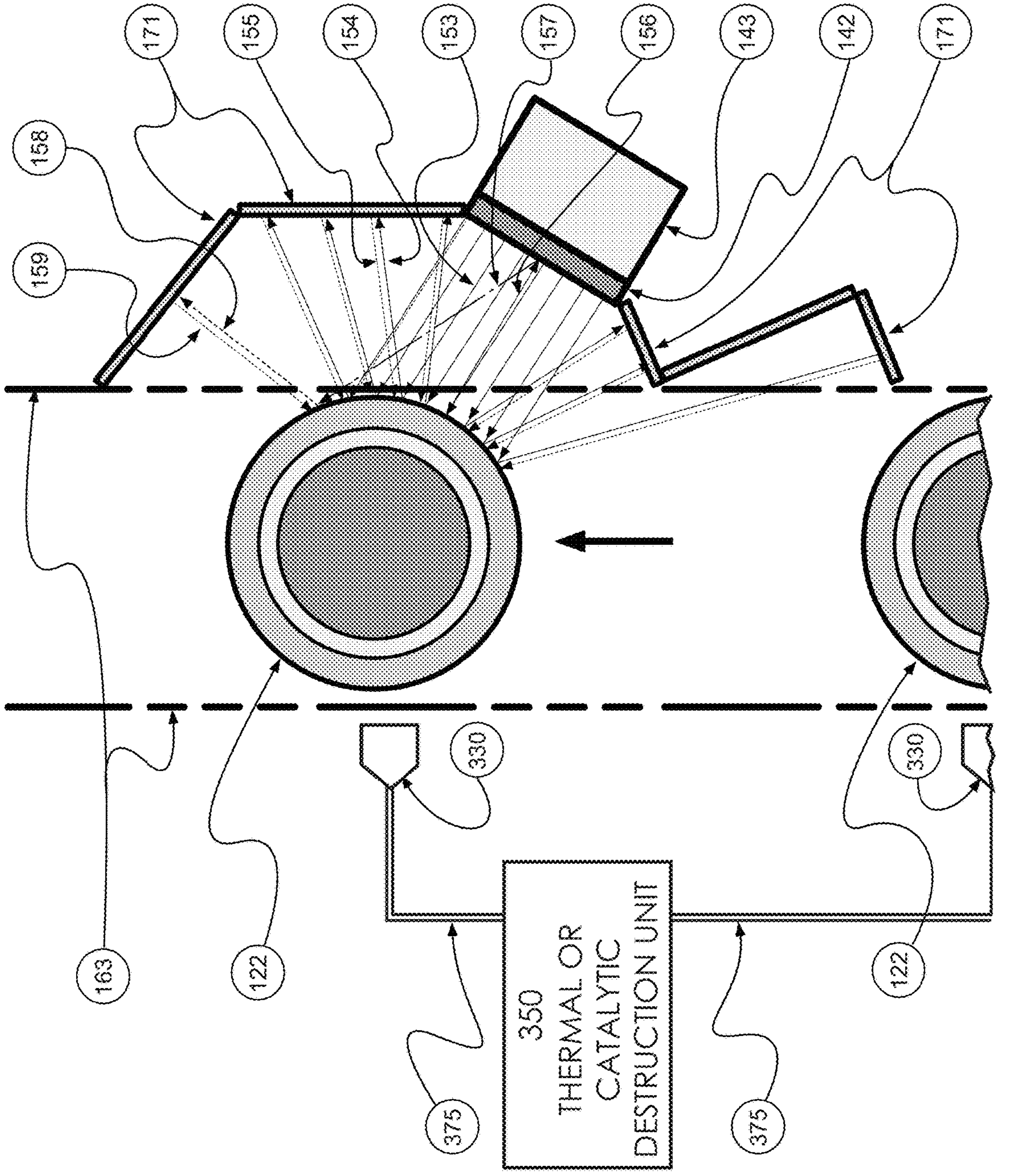
FIG. 9 shows another system according to the presently described embodiments.

A much more elegant way of reflecting the energy back to the can is by utilizing corner cube reflection sheets which can vary in configuration but, as an example, will be configured to have a plurality (e.g. tens, or hundreds or thousands) of suitably sized corner cub reflectors to achieve the desired results depending on the implementation. Various applications and use of such sheets and related technologies are fully described in U.S. patent application Ser. No. 13/102,588, filed May 6, 2011 (and entitled, “Corner-Cube Irradiation Control”), which is incorporated herein by reference in its entirety. Fundamentally, the sheets must be positioned as orthogonally as possible to the direction from which it is anticipated the reflections will come in order to send the energy back to exactly the point from which it was reflected from the can. FIG. 9 shows corner cube reflection sheets arrayed around the can but beyond the “no fly zone” through which the cans must travel on the conveyor. Great care must be taken that the cans do not touch anything or the ink will be smeared. The concept which must be executed effectively is to maximize the amount of narrowband energy that impacts the can directly and then to harness as much of the reflective energy to return it back to the inked outer surface of the can as possible.

Because the laser arrays can be aimed and focused very precisely, it facilitates having a high concentration of energy which will heat the ink and cans very quickly. If the energy is focused on the side wall of the can as it is passing, it will really only be focused properly for a short moment and then it will be aiming between cans and wasted. One solution to this is to articulate and track the can as it goes past with a servo or galvanometer controlled mirror such that the energy will continue to be focused in the right location on the can body for a more extended period of time. While this is a viable solution, it requires extra mechanism and sophistication which then could bring maintenance and setup problems.

Another solution is to turn off the array when the can is not in its area of focus. The array would then be turned back on at the desired timing when the next can is coming into its view. If this is done strategically, one can conserve on power supplies by arranging the positioning and therefor the timing so that two or more arrays can share the same power supply. The DC power from the power supply would simply be switched to whichever array needs the power at that timing moment.

An additional way of augmenting the quick heating to cure the ink would be to inject some or all of the heat into the inside of the can. This has the advantage of not requiring so much reflection management because energy that is injected into the open top of the can bounces around inherently until it is either absorbed or bounces completely out of the can. By locating one or more highly focused arrays so that its energy is focused into the open end of the can and timing a powerful pulse of energy at the time when the can’s opening is perfectly aligned with the focal pattern, it is possible to inject the energy in to provide fast heating. Because the photonic energy cannot be turned on for longer than just a momentary pulse before the can is no longer in the correct position, it will usually be necessary to have a series of arrays that are sequentially injecting more energy as the can proceeds along its path through the high speed, narrowband oven. It is, however, possible to push laser diode arrays to a much higher current input level for the momentary pulse compared to steady state operation. There are other ways of injecting high powered, narrowband photonic energy into the open end of the can by designing the material handling means to make the can available either in an indexing way or with continuous tracking similar to the concepts taught for the inside bake oven. The only significant difference is that the can will likely have to be held by a vacuum to keep the ink from bumping or being scuffed/smeared by anything.

One advantage of using electric or narrowband irradiation throughout the can plant is the complete elimination of hydrocarbon fuels, $CO_2$, nitrous oxides and some other pollutants through the entire process from aluminum coil to finished can.

Another advantage of eliminating the hydrocarbon fuels, $CO_2$, nitrous oxides and other combustion pollutants, is the dramatic improvement in public relations with people who live near the plant which may be producing smelly or noxious pollutants from one of the ovens. Continual maintenance is necessary by sometimes unavailable knowledgeable people to make sure the combustion is clean, properly scrubbed, and the ovens are properly maintained and optimized. Environmental advocates are very much opposed to natural gas or hydrocarbon-fueled ovens in a can plant.

Another advantage of using electric or narrowband irradiation throughout the can plant is the ability to use renewable fuel sources to power the entire plant such as windmills, hydro-electric power, and solar panel/photo-voltaic cells.

Another advantage is derived from any of the three types of ovens described herein when they are utilizing narrowband irradiation. If the drying or curing occurs rapidly, as is possible if the presently described embodiments are implemented correctly, it happens too fast for the annealing or strength loss that occurs with the current technology that is being utilized. The time at temperature is too short with this curing methodology to allow the grain-growth which is fundamental to the weakening phenomenon that occurs with longer curing times. Because of the high speed drying or high-speed curing or both if both are being employed, the aluminum stays stronger, thus making for a stronger can.

Another advantage of the narrowband curing and drying is there is progressively greater benefit that accrues with each successive oven in the plant that is implemented with this technology. Therefore, if a can is manufactured with all three ovens in the process being high speed, narrowband technology, it is possible to maintain all of the strength that is inherent in the aluminum after the drawing and ironing processes. In other words, although the deep drawing and ironing processes have their own effect on the aluminum’s grain size and work hardening none of the annealing that currently occurs as a result of the ovens would result at the end of the process because the narrowband, high speed drying/curing will have been used exclusively.

Another important advantage to implement the quick, narrowband technology for curing and drying is the ability to save a substantial amount of aluminum in the process, which can be from 10 to 14%. Because there are so many differences in the can making tooling, reduction steps, and oven treatments the savings in aluminum is a function of many variables that can be addressed to optimize the savings. A can of the same strength can be manufactured with less aluminum by manufacturing it from thinner coil-stock material. An alternative major advantage is to save a substantial amount of aluminum required to manufacture a can by staying with the same starting coil-stock thickness but changing the tooling to manufacture the same essential can shape, liquid capacity, and specification from a smaller diameter blank which ultimately will allow the can to be formed with selectively thinner sections.

A further benefit of these advantages is the ability to manufacture a given number of cans from a narrower coil-strip of the same thickness.

Yet another advantage of implementing narrowband technology for these applications is that it saves raw material resources in multiple ways. It reduces carbon footprint, processing costs, and raw materials all the way through the aluminum manufacturing and can commercialization process. It saves on transportation costs from the aluminum rolling mill to the can manufacturing plant, from the can manufacturing plant to the filling plant, from the filling plant to the distribution warehouse, from the distribution warehouse to the retail store, and from the retail store to the consumers who use the product. It also reduces the tonnage and resources involved in the recycling stream. Because the cans made in this way will be thinner, they will be crushed and briquetted more easily and will be melted with less energy for remanufacturing/recycling.

Because the narrowband technology is digital, programmable, and highly controllable, it is not necessary to heat the cans beyond the ideal temperature, thus saving energy and preventing any unnecessary metal weakening or annealing.

Yet another advantage of implementing any of these ovens with narrowband technology is the ability to close the loop by using infrared sensors, thermocouples, or infrared cameras to ascertain the temperature of the cans and then modulate the narrowband energy delivery to keep the energy usage and temperature optimal.

If the mass conveying implementation is utilized then the correct width of irradiation energy projection can be used to conserve energy. If, for example, several upstream body makers and trimmers are not being utilized because they are being maintained or for other reasons, a narrower stream of cans can be processed through the oven without wasting the extra width that would be inherent with the conventional, broadband oven. The current broadband ovens offer only the choice of all or nothing as to whether they will be turned on or not. This will also be an advantage during reduced or modulated production periods, facilitating the matching of production output to demand or need.

Another advantage of the technology when used for mass conveying is the facility to measure the temperature of the cans across the width of the conveyor and then close the loop to correct the temperature quickly so as to not over or under heat the cans. The temperature can be measured by positioning several non-contact sensors which could be infrared sensors or infrared cameras to verify the temperatures and then send that information to a control system which controls the irradiation arrays to modulate the output or the conveyor speed accordingly. The temperature can also be modulated across the width of the conveyor or anywhere across the mass of the conveyor if it is not heating consistently across the conveyor or if convective air currents or something else is cooling some cans more than others.

When implementing narrowband technology for the pin chain oven, another advantage accrues which is that of turning the arrays on when a can has arrived into an irradiation position and turning it off between cans. This has the advantage of eliminating the input power supply energy draw waste between cans.

A further advantage for the narrowband pin chain oven is the possibility of sharing power supplies between two or more arrays. With good planning, this reduces the number of power supplies required to implement a system, and thus reduces the system cost. If implemented correctly, it could also extend the life of the power supplies by producing less severe thermal cycling of the electronic components.

A further advantage of maintaining the strength of the aluminum, is that it increases bottom reversal strength which then allows greater pressure to be built in the can safely for the same thickness can material. Another advantage of maintaining the full strength of the aluminum is that the can could be manufactured out of thinner material and still have the specified strength of a can made the conventional over-built way.

The advantage accrues from maintaining the full strength of the aluminum that a narrower cut strip coil can be used to produce smaller diameter blanks which then produces a smaller diameter cup from which the balance of the process can proceed. This facilitates making a similar strength can from roughly 10 to 14% less aluminum.

By maintaining the full strength of the aluminum and not annealing or weakening it, the advantage accrues that a stronger can may be manufactured with the same exact tooling and aluminum substrate.

Yet a further advantage of this technology which allows manufacturing a can that will be lighter is that there is less mass of aluminum to heat. This means that whether it is in the drying oven, in the pin chain oven, or in the inside bake oven (IBO), it will take proportionally fewer joules of energy to heat the cans to get the desired effect for the intended purpose of that oven. This not only reduces energy costs but it increases the possible throughput speed, thus reducing the time and energy that is necessary to heat each can to the target temperature or to accomplish the intended purpose.

Yet a further advantage of implementing the pin chain conveyor with this high speed, narrowband technology is that the size of the oven could be reduced by up to 75% or more.

A further advantage of implementing narrowband technology for the pin chain oven would be a dramatic reduction in the ambient heat released into the plant near the oven and a dramatic reduction in the sound pressure level produced by all the moving chain/belt components and the convection blowers.

Another advantage of implementing an entire plant with this high speed, narrowband heating technology would be a dramatic reduction in the floor space required in a can body manufacturing plant. The ovens are some of the most space consuming portions of the plant machinery and equipment and if properly implemented, the space required by each of them should be reduced by up to 75% or more.

A further advantage of this technology is the ability that it gives the implementer of the technology the ability to aim, focus and control the energy very precisely. The best type of narrowband devices with which to implement this technology is typically laser diodes because they can produce very high power levels very straightforwardly, especially when configured in massed arrays thereof. Fiber lasers and other narrowband devices can be utilized. When using any type laser device, even though infrared devices would typically be chosen, the output photonic or light energy can be shaped with similar modalities to those used for visible light. Therefore, any of refraction, diffraction, reflection, and diffusion components can all be used very effectively by someone implementing the presently described embodiments to assist in getting the energy where it needs to be at the right time and intensity. This is very important to get the overall systemic efficiency and to get the speed of heating that creates so many advantages.

The narrowband pin chain oven, if implemented well, eliminates the need to turn or rotate the can while it is passing in front of the irradiation units. Because of the precision of the aiming and because there is space between the cans, all 360 degrees of the can's perimeter can be precisely irradiated without rotating the can.

Figure 12:
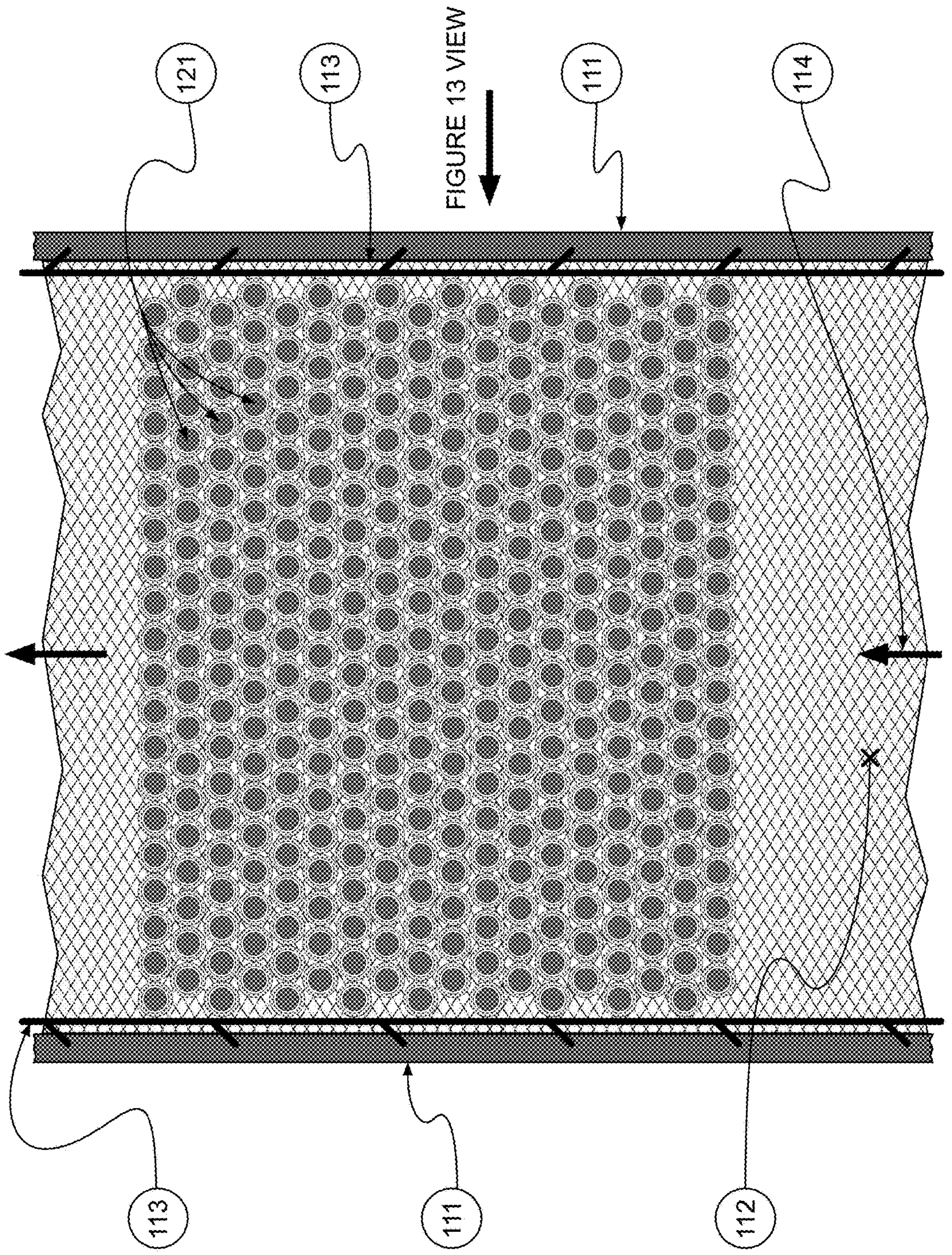
FIG. 12 shows another system according to the presently described embodiments.

Reference is now made back to the drawings. The narrowband drying oven would be configured to function as a mass conveyor to replace, supplement, or augment the gas dryer oven (614), for example, referenced in the system described in FIG. 6. FIG. 12 shows an overhead view of a mass conveyor. It shows the bottoms of the cans (121) because the cans are inverted so that they will drain with the assistance of gravity. The belt material (112) is shown moving the mass of cans in a direction (114). The belt (112) simply needs to, at some level, be transparent to the wavelength of light or irradiation that is being used by the narrowband irradiation sources. It can be a variety of types of material including mesh fabric that is very open weave, or some sort of chain-mail or chain-link belting material. Preferably it needs to have a very high percentage of open space on a cross sectional basis in the vertical direction. The idea is to be able to pass the maximum amount of light and not cause too much back reflection. The more transparency or openness that the belt has, the less the belt will get heated and the more energy it will facilitate transmitting to the targeted can components. Thin, strategically shaped and hinged, vertical metal slats which have substantial cross section in the vertical direction and very little cross section in the horizontal direction can work very well because they will provide strength across the width and length of the belt and yet still provide a lot of pass through space in the vertical direction. Also, the vertical sidewalls of such hinged conveyor pieces can provide terrific reflections off their vertical sidewalls, which will end up assisting in the heating process as it reaches the cans. Whatever material is chosen for the belting material, it must be able to handle the heat of the irradiation at a very high duty cycle, and must also be resistant to any remaining dripping hydrofluoric acid or hot water. The belting needs to be structurally rigid enough that it doesn't sag across the width of the belt, causing problems with the can travel and positioning. The belting material (112) is supported by the frame (111) along the edges and additional structure (110). The additional structure (110) will be configured as is necessary to structurally position and align all of the sections and components of the conveyor and the drive components for correct functionality. Like unto a typical conveyor, there will typically be a pulley at each end, at least one of which will be driven by a motor system which can be adjusted to maintain the correct speed through the drying process for effective functionality. For best functionality, the section of the belt (112A-FIG. 13) which is immediately under and carries the cans should be driven such that it pulls the belt through the work section of the oven rather than pushing it through. It must transport the cans away from the acid and deionized water rinse baths while the return section of belting (112B-FIG. 13) will be moving below the top structure and below the irradiation units. Along both sides of the conveyor should be a railing structure of some sort (113) which simply functions to keep the cans corralled and moving together in a pack so as to not separate or slide off the conveyor.

It is important, because the irradiation is powerful infrared light, that the conveyor system is fully shrouded for safety to absolutely keep the infrared photonic energy away from people's eyes and bodies. Since infrared is invisible, the normal blink reflex of the eye does not function to protect the eye and retina from the powerful light energy. Infrared can melt or damage wire insulation, plastic components, and many other things without easy awareness, so this must be understood when designing a high-speed narrowband oven. All items that are exposed to the energy directly must either be able to continually reflect the energy or capable of withstanding the heat to which it may be exposed. The implementer of the presently described embodiments should always be aware of laying out the configuration of any of the narrowband irradiation so that it cannot find bounce paths out of the oven and into eyes in any way. Baffles and shrouds or turning corners under or within the shrouds can usually be used effectively to make sure that the energy has made enough bounces to reduce its concentration or weaken its intensity to a safe level before it can exit the conveyor's covering. No matter what, the energy must be sufficiently absorbed or diffused to safe levels before it can find a path to leave the oven. Also, signage must be properly positioned to warn people or operators of the inherent dangers that must be avoided with powerful IR radiant-energy based systems. Electricians or technicians must be warned of these dangers so they don't perform dangerous operations when working on, troubleshooting, or otherwise interacting with these systems. In at least one form, the control system may function to monitor (through, for example, suitable sensors) whether personnel enter an area of concern or whether undesired energy is not contained.

Figure 13:
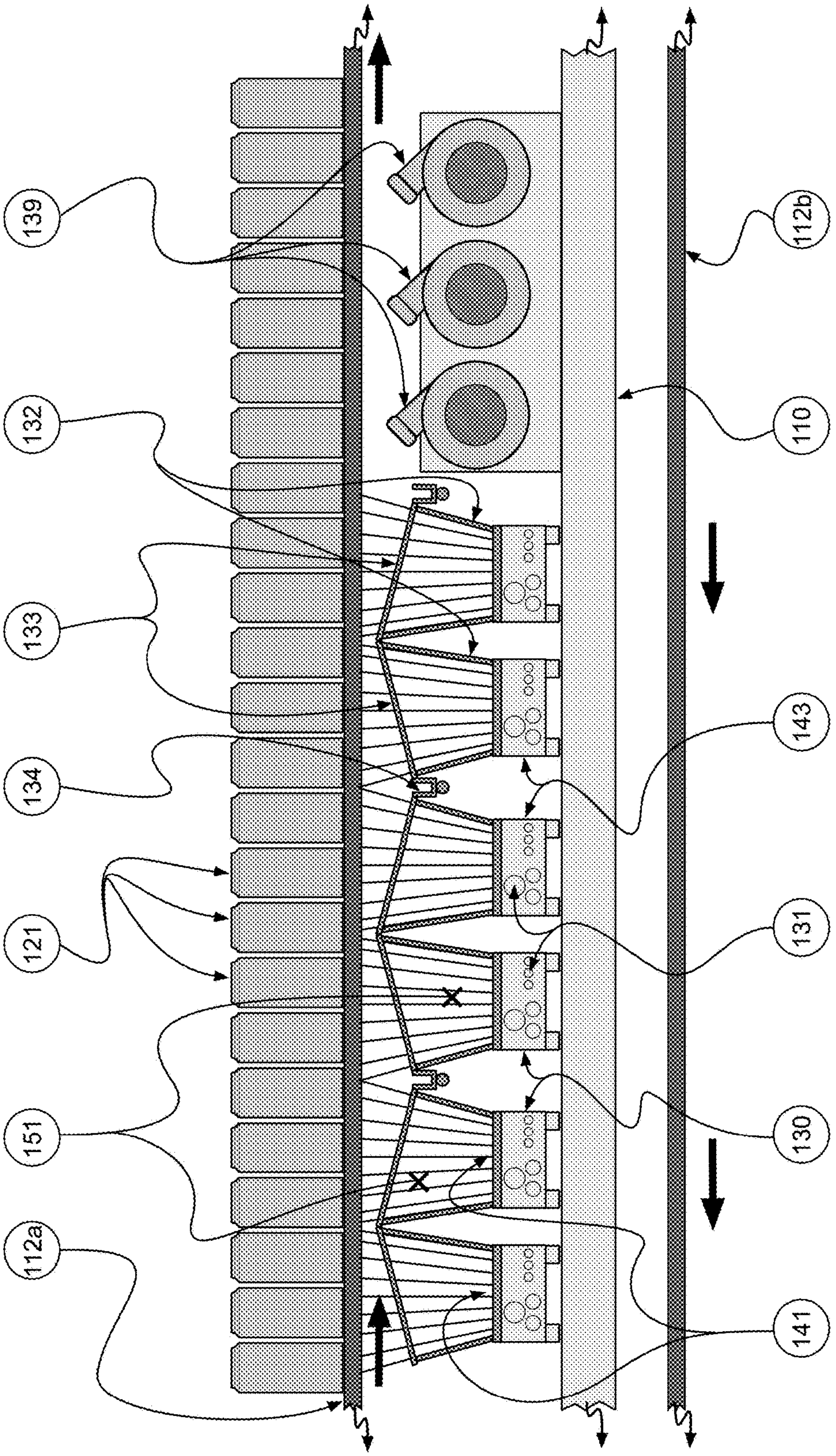
FIG. 13 shows another view of the system of FIG. 12 according to the presently described embodiments; and, FIG. 14 shows another system according to the presently described embodiments.

As indicated on FIG. 12, which shows the direction of view of FIG. 13, FIG. 13 is a cross sectional view of the conveyor along its length. It shows the cans (121) riding on the belt (112A) with the closed, dome end of the cans up. At this drying station according to the presently described embodiments, the irradiation arrays are positioned in irradiation housings (130), the number of which is dependent upon how much total and local irradiation power is required for the particular application and speed. It should be well known and understood by the implementer of the presently described embodiments what the irradiation power density is from the arrays that are employed. Both classical calculations and practical assays can be used to determine how many joules of energy are required to raise the temperature of the remaining coating, ink, or water in/on the cans along with the energy that will be absorbed by the cans themselves.

As was already indicated, it may be sometimes desirable but it is not generally recommended to raise the temperature of the cans and remaining water above its boiling point of 212 degrees Fahrenheit. Any elevated temperature will increase the water's propensity to evaporate which will be improved further by the flow of air which can carry away the evaporated water. As many housings (130) as are necessary can be deployed under the width and length of the conveyor to provide the amount of energy that is required to raise the heat quickly enough to do a timely drying operation. One type of standard narrowband laser array that is available, can put out somewhat in excess of 300 watts of radiant photonic energy. Positioning such arrays edge to edge with one another along the length of housings like 130, allows for a continuous irradiation output across the width of the belt (112). The output pattern must be well understood so the arrays or individual devices can be positioned to provide for a relatively homogeneous energy field at the location of the target cans. With great engineering care, enough of these arrayed banks in housings like (130) can be positioned along the length of the conveyor (111) to provide sufficient irradiation power with excellent consistency of power density for nearly any drying application.

The face of the arrays (141) are facing up through the mesh belt and into the open ends of the still straight-walled cans (121). The irradiation (151) can be roughly reflectively guided by the baffle reflectors (132) so that the energy goes toward the target. It is possible to use lenses, micro-lens arrays, or diffusers as may be chosen, to spread or narrow the beams accordingly to provide for the best energy entrance into the cans. Since some liquid water will probably still be dripping out of the cans, especially in the early part of the drying operation, optically transparent windows (133) can be placed to protect the arrays from direct dripping water. The windows are, in at least one form, optically transparent or transmissive at least at wavelength(s) and/or wavelength range(s) applied in the drying process. The protective windows (133) are best mounted at a slight angle to promote water runoff like a roof. The protective windows (133) should be properly sealed where they meet with the reflective structures (132) so that it does not allow water or liquid moisture to enter the enclosed chamber. The protective windows may also be provided with an anti-reflective coating that is functional at applied wavelengths or wavelength bands. Gravity will carry liquid water down the slope of 133 into drainage troughs or gutters (134) which can be suitably positioned on or near the edge of the protective window to carry off any liquid water. In any event, it is wise to arrange the system so the arrays are protected and not vulnerable and are not subject to water nor any other random contaminants that may tend to fall off the belt or from inside the cans.

The fundamental narrowband devices are most typically laser diodes. They are generally assembled in to arrays of from dozens to hundreds of devices (141). Their efficiency can vary substantially and are typically some place between 20% and 65% "wall plug efficiency", depending on many factors. The wavelength chosen for implementation is the biggest driver of the efficiency but the style of device chosen is also a determinant. The input DC electrical energy which does not come out the laser's output facet as light or photonic energy, turns into heat which warms the devices and therefore the entire array. One of the best devices for their combination of efficiency, and overall robustness are surface emitting devices. Specifically, SE-DFB devices have proven to be robust performers but can be run in series to facilitate ideal drive voltages for great cost efficiency and practicality.

Excess heat energy in laser diode arrays must be carried away. For typical high duty cycle industrial applications, either water cooling or refrigerant-based chiller cooling is desirable to keep the semiconductor devices in their temperature sweet spot. The cooler they are the longer they will last and the higher will be their output. They cannot be chilled so they are too cold or condensation will occur which can be damaging for other reasons. Generally speaking, semi-conductor laser arrays should be kept at or below normal room temperature for good life. The cooling tubes and electrical wires (131) pass through the housing (130) and are connected to each of the arrays therein. For industrial applications, many different kinds of cooling can be employed. Cooling or chilling technology can be employed which ranges from heat exchangers to refrigerant-based chillers. Rooftop units which take advantage cool seasonal temperatures can provide an additional efficiency for effective cooling. Cooling towers, geothermal systems, or large volume water facilities, if engineered properly, can also be used with great effectiveness.

Fans and blowers as depicted in 139 of FIG. 13, should be implemented as needed to provide adequate air flow for effective drying. Lamellar air flow can be used immediately under the belt (112A) to continually change the airspace between the irradiation array protective glass (133) and the bottom of the belt (112A). In at least one form, higher speed air flow may be provided at the mouths of the cans to remove water vapor more efficiently. The implementer of the presently described embodiments will have to be careful to provide enough airflow to augment the irradiation for effective drying but not so much flow or air pressure that it tends to lift the cans (121) off of the belt (112A). With a little experimentation, proper implementation can be achieved which provides very fast drying without creating a time at temperature situation which anneals and weakens the aluminum.

It is also possible to get some dual-purpose functionality and improved efficiency out of whatever heat exchanger blowers will be employed to keep the arrays cool. While the air coming out of the heat exchangers or chillers is already slightly warmed, it will inure as an advantage to guide and accelerate that air past the open end of the cans to help with the removal of the water vapor laden air that will be immerging from the cans.

In addition, it should be appreciated that the system may well have additional blowers to blow-off or help dry water that may collect in the domes of the cans (which are upside down). The blowers may function before or during the drying process.

Figure 10:
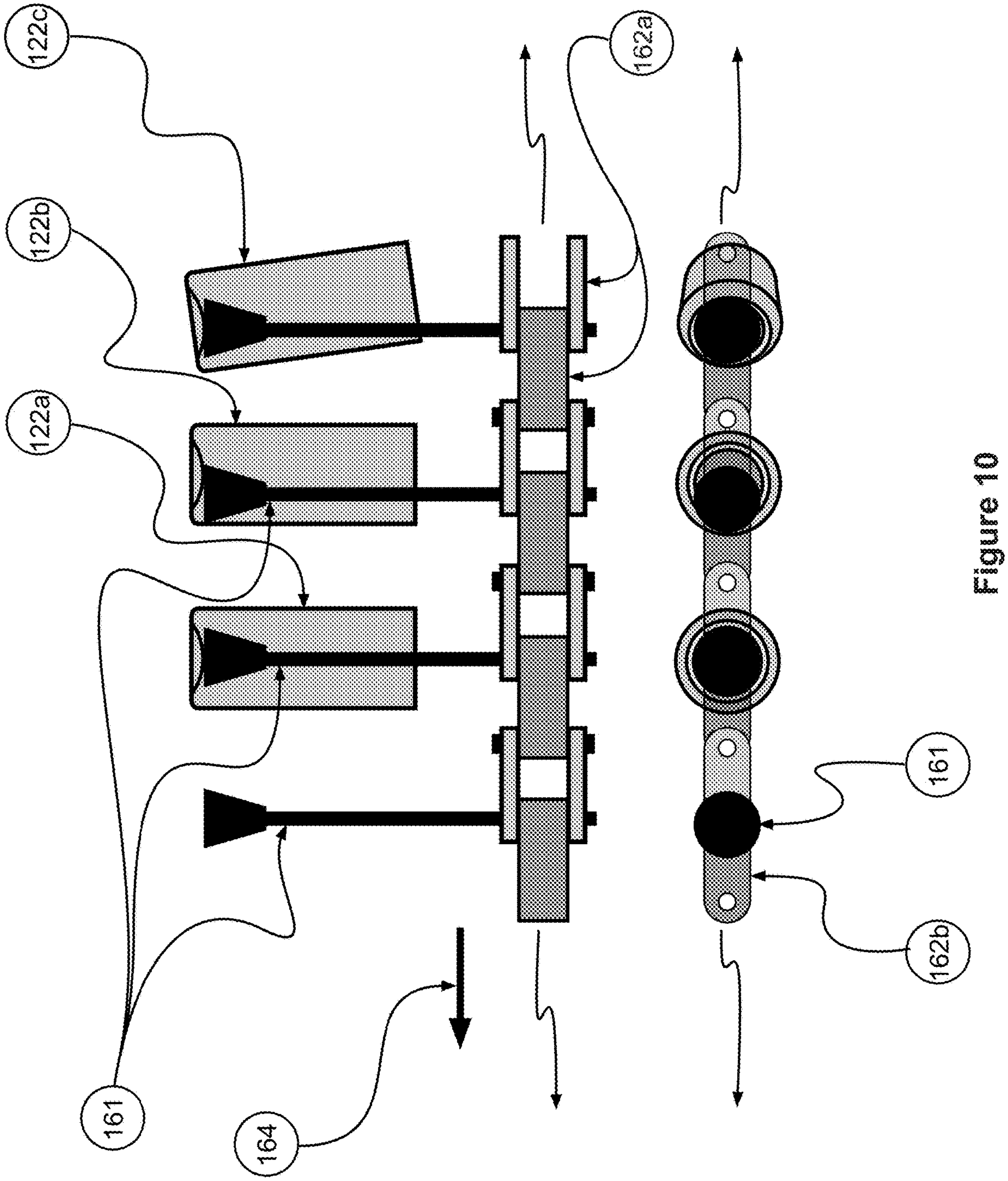
FIG. 10 shows another system according to the presently described embodiments.

With reference to FIG. 10, it should also be appreciated that, although a pin chain conveyor is shown in this example embodiment, other types of conveyors such as, e.g., vacuum or belt conveyors may also be implemented. The pin chain conveyor is depicted in FIG. 10 with an enlarged link belt (162A), which is shown for conceptual clarity. An array of sprockets is positioned in a single plane but such that the link belt is zig zagged through the oven with 8 to 15 feet straight sections between each sprocket. The purpose for the zig zag or serpentine weave is to extend the time that the just-inked cans spend in the oven. The plane of the serpentine weave of link-belt is tilted back somewhat so that gravity will help the cans stay on the pins during their high-speed ride. Since the ink is wet, it is crucial that nothing can touch the outer cylindrical perimeter of the can because it will smear the wet ink. The pins (161) which form a long extension of the hinge pin, every so many joints of the belt, are by design somewhat longer than the can's depth. In this fashion, the cans are held away from each other and away from the link belt and with space between them so that they can dry effectively in the oven. FIG. 10 shows how the cans are supported by the pins during their transport through the pin-chain oven.

The cans have some degrees of freedom. For example, can 122A is merely perfectly centered relative to the pin (161) on which it rides. A can may sometimes find itself in that position because of jostling, gravity, or centripetal force created when the belt zings around one of the sprockets. But more typically they settle into a position like 122B when the current weave of the conveyor is against gravity in the direction (164), but the same can may jostle and reposition in to, for example, the position like 122C. While the cans move around slightly on their pins, they are held away from one another so they will not smear the ink. The presently described embodiments can be implemented with the pin-chain configuration similar or even identical to what it is currently. For example, with reference to FIG. 6, the pin chain conveyor/oven or deco oven (e.g. deco oven (624)) (and/or, in some cases, the basecoater oven (618)) could be replaced, supplemented or augmented with a suitable configuration according to the presently described embodiments. In this regard, for example, FIG. 9 shows a curing or irradiation station and a view along the long axis of a pin (161) similar to the view of the multi-link conveyor (162B). FIG. 9 shows a can (122) which is moving past the array assembly housing (143) such that it can irradiate it with nearly orthogonal arrays on the portion of the can that most nearly faces or is orthogonal to the array (143). In at least one form, a portion of the irradiation may also be aimed or directed to cure bottom coating that may have been applied by a bottom coater in the system (see, e.g., FIG. 6). Referring back to FIG. 9, an encoder would track the progress of the conveyor (162) such that the control system can turn on the DC electrical to array (142) to send powerful narrow-band irradiation toward the perimeter of the can that is nearest the array. The ink is very thin so the energy will penetrate through the ink while some of the energy is being absorbed immediately and directly into the ink, much of the photonic energy will travel on through and impact the aluminum can body (122) which is the substrate under the ink. Upon impacting the aluminum can body, it will deposit some of the photonic energy into the aluminum and then most of the energy will reflect back. For a normal reflection off a simple flat reflective surface, the angle of incidence equals the angle of reflection. For each micro location, this is true but the collection of photons has a beam width. So, given that it is hitting a curved surface, the energy will reflect back in an imperfect curved spray. The engineering challenge is to not waste the reflected energy and to arrange mirrors or some sort of reflection devices to return it back to the can. The problem is that flat mirrors also have the property of angle of incidence equals angle of reflection, so unless the mirror is perfectly angled back toward the can surface, the energy will reflect off at an undesirable set of angles, with most of it having a high probability of missing the can completely. Even if it reflects where it is wanted on the first bounce, it likely will headed in a random direction after the next bounce. There is a better way of configuring this. If on FIG. 9 you follow ray 153 to the impact point with the can, it reflects back as ray 154. Although different types of mirror or optical arrangements could be implemented in connection with the presently described embodiments (at least some with challenges such as those noted), if we implement a corner cube reflection sheet (171), it will function to reflect the ray 155 straight back to very close to where it originated on the can body surface after the first reflection. That is, the corner cube reflector material or sheet(s) are strategically positioned such that irradiation reflected from the outer surface of the cans subsequently reflects off the corner cube reflector material back to substantially a location on the outer surface of the cans proximate to where the irradiation originally reflected.

This process can then continue over and over until the energy is exhausted. Each time the photonic energy passes through the ink and reflects off the aluminum and back through the ink again, its temperature is raised. If we place a corner cube reflection sheet material as orthogonal as we can with respect to the direction from which we expect the reflections to come, we can improve this energy utilization substantially. Another example is ray 156 which returns from its first bounce off the can and reflects at an oddball angle off something in the array itself, thus creating ray 157. Ray 157 impacts the can's surface and reflects as 158 and if we have properly placed the corner cube reflection sheet (171), it will return a ray 159 back to the can body again. Several other examples are shown in FIG. 9 of this same type of optimization.

Figure 11:
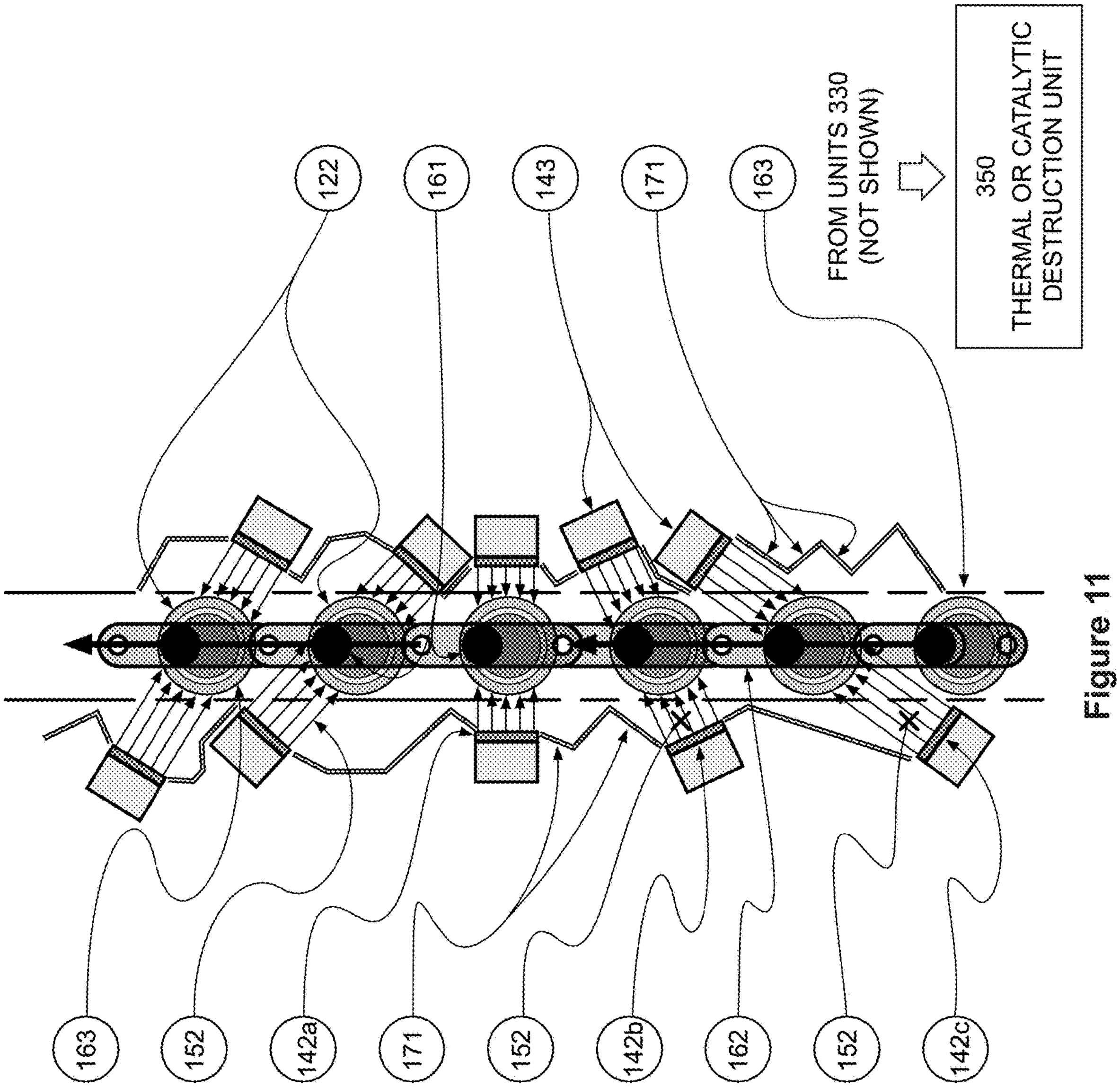
FIG. 11 shows another system according to the presently described embodiments.

FIG. 11 is an overhead view of multiple curing or irradiation stations that are aiming at the can along its path. We see irradiation (152) being projected at the can at different angles so that ultimately after multiple irradiation stations, all surfaces of the can have been hit by direct photonic radiant energy. The irradiation housings (143) are placed along the conveyor at various angles to facilitate the direct radiant energy impacting the right locations on the cans (122). The implementer of the presently described embodiments can spread the arrays out so that more space is allowed around each array for the corner cube reflection sheet (171) or they can be placed closer together to reduce the temperature losses which will actually occur between the radiant energy doses at the different stations. There is an engineering tradeoff there which must be experimented with given the particular geometries and application circumstances. For example, the corner cube reflector material or sheets of corner cube reflector arrays may be strategically positioned relative to each curing or irradiation station to be substantially orthogonal to a tangent of the outer surfaces of the cans and between the arrays. As noted, the plurality of irradiation stations are, in at least some forms, configured such that the arrays are positioned at different angles designed to cure ink or coatings around the entire surface or entire periphery or circumference of each can.

Figure 14:
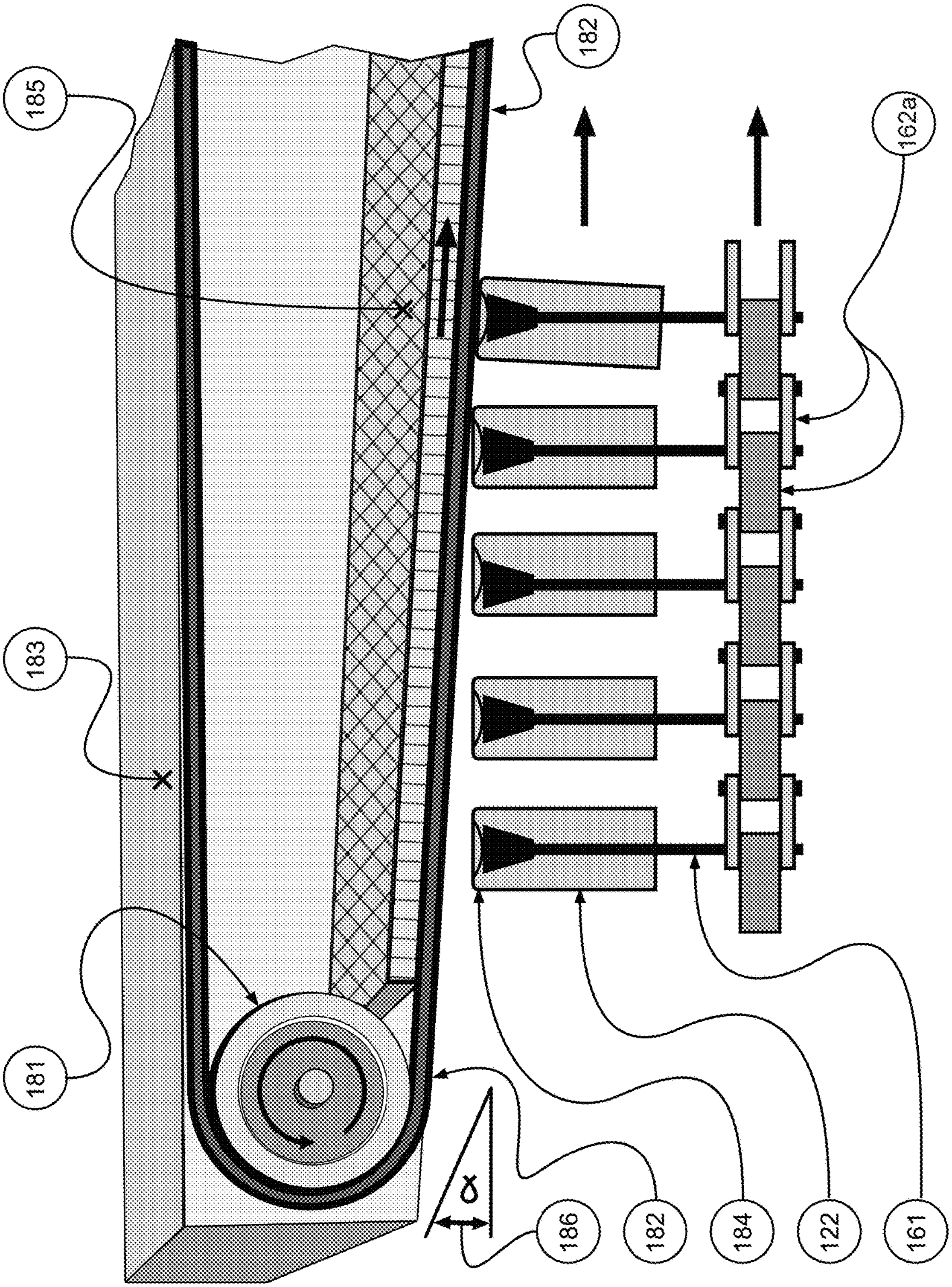

FIG. 14 shows a pin chain conveyor that is brought gradually closer to a vacuum flat belt conveyor (183) which has an angle (186) between the plane of the top of the cans on the pin chain conveyor compared to the plane of the surface of the vacuum belt (182). By creating a gradual approach angle, it is possible to create a very stable and planar flow of the cans (122) along the planar surface of the vacuum belt (182). This can be used to create additional can stability and can be optionally used in conjunction with the configuration shown on FIG. 9 and FIG. 11. The vacuum plenum (185) will draw air through the vacuum holes in the vacuum belt (182) in order to pull the bottom plane (the plane on which and opened can would rest on a table) of the can firmly against the vacuum conveyor belt.

In at least some of the presently described embodiments, the system is provided with heating systems/subsystems and suitable destruction systems/subsystems to address undesired Volatile Organic Compound (VOC) emission during the curing process. In this regard, undesired VOCs may be generated and emitted during the curing process of the inside of can coatings and also during the curing process of the ink on the outer surface of containers. As such, according to the presently described embodiments, a heating system/subsystem is provided to a venting configuration for the curing process to maintain a threshold temperature of the VOCs to prevent disadvantageous collection of the VOCs, for example, plating of the VOCs in an undesired manner and/or location, until such time as the VOCs reach a destruction system/subsystem, such as a catalytic destruction system including, for example, a catalytic oxidation system and/or a thermal destruction system including, for example, thermal incinerators, oxidizers or afterburners, to destroy or burn-up the undesired VOCs and other outgassing from the curing. In at least one form, such as the inside of can curing embodiments, the threshold temperature is at least approximately 290 degrees Fahrenheit inasmuch as the VOCs generated during the inside of can curing process contemplated herein typically condense at temperatures below such a threshold. Of course, the threshold temperature will vary depending on the application and the types of VOCs actually generated and sought to be conveyed away or removed from the area, and in most cases destroyed. For example, the inks applied to the outside of cans may have different VOCs or vaporous products generated during curing.

Figure 7:
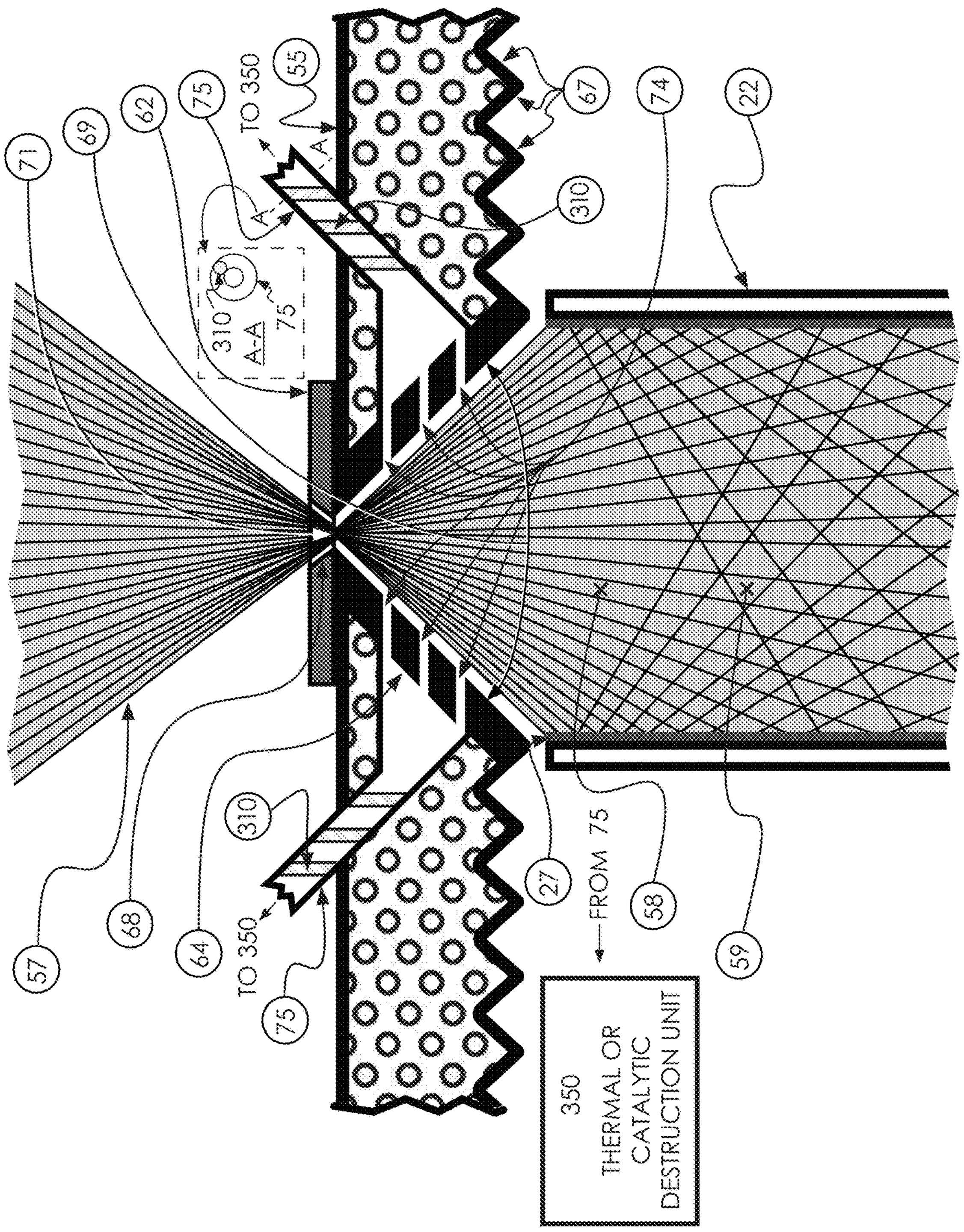
FIG. 7 shows another system according to the presently described embodiments.

For inside of can curing, suitable heating systems or subsystems, such as heating coils, are provided to heat the vent tubes in, for example, FIG. 7, to maintain sufficient temperature of the VOC until transported to the catalytic converter station. More specifically, with specific reference to FIG. 7, the vacuum ports or vent tubes 75, in at least some embodiments, may be provided with a heating arrangement, such as heating coils 310, to maintain a minimum threshold temperature in the vacuum port while the vapors, including VOCs and other generated compounds, are drawn away from the curing process. The vent tubes 75 may take any of a variety of configurations to achieve the objective of drawing the unwanted vapors away from curing process. Moreover, the vent tubes 75 are shown as including, in at least some embodiments, a heating arrangement such as a heating coil 310; however, the heating coils 310 and their implementation in conjunction with the vent tubes 75 could also take a variety of forms. For example, the heating coils 310 could be positioned within the passageway of the vent tube or positioned on the outside of (e.g. wrapped around) the vent tubes. As another alternative, the vent tubes could be configured with multiple layers with the heating coils positioned between layers, as shown as an example in FIG. 7 (cross-section A-A). Insulated outer layers could be provided to reduce the lost heat and reduce the cost of keeping the inner walls of the tube at or above the minimum threshold temperature. Still further, other suitable heating mechanisms could be implemented to supplement or replace the heating coils.

It should be appreciated that the vapors emitted during the curing process, including the VOCs and other generated compounds, are then transported through the vent tubes 75 to a catalytic destruction system or unit or thermal destruction system or unit 350 to be broken down, expelled or eliminated. This architecture is only shown in FIG. 7 representatively; however, a network or system of vent tubes 75 extending from the curing station may be implemented in any of a variety of suitable manners that will be apparent to those skilled in the art upon reading this disclosure. Also, it should be appreciated that the thermal or catalytic destruction unit 350 could take a variety of forms. As noted above, the destruction unit may take the form of, for example, a catalytic destruction system such as, for example, a catalytic oxidation system. The destruction unit may also take the form of, for example, a thermal destruction system such as a thermal incinerator, oxidizer or afterburner.

Likewise, the inside of can curing embodiment described in connection with FIG. 8 may also be supplemented with a system to address undesired VOC emission during the curing process. In this regard, with reference to FIG. 8, a ventilation unit 320 could be positioned to carry vapors including VOCs and other generated compounds to a thermal or catalytic destruction unit 350. The ventilation unit 320 may take a variety of forms and may be positioned in a variety of different locations (e.g. near the top of the container 22) to implement its functionality. Also, suitable vent tubes 375 (including vent tubes with a heating mechanism such as heating coils) may also be implemented to carry the vapors from the ventilation unit 320 to the destruction unit 350. In some forms, the vent tubes 375 are directly connected to the element 240 (in place of or as a supplement to the ventilation unit 320), similar to the vent tubes 75 of FIG. 7. As with the vent tubes and destruction unit of FIG. 7, these components may take a variety of forms, including those described above and others.

For the curing of the surface ink, proper heated ventilation can be provided to the airflow system to transport the sufficiently heated VOCs to the catalytic converter station. More specifically, with reference back now to FIGS. 9 and 11, a suitable ventilation system such as representatively illustrated ventilation unit 330 could be provided to carry away and eliminate unwanted VOCs. In this regard, ventilation tubes or ports 375 (such as vent tubes 75 of FIG. 7) with suitable heating features (such as heating coils 310) could be implemented to carry vapor, including VOCs and other generated compounds, away from the curing oven to a catalytic or thermal destruction system or unit 350 for processing and/or elimination.

In this regard, the ventilation units 330 could be positioned outside, above or alongside the curing stations of FIG. 9 or 11. The ventilation units 330 may also be positioned within the reflector arrays or between the reflector arrays as may be appropriate. As an alternative or supplement, in the appropriate venting conditions, the vent tubes could be positioned in a variety of locations (with or without the ventilation units 330) to receive and convey the vapors to the destruction unit 350.

It should be understood that the issue of VOCs and any other unwanted vapor or emission products can be addressed in a variety of manners that will be apparent to those skilled in the art. The configurations contemplated herein are merely exemplary. Upon reading the present disclosure and challenges presented, those of skill in the art may well devise other approaches that fall within the scope of the presently described embodiments.

By implementing these narrowband irradiation techniques in the IBO, Pin-chain oven, and drying oven (and, in some examples, the basecoater oven) to perform all of the oven heating chores within a can manufacturing plant, it is not only possible to have a much more efficient heating scenario throughout a can plant. It is thus possible to eliminate all the hydrocarbons, Nitrous Oxides, and $CO_2$ while also eliminating the annealing and strength robbing time-at-heat scenarios that occurs multiple times within a can plant. It can reduce operational issues and create a higher percentage of up-time. One implementing this high speed, narrowband oven according to the presently described embodiments will understand the further ways that the presently described embodiments can be optimized to provide for better can manufacturing. It will also be understood how it can be extended to other aspects of can or container manufacturing like drying/curing the compound in beverage shells. It can be used very effectively for drying freshly inked decorated sheets to replace or update a wicket oven in a food can plant. Its advantages are many and the applications for the presently described embodiments are much wider than are described here.

The concepts taught here as to how to implement the presently described embodiments, for example, of narrowband infrared radiant curing, are intended to help one who wants to configure the presently described embodiments for his specific application and production needs. The examples will show how there are many different ways of implementing the presently described embodiments well beyond the specific examples given. An individual or a team skilled in the respective arts will be able to extend the novel concepts to meet their unique application requirements accordingly.

We claim:

1. A system for use in can manufacturing wherein cans are washed, decorated and/or a coating has been sprayed onto an inside surface of cans, the system comprising:

a first station including a first array of semiconductor-based narrowband irradiation devices positioned to irradiate and dry the cans through a mesh or open-spaced belt of a mass conveyor or to individually irradiate and dry individual cans through selective elements of a serial conveyor, wherein the first station is configured to dry the cans in less than 60 seconds;

a second station including a second array of semiconductor-based narrowband irradiation devices positioned to irradiate and cure ink applied to outsides of cans being transported on a conveyor, wherein the second station is configured to cure the ink in less than 20 seconds; and a third station including a third array of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

2. The system as set forth in claim 1 wherein the first station is configured to dry the cans in less than 50 seconds, 40 seconds, 30 seconds or 20 seconds.

3. The system as set forth in claim 1 wherein the second station is configured to cure the ink in less than one of 15 seconds, 10 seconds or 5 seconds.

4. The system as set forth in claim 1 wherein at least one of the third station is configured to heat the cans to the critical linking or cross-linking temperature in the coating in less than one of 10 seconds, 5 seconds or 2 seconds, and the coating is optimized for narrowband curing.

5. The system as set forth in claim 1 wherein at least one of the first station drying the can in less than 60 seconds and the second station curing the ink in less than 20 seconds, prevents de-tempering or annealing from occurring in the can.

6. A method for use in can manufacturing wherein cans are washed, decorated and/or a coating has been sprayed onto an inside surface of cans, the method comprising:

with a first array of semiconductor-based narrowband irradiation devices at a first station, irradiating and drying the cans through a mesh or open-spaced belt of a mass conveyor or individually irradiating and drying individual cans through selective elements of on a serial, single-file conveyor;

with a second array of semiconductor-based narrowband irradiation devices at a second station positioned after an ink decorator, then irradiating and curing ink applied to outsides of cans which are being transported on a conveyor; and with a third array of semiconductor-based narrowband irradiation devices at a third station, individually and electrically heating inside surfaces of each can moved into a curing zone using optical elements positioned outside the open end of the can such that the coating on the inside surface of each successive can in a series of production cans is brought to a critical temperature to produce a linking curing process in the coating, with each of these three stations performing their drying or curing function in less than 20 seconds to prevent de-tempering or annealing or weakening from occurring in the can.

7. The method as set forth in claim 6 wherein the curing of the ink occurs in less than one of 15 seconds, 10 seconds or 5 seconds.

8. The method as set forth in claim 6 wherein the inside coating reaches the critical linking or cross-linking temperature is reached in less than one of 10 seconds, 5 seconds or 2 seconds.

9. A system for use in can manufacturing wherein cans are washed, decorated and/or a coating has been sprayed onto an inside surface of cans, the system comprising:

a first station including a first array of semiconductor-based narrowband irradiation devices positioned to irradiate and dry the cans through a mesh or open-spaced belt of a mass conveyor, the first array being positioned to face the inside of the cans and within a housing, the housing having a protective window positioned and sealed to prevent moisture from entering the array housing, the protective window being optically transparent at an applied wavelength, the first array also being provided with at least one of reflective baffles to guide irradiation towards the cans or optical elements to selectively spread or narrow beams of the irradiation, the system being configured such that the irradiation does not exit the system.

10. The system as set forth in claim 9 wherein the protective window is at least one of mounted at an angle to promote water runoff toward a trough or gutter positioned near an edge of the protective window or provided with an anti-reflective coating that is functional at applied narrow wavelength bands.

11. The system as set forth in claim 9 further comprising at least one of fans or blowers to provide higher speed air flow at the mouths of the cans to remove water vapor more efficiently.

12. The system as set forth in claim 9 further comprising wherein a second station having a second array of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

13. A system for use in can manufacturing wherein cans are washed, decorated and/or a coating has been sprayed onto an inside surface of cans, the system comprising:

a first station including a first array of semiconductor-based narrowband irradiation devices positioned to irradiate and cure ink applied to outer surfaces of cans being transported on a pin chain, the first array being positioned along the pin chain to irradiate an outer surface of an oncoming can at a first angle;

a second station including a second array of semiconductor-based narrowband irradiation devices positioned to irradiate and cure ink applied to the outer surfaces of the cans being transported on the pin chain, the second array being positioned along the pin chain to irradiate the outer surface of the oncoming can at a second angle, different from the first angle; and corner cube reflector material strategically positioned relative to each station substantially orthogonal to a tangent of the outer surfaces of the cans and between arrays such that irradiation reflected from the outer surface of the cans subsequently reflects off the corner cube reflector material back to substantially a location on the outer surface of the cans proximate to where the irradiation originally reflected.

14. The system as set forth in claim 13 further comprising a third station having a third array of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

15. The system as set forth in claim 13 further comprising a plurality of additional stations including arrays of semiconductor-based irradiation devices to irradiate and cure ink applied to the outer surfaces of cans, each array being positioned at a strategic angle so the combination of the plurality of stations will irradiate the ink around the entire outer surface of each can.

16. The system as set forth in claim 13 further comprising a ventilation system to carry vapor, including at least volatile organic compounds, from the first and second station to a thermal or catalytic destruction unit, wherein the ventilation system maintains the vapor at a minimum threshold temperature.

17. A system as set forth in claim 13 further comprising a drying station including at least one array of semiconductor-based narrowband irradiation devices positioned to irradiate and dry the cans through a mesh or open-spaced belt of a mass conveyor or to individually irradiate and dry individual cans through selective elements of a serial conveyor, wherein the drying station is configured to dry the cans in less than 20 seconds.

18. A system for use in a can manufacturing inside coating and curing process wherein coating has been sprayed onto an inside surface of a can, the system comprising:

a can handling system configured to serially move production cans into at least one curing zone;

arrays of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can; and, a ventilation system to carry vapor, including at least volatile organic compounds, to a thermal or catalytic destruction unit, wherein the ventilation system maintains the vapor at a minimum threshold temperature.

19. A system for use in a can manufacturing inside coating and curing process wherein coating has been sprayed onto an inside surface of a can, the system comprising:

a can handling system configured to serially move production cans into at least one curing zone;

broadband infrared sources positioned to individually and electrically heat inside surfaces of each can moved into a curing zone using optical elements positioned to direct irradiation toward upper sidewalls of the inside surface of the can such that the coating on the inside surface of each successive can in a series of production cans is brought to a critical temperature to produce a linking curing process in the coating, in less than 20 seconds to prevent weakening, de-tempering, or annealing from occurring in the can body;

a ventilation system to carry vapor, including at least volatile organic compounds, to a thermal or catalytic destruction unit, wherein the ventilation system maintains the vapor and outgassed compounds in the vapor at a minimum threshold temperature.

20. A system for use in can manufacturing wherein cans are washed, decorated and/or a coating has been sprayed onto an inside surface of cans, the system comprising:

a first station including a plurality of arrays of semiconductor-based narrowband irradiation devices positioned to irradiate and cure ink applied to outsides of cans being transported on a pin chain conveyor, wherein the arrays of the first station are configured to cure the ink in less than 20 seconds; and a second station including a second configuration of arrays of semiconductor-based narrowband irradiation devices positioned to individually and electrically heat inside surfaces of each can moved into a curing zone using optical elements positioned outside the open end of the can such that the coating on the inside surface of each successive can in a series of production cans is brought to a critical temperature to produce a linking curing process in the coating, in less than 20 seconds to prevent de-tempering or annealing from occurring in the can.

* * * * *